(12) United States Patent
Sato

(10) Patent No.: US 10,444,112 B2
(45) Date of Patent: Oct. 15, 2019

(54) WAVEFRONT MEASUREMENT APPARATUS AND WAVEFRONT MEASUREMENT METHOD

(71) Applicant: OLYMPUS CORPORATION, Hachioji-shi, Tokyo (JP)

(72) Inventor: Yosuke Sato, Kodaira (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/717,744

(22) Filed: Sep. 27, 2017

(65) Prior Publication Data

US 2018/0073957 A1 Mar. 15, 2018

Related U.S. Application Data

(63) Continuation of application No. PCT/JP2015/059806, filed on Mar. 27, 2015.

(51) Int. Cl.
*G01M 11/02* (2006.01)

(52) U.S. Cl.
CPC .... *G01M 11/0242* (2013.01); *G01M 11/0214* (2013.01); *G01M 11/0257* (2013.01)

(58) Field of Classification Search
CPC .. G03F 7/70066; G03F 7/7085; G03F 9/7069; G01M 11/0214; G01M 11/0242; G01M 11/0257

(Continued)

(56) References Cited

U.S. PATENT DOCUMENTS 6,819,414 B1 * 11/2004 Takeuchi ........... G01M 11/0264
356/124
10,209,161 B2 * 2/2019 Chang ................ G01M 11/0271
(Continued)

FOREIGN PATENT DOCUMENTS

| JP | 2005158829 A | 6/2005 |
|---|---|---|
| JP | 2014020881 A | 2/2014 |
| JP | 5452032 B2 | 3/2014 |

OTHER PUBLICATIONS

International Search Report (ISR) and Written Opinion dated Jun. 16, 2015 issued in International Application No. PCT/JP2015/059806.

(Continued)

*Primary Examiner* — Isiaka O Akanbi
(74) *Attorney, Agent, or Firm* — Holtz, Holtz & Volek PC

(57) ABSTRACT

A wavefront measurement apparatus includes a light source unit, a holding unit, a light reception optical system, a wavefront measurement unit, and a wavefront data generation unit. The light source unit is configured to apply light beams toward the subject optical system. The wavefront measurement unit is configured to measure light beams transmitted through the subject optical system. The wavefront data generation unit is configured to generate wavefront aberration data from results of the measurement by the wavefront measurement unit. A neighborhood of the opening portion and a neighborhood of the wavefront measurement unit are made to be optically conjugate with each other by the light reception optical system. The measurement of the light beams includes at least measurement of the light beams in a state in which a center of the opening portion is separated away from the measurement axis by a predetermined distance.

14 Claims, 31 Drawing Sheets

(58) Field of Classification Search
USPC .................................. 356/124, 121, 213, 399
See application file for complete search history.

(56) References Cited

U.S. PATENT DOCUMENTS

| | | | |
|---|---|---|---|
| 2004/0059444 A1* | 3/2004 | Tsukakoshi | G02B 7/023 |
| | | | 700/59 |
| 2005/0254042 A1* | 11/2005 | Geh | G01M 11/0207 |
| | | | 356/124 |
| 2008/0225278 A1* | 9/2008 | Namba | G01N 21/6458 |
| | | | 356/123 |
| 2008/0225416 A1* | 9/2008 | Harada | G02B 21/0088 |
| | | | 359/830 |
| 2012/0019813 A1 | 1/2012 | Yoshitake et al. | |
| 2013/0027691 A1* | 1/2013 | Otaki | G01M 11/0257 |
| | | | 356/124 |

OTHER PUBLICATIONS

International Preliminary Report on Patentability (IPRP) dated Oct. 12, 2017 issued in counterpart International Application No. PCT/JP2015/059806.

* cited by examiner $|\delta f| = |\delta r|$

WAVEFRONT MEASUREMENT APPARATUS AND WAVEFRONT MEASUREMENT METHOD

CROSS-REFERENCE TO RELATED APPLICATION

The present application is a continuation application of International Application No. PCT/JP2015/059806 filed on Mar. 27, 2015, the entire contents of which are incorporated herein by reference.

BACKGROUND OF THE INVENTION

Field of the Invention

The present invention relates to a wavefront measurement apparatus and a wavefront measurement method.

Description of the Related Art

In manufacturing of optical systems formed of a lens alone or a plurality of lenses, manufacturing errors such as an eccentric error and a surface shape error may be generated on each lens surface. Manufacturing errors may lead to reduction in imaging performance of an optical system.

For measurement of transmitted wavefront aberration in a subject optical system, axial wavefront aberration is generally measured because it can be measured with a simple configuration. In recent years, however, along with the increase in precision of optical systems, measurement needs are growing for axial wavefront aberration as well as off-axis wavefront aberration.

Off-axis wavefront aberration includes information that cannot be obtained by axial wavefront aberration. By acquiring data on off-axis wavefront aberration, the number of clues for analyzing imaging performance and manufacturing errors in a subject optical system is increased. For example, highly accurate analysis can be performed on the eccentricity amount of the subject optical system.

Examples of apparatus for measuring off-axis wavefront aberration include a wavefront aberration measurement apparatus disclosed in Japanese Patent Publication No. 5452032. In the wavefront aberration measurement apparatus disclosed in Japanese Patent Publication No. 5452032, light beams are applied from a position corresponding to an off-axis object point of an objective lens (lens to be measured). Parallel light beams exit from the objective lens, but the parallel light beams are inclined from an optical axis of the objective lens.

In a wavefront aberration measurement apparatus disclosed in Japanese Patent Publication No. 5452032, a Shack-Hartmann sensor is held by a stage that is movable in one axis direction and a goniostage. The stage and the goniostage are used to tilt and shift the Shack-Hartmann sensor, thereby adjusting the orientation and position of the Shack-Hartmann sensor and enabling the inclined parallel light beams to be received by the Shack-Hartmann sensor.

SUMMARY OF THE INVENTION

A wavefront measurement apparatus according to the present invention includes:
a light source unit, a holding unit, a light reception optical system, a wavefront measurement unit, and a wavefront data generation unit, wherein
the light source unit is disposed on one side of a measurement axis,
the wavefront measurement unit is disposed on the other side of the measurement axis,
the holding unit is disposed between the light source unit and the wavefront measurement unit,
the light reception optical system is disposed between the holding unit and the wavefront measurement unit,
the holding unit has an opening portion configured to hold a subject optical system,
the light source unit is configured to apply light beams toward the subject optical system,
the wavefront measurement unit is configured to measure light beams transmitted through the subject optical system,
the wavefront data generation unit is configured to generate wavefront aberration data from results of the measurement by the wavefront measurement unit,
a neighborhood of the opening portion and a neighborhood of the wavefront measurement unit are made to be optically conjugate with each other by the light reception optical system, and
measurement of the light beams includes at least measurement of the light beams in a state in which a center of the opening portion is separated away from the measurement axis by a predetermined distance.

Another wavefront measurement apparatus according to the present invention includes:
a light source unit, a holding unit, a light reception optical system, a first moving mechanism, a wavefront measurement unit, and a wavefront data generation unit, wherein
the light source unit is disposed on one side of a measurement axis,
the wavefront measurement unit is disposed on the other side of the measurement axis,
the holding unit is disposed between the light source unit and the wavefront measurement unit,
the light reception optical system is disposed between the holding unit and the wavefront measurement unit,
the holding unit has an opening portion configured to hold a subject optical system,
the light source unit is configured to apply light beams toward the subject optical system,
the wavefront measurement unit is configured to measure light beams transmitted through the subject optical system,
the wavefront data generation unit is configured to generate wavefront aberration data from results of the measurement by the wavefront measurement unit,
a neighborhood of the opening portion and a neighborhood of the wavefront measurement unit are made to be optically conjugate with each other by the light reception optical system,
the first moving mechanism is configured to move the subject optical system to a plurality of positions around the measurement axis,
a transmission region of a light beam in the subject optical system is different at each of the plurality of positions,
the wavefront measurement unit is configured to measure a light beam transmitted through the subject optical system at each of the plurality of positions, and
the wavefront data generation unit is configured to generate wavefront aberration data from results of the measurement at each of the plurality of positions.

A wavefront measurement method according to the present invention includes:
a step of making a neighborhood of a subject optical system and a neighborhood of a wavefront measurement unit to have an optically conjugate relation,
an eccentricity driving step of driving the subject optical system to be eccentric with respect to a measurement axis of a wavefront measurement apparatus, and a wavefront data acquisition step of acquiring, by the wavefront measurement unit and a wavefront data generation unit, wavefront aberration data on a light beam transmitted through the subject optical system.

BRIEF DESCRIPTION OF THE DRAWINGS

FIG. 3A is a diagram in which a subject optical system is formed of one single lens, and FIG. 3B is a diagram in which a subject optical system is formed of lenses;

FIG. 4A illustrates a state in which a planar waves made incident on the SH sensor, and FIG. 4B illustrates a state in which non-planar waves is made incident on the SH sensor;

FIG. 7A is a diagram illustrating a transmission region at a first position, FIG. 7B is a diagram illustrating a transmission region at a second position, FIG. 7C is a diagram illustrating a transmission region at a third position, and FIG. 7D is a diagram illustrating a transmission region at a fourth position;

FIG. 10A is a diagram illustrating a first pattern, and FIG. 10B is a diagram illustrating a second pattern;

FIG. 11A is a diagram when a rotation angle is 0 degrees, FIG. 11B is a diagram when the rotation angle is 30 degrees, and FIG. 11C is a diagram when the rotation angle is 60 degrees;

FIG. 12A is a diagram illustrating surface apex positions determined by measurement with a first pattern, and FIG. 12B is a diagram illustrating surface apex positions determined by measurement with a second pattern;

FIG. 17A is a diagram illustrating a state before inversion, and FIG. 17B is a diagram illustrating a state after inversion;

FIG. 29A illustrates degree of freedom of eccentricity in a spherical surface, and FIG. 29B and FIG. 29C illustrate degree of freedom of eccentricity in an aspherical surface;

FIG. 30A illustrates movement of the spherical center in forward measurement, and FIG. 30B illustrates movement of the spherical center in reverse measurement; FIG. 31A is a diagram illustrating the eccentricity with lens surfaces, and FIG. 31B is a diagram illustrating the eccentricity with spherical centers.

DETAILED DESCRIPTION OF THE INVENTION

Prior to the explanation of examples, action and effect of embodiments according to certain aspects of the present invention will be described below. In the explanation of the action and effect of the embodiments concretely, the explanation will be made by citing concrete examples. However, similar to a case of the examples to be described later, aspects exemplified thereof are only some of the aspects included in the present invention, and there exists a large number of variations in these aspects. Consequently, the present invention is not restricted to the aspects that will be exemplified.

A wavefront measurement apparatus of a first embodiment is described. The wavefront measurement apparatus of the first embodiment includes a light source unit, a holding unit, alight reception optical system, a wavefront measurement unit, and a wavefront data generation unit. The light source unit is disposed on one side of a measurement axis. The wavefront measurement unit is disposed on the other side of the measurement axis. The holding unit is disposed between the light source unit and the wavefront measurement unit. The light reception optical system is disposed between the holding unit and the wavefront measurement unit. The holding unit has an opening portion to hold a subject optical system. The light source unit is configured to apply light beams toward the subject optical system. The wavefront measurement unit is configured to measure light beams transmitted through the subject optical system. The wavefront data generation unit is configured to generate wavefront aberration data from results of the measurement by the wavefront measurement unit. A neighborhood of the opening portion and a neighborhood of the wavefront measurement unit are made to be optically conjugate with each other by the light reception optical system, and the measurement of the light beam includes at least measurement of the light beam in a state in which a center of the opening portion is separated away from the measurement axis by a predetermined distance.

Figure 1:
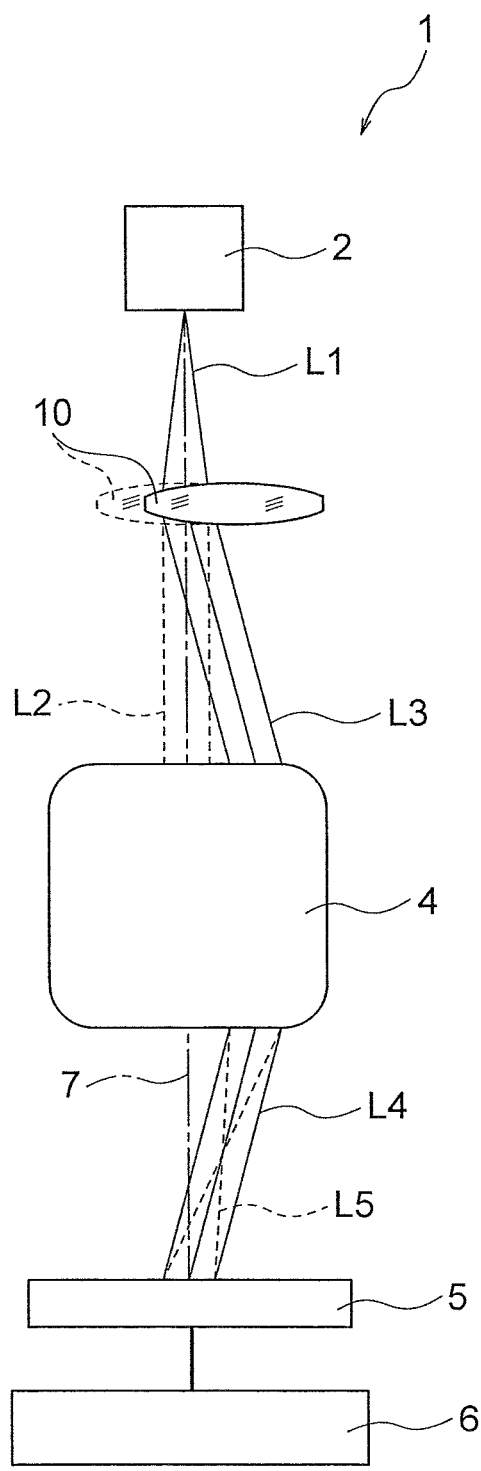
FIG. 1 is a diagram illustrating a wavefront measurement apparatus of a first embodiment.
Figure 2:
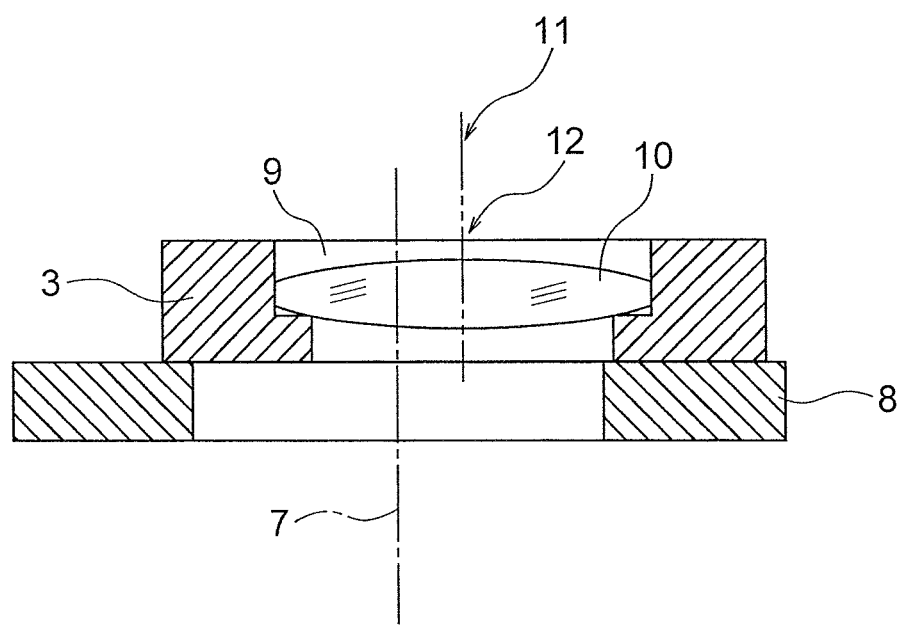
FIG. 2 is a diagram illustrating an example of a holding unit.

FIG. 1 illustrates the wavefront measurement apparatus of the first embodiment. FIG. 2 illustrates an example of the holding unit. A wavefront measurement apparatus 1 includes a light source unit 2, a holding unit 3, a light reception optical system 4, a wavefront measurement unit 5, and a wavefront data generation unit 6.

As illustrated in FIG. 1, the light source unit 2 is disposed on one side of a measurement axis 7. The wavefront measurement unit 5 is disposed on the other side of the measurement axis 7. The holding unit 3 is disposed between the light source unit 2 and the wavefront measurement unit 5. The light reception optical system 4 is disposed between the holding unit 3 and the wavefront measurement unit 5.

The light source unit 2 is formed of an LED or a laser. The light source unit 2 applies light beams L1 toward the holding unit 3.

As illustrated in FIG. 2, the holding unit 3 is placed on a stage 8. In this example, the stage 8 is a fixed stage. The holding unit 3 has an opening portion 9. A subject optical system 10 is inserted in the opening portion 9. In FIG. 2, the subject optical system 10 is a single lens. The single lens is inserted in the opening portion 9 as it is. However, the single lens may be held by a frame member and inserted in the opening portion 9 together with the frame member.

Figure 3A:
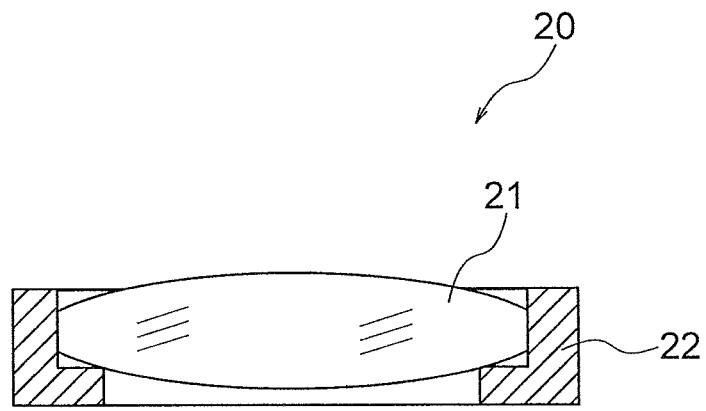
FIG. 3A and FIG. 3B are examples of subject optical systems, where
Figure 3B:
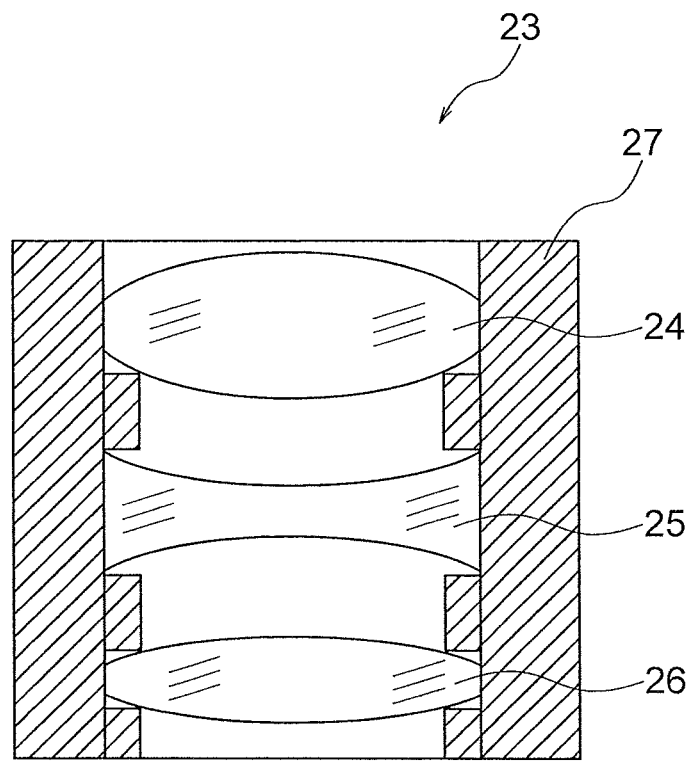

FIG. 3A and FIG. 3B are examples of the subject optical system. FIG. 3A illustrates the case where the subject optical system is formed of one single lens. FIG. 3B illustrates the case where the subject optical system is formed of lenses. In FIG. 3A, a subject optical system 20 includes one lens 21 and a lens frame 22. In FIG. 3B, a subject optical system 23 includes three single lenses 24, 25, and 26 and a lens barrel 27.

The description is continued with reference to FIG. 1. The subject optical system 10 is inserted in the opening portion 9, and the light source unit 2 emits the light beams L1. By doing this, the light beams L1 emitted from the light source unit 2 are applied to the subject optical system 10.

Here, when a center 12 of the opening portion 9 and the measurement axis 7 are aligned with each other, the axis of the subject optical system 10 and the measurement axis 7 are substantially aligned with each other. The subject optical system 10 in this state is indicated by the broken line. In this state, the light source unit 2, the subject optical system 10, the light reception optical system 4, and the wavefront measurement unit 5 are co-axial. The light beams L1 emitted from the light source unit 2 are applied to a central part of the subject optical system 10.

When the light source unit 2 is disposed at a position of front focal point of the subject optical system 10, parallel light beams exit from the subject optical system 10. When the light source unit 2 is not disposed at the position of front focal point of the subject optical system 10, non-parallel light beams (condensed light beams or diverging light beams) exit from the subject optical system 10. The light source unit 2 is not necessarily required to be disposed at the position of front focal point of the subject optical system 10, but it is preferable that the light source unit 2 be disposed at the position of front focal point of the subject optical system 10.

FIG. 1 illustrates the case where the light source unit 2 is disposed at the position of front focal point of the subject optical system 10. Thus, light beams L2 that exit from the subject optical system 10 are parallel light beams as indicated by the broken lines.

When the center 12 of the opening portion 9 and the measurement axis 7 are not aligned with each other, on the other hand, the axis of the subject optical system 10 is separated away from the measurement axis 7. The subject optical system 10 in this state is indicated by the solid line. In this state, the light source unit 2, the light reception optical system 4, and the wavefront measurement unit 5 are co-axial, but the subject optical system 10 is not co-axial with the light source unit 2, the light reception optical system 4, and the wavefront measurement unit 5.

For making this state, only the subject optical system 10 may shift in a direction perpendicular to the measurement axis 7 from the state in which the light source unit 2, the subject optical system 10, the light reception optical system 4, and the wavefront measurement unit 5 are co-axial. For example, a user may place the holding unit 3 on the stage 8 such that the center 12 of the opening portion 9 is separated away from the measurement axis 7 by a predetermined distance. The predetermined distance may be determined depending on the subject optical system 10.

When the center 12 of the opening portion 9 and the measurement axis 7 are not aligned with each other, light beams which enter the subject optical system 10 become light beams in a state of off-axis. As a result, as indicated by the solid lines, the light beams L1 emitted from the light source unit 2 are applied to a peripheral part of the subject optical system 10.

The light beams L1 transmitted through the peripheral part of the subject optical system 10 are refracted by the subject optical system 10 and then exit from the subject optical system 10. Since the light source unit 2 is disposed at the position of front focal point of the subject optical system 10, light beams L3 that exit from the subject optical system 10 become parallel light beams similarly to the light beams L2.

However, the travel direction of the light beams L3 is different from the travel direction of the light beams L2. After intersecting with the measurement axis 7, the light beams L3 travel away from the measurement axis 7. Thus, the light beams L3 do not enter the wavefront measurement unit 5 in this state.

In the wavefront measurement apparatus 1, however, the light reception optical system 4 is disposed between the holding unit 3 and the wavefront measurement unit 5. It is possible to direct the travel direction of the light beams that have exited from the light reception optical system 4 toward a side of the measurement axis 7 by the light reception optical system 4.

How the light beams that have exited from the light reception optical system 4 travel is different depending on the type of the light reception optical system 4. Examples of the light reception optical system 4 include an optical system having an infinite focal length and an optical system having a finite focal length. The former optical system is called "afocal optical system".

The case where an optical system having an infinite focal length is used for the light reception optical system 4 is described. In this case, light beams L4 that exit from the light reception optical system 4 are parallel light beams, and the light beams L4 enter the wavefront measurement unit 5 as parallel light beams.

The case where an optical system having a finite focal length is used for the light reception optical system 4 is described. In this case, for example, light beams L5 that exit from the light reception optical system 4 are condensed at a focus position of the light reception optical system 4, and then enter the wavefront measurement unit 5 while diverging.

Here, in the wavefront measurement apparatus of the first embodiment, it is preferable that the opening portion, the light reception optical system, and the wavefront measurement unit be positioned such that the opening portion is made conjugate with the wavefront measurement unit.

By doing this, the neighborhood of the opening portion 9 and the neighborhood of the wavefront measurement unit 5 are made to have an optically conjugate relation by the light reception optical system 4. Thus, the light beams L3 that have exited from the subject optical system 10 are always guided to the wavefront measurement unit 5.

Specifically, the light beams L3 enter the light reception optical system 4 and are then refracted by the light reception optical system 4. The light beams refracted by the light reception optical system 4 exit from the light reception optical system 4. The light beams L4 that have exited from the light reception optical system 4 approach the measurement axis 7 so as to intersect with the measurement axis 7.

The position at which the light beam L4 intersects with the measurement axis 7 is a position optically conjugate with the neighborhood of the opening portion 9. The wavefront measurement unit 5 is disposed at this position. As a result, it is possible to enter the light beams L4 to the wavefront measurement unit 5.

Further, in the wavefront measurement apparatus of the first embodiment, it is preferable that the opening portion, the light reception optical system, and the wavefront measurement unit be positioned such that a rear principal point of the subject optical system is conjugate with the wavefront measurement unit.

By making such arrangement, it is possible to make the light beams L4 to be entered to the wavefront measurement unit 5 more reliably. Moreover, a wavefront shape immediately after exiting from the subject optical system 10 is accurately reproduced in the wavefront measurement unit. In the case where a light reception optical system having a finite focal length is used, a wavefront shape in which power components is added to the wavefront shape immediately after exiting from the subject optical system 10 is reproduced in the wavefront measurement unit.

In the wavefront measurement unit 5, measurement of the light beams L4 is made. The light beams L4 are light beams that have been transmitted through the subject optical system 10. As described above, the neighborhood of the opening portion 9 and the neighborhood of the wavefront measurement unit 5 are made to have an optically conjugate relation by the light reception optical system 4. Thus, it is possible to make the light beams L3 that have exited from the subject optical system 10 to be entered to the wavefront measurement unit 5 irrespective of the travel direction of the light beams L3.

Moreover, the wavefront at the position of the wavefront measurement unit 5 and the wavefront immediately after exiting from the subject optical system 10 are maintained to be the same shape. In other words, the wavefront shape immediately after exiting from the subject optical system 10 is reproduced in the wavefront measurement unit 5.

Figure 4A:
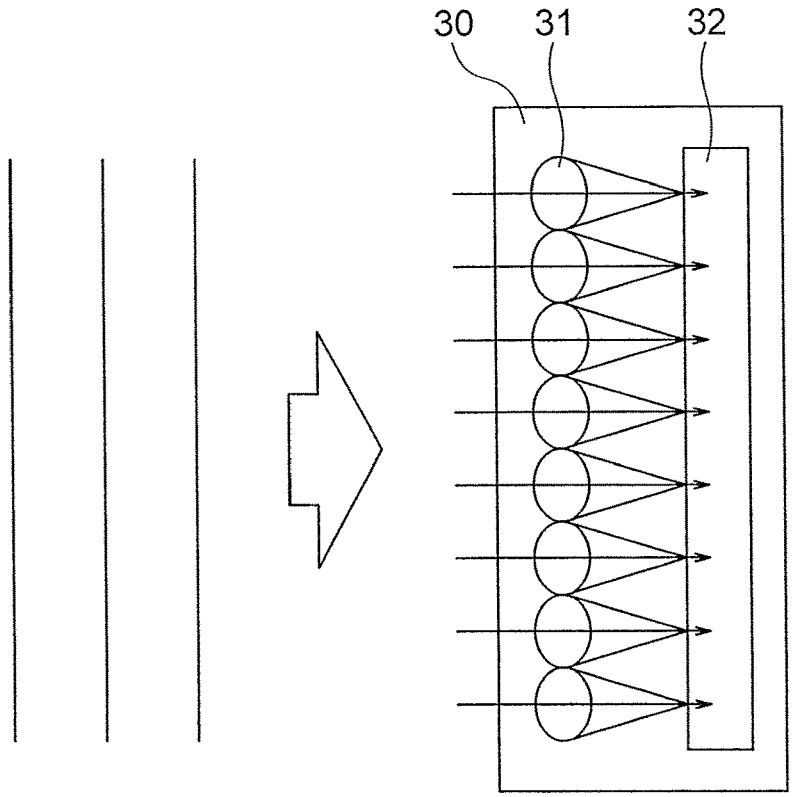
FIG. 4A and FIG. 4B are diagrams illustrating a structure and a function of a SH sensor, where
Figure 4B:
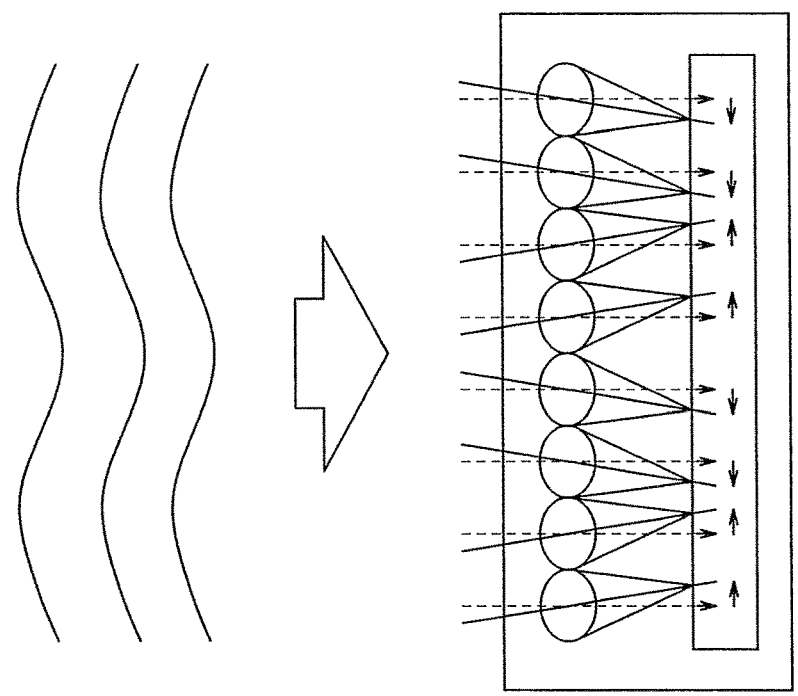

The wavefront measurement unit 5 is, for example, a Shack-Hartmann sensor (hereinafter referred to as a "SH sensor"). FIGS. 4A, and 4B are diagrams illustrating a structure and a function of the SH sensor, where FIG. 4A illustrates a state in the case where a plane wave is made incident on the SH sensor, and FIG. 4B illustrates a state in the case where a non-plane wave is made incident on the SH sensor.

A SH sensor 30 is formed of a microlens array 31 and an imaging element 32. The imaging element 32 is, for example, a CCD or a CMOS. In the structure, suppose that microlenses are arranged at regular intervals, and each of the microlenses has no aberration.

In the SH sensor 30, by the microlens array 31, the light beam made incident on the SH sensor 30 is condensed. In this time, light spot images of the same number as the number of microlenses through which the light beam has been transmitted are formed in the condensing position. The imaging element 32 is disposed in the condensing position. Each of the light spot images is received by the imaging element 32. Here, in the imaging element 32, minute light-receiving elements are arranged in a two-dimensional manner. Therefore, it is possible to recognize positions of the respective light spot images.

When a plane wave is made incident on the SH sensor 30, light spot images are formed at regular intervals. By contrast, when a non-plane wave is made incident on the SH sensor 30, light spot images are not formed at regular intervals. In this manner, the positions of the respective light spot images depend on the shape of the wavefront made incident on the SH sensor 30, that is, the occurrence amount of the wavefront aberration.

When a wavefront to be measured is made incident on the SH sensor 30, the wavefront is divided by the microlens array 31. As a result, the wavefront is projected on the imaging surface of the imaging element 32 as a plurality of light spot images. The wavefront aberration can be measured from dislocation amounts of the light spot image positions from reference positions.

The wavefront data generation unit 6 generates wavefront aberration data from results of the measurement by the wavefront measurement unit 5. Specifically, the wavefront aberration is measured on the basis of the amounts of shift of light spot image positions from a reference position. Here, the light beams L1 are applied to the peripheral part of the subject optical system 10. Since a radiation position is off the axis, in this case, off-axis wavefront aberration of the subject optical system 10 can be measured.

By changing the predetermined distance, it is possible to change the radiation position of the light beams L1 on the subject optical system 10. For example, the holding unit 3 may be placed on the stage 8 such that a center 11 of the opening portion 9 and the measurement axis 7 are aligned with each other. In this case, the light beams L2 that have exited from the subject optical system 10 travel in parallel to the measurement axis 7 as indicated by the broken lines. Since the light reception optical system 4 is disposed between the holding unit 3 and the wavefront measurement unit 5, the light beams L2 enter the light reception optical system 4.

Here, as described above, the neighborhood of the opening portion 9 and the neighborhood of the wavefront measurement unit 5 are made to be optically conjugate with each other by the light reception optical system 4. Thus, the wavefront shape immediately after exiting from the subject optical system 10 is reproduced in the wavefront measurement unit. The light beams L1 are applied to the central part of the subject optical system 10. Since the radiation position is on the axis, in this case, axial wavefront aberration of the subject optical system 10 can be measured.

The stage 8 may be a moving stage. With this configuration, it is possible to switch easily the measurement of off-axis wavefront aberration and the measurement of axial wavefront aberration by simply moving the stage 8. In the wavefront measurement apparatus 1, the light reception optical system 4 is disposed between the holding unit 3 and the wavefront measurement unit 5. Thus, the incident position of the light beams L4 on the wavefront measurement unit 5 is the same between the measurement of off-axis wavefront aberration and the measurement of axial wavefront aberration. As a result, it is possible to measure axial wavefront aberration and off-axis wavefront aberration without changing the position of the wavefront measurement unit 5.

For switching from the state in which axial wavefront aberration is measured to the state in which off-axis wavefront aberration is measured, the subject optical system 10 may shift in the direction perpendicular to the measurement axis 7. In this case, the movement amount necessary to shift the subject optical system 10 is substantially the same as an effective aperture of the subject optical system 10. Since this movement amount is not so large, it is possible to finish the movement of the subject optical system 10 in a short period of time.

Further, since there is no need to change the position of the wavefront measurement unit 5, the time necessary to measure off-axis wavefront aberration is very short. Thus, it is possible to make a measurement of off-axis wavefront aberration by a simple configuration in a short period of time. By changing the movement amount if necessary, the measurement time can be further reduced.

A wavefront measurement apparatus of a second embodiment is described. The wavefront measurement apparatus of the second embodiment includes a light source unit, a holding unit, a first moving mechanism, a light reception optical system, a wavefront measurement unit, and a wavefront data generation unit. The light source unit is disposed on one side of a measurement axis. The wavefront measurement unit is disposed on the other side of the measurement axis. The holding unit is disposed between the light source unit and the wavefront measurement unit. The light reception optical system is disposed between the holding unit and the wavefront measurement unit. The holding unit has an opening portion configured to hold a subject optical system. The light source unit is configured to apply light beams toward the subject optical system. The wavefront measurement unit is configured to measure light beams transmitted through the subject optical system. The wavefront data generation unit is configured to generate wavefront aberration data from results of the measurement by the wavefront measurement unit. A neighborhood of the opening portion and a neighborhood of the wavefront measurement unit are made to be optically conjugate with each other by the light reception optical system. The first moving mechanism is configured to move the subject optical system to a plurality of positions around the measurement axis. A transmission region of the light beam in the subject optical system is different at each of the plurality of positions. The wavefront measurement unit is configured to measure a light beam transmitted through the subject optical system at each of the plurality of positions. The wavefront data generation unit is configured to generate wavefront aberration data from result of the measurement at each of the plurality of positions.

Also in the wavefront measurement apparatus of the second embodiment, it is preferable that the opening portion, the light reception optical system, and the wavefront measurement unit be positioned such that the opening portion is conjugate with the wavefront measurement unit. It is further preferable that the opening portion, the light reception optical system, and the wavefront measurement unit be positioned such that a rear principal point of the subject optical system is conjugate with the wavefront measurement unit.

Figure 5:
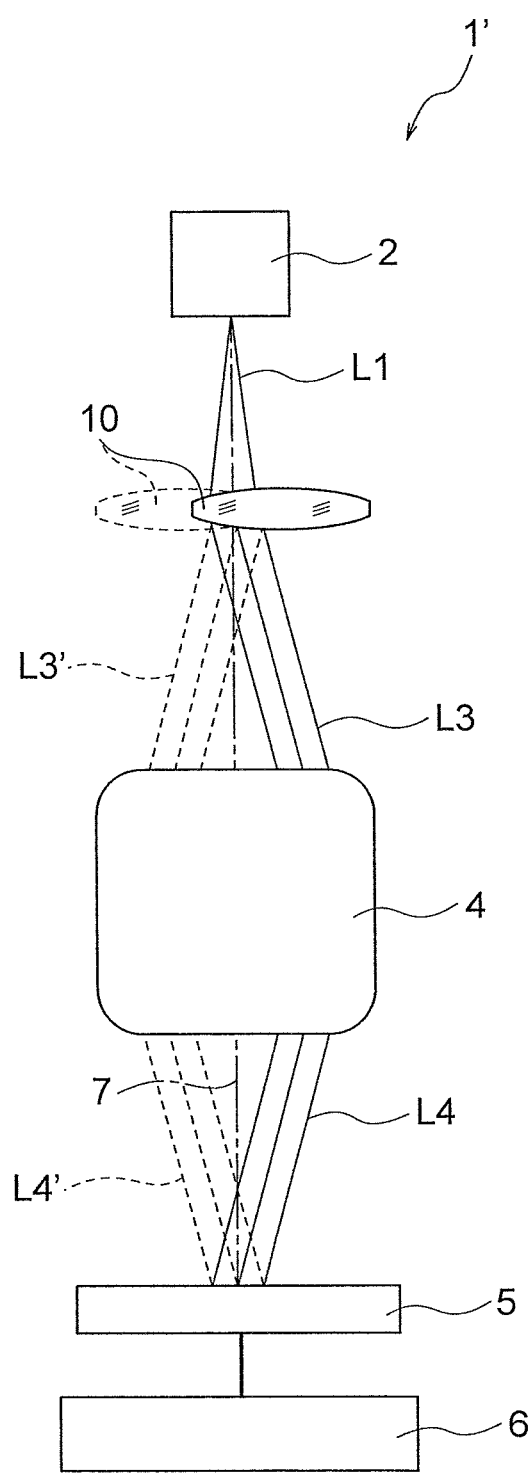
FIG. 5 is a diagram illustrating a wavefront measurement apparatus of a second embodiment.

FIG. 5 illustrates the wavefront measurement apparatus of the second embodiment. A wavefront measurement apparatus 1' includes a light source unit 2, a holding unit 3, a first moving mechanism 40, a light reception optical system 4, a wavefront measurement unit 5, and a wavefront data generation unit 6. The same configuration as in the wavefront measurement apparatus 1 illustrated in FIG. 1 is denoted by the same reference number, and its detailed description is omitted.

Figure 6:
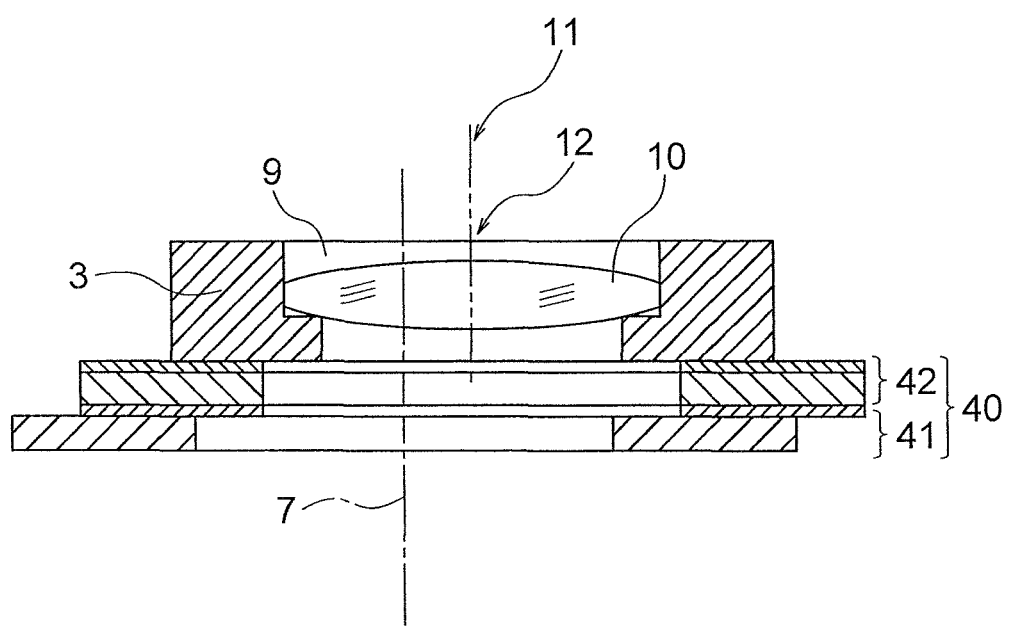
FIG. 6 is a diagram illustrating an example of a first moving mechanism.

The wavefront measurement apparatus 1' has a first moving mechanism. FIG. 6 illustrates an example of the first moving mechanism. A first moving mechanism 40 includes a moving stage 41 and a moving stage 42. Each of the moving stage 41 and the moving stage 42 is a stage configured to move in one direction.

In the first moving mechanism 40, the moving stage 41 and the moving stage 42 are disposed such that the movement direction of the moving stage 41 and the movement direction of the moving stage 42 are orthogonal to each other. By doing this, the subject optical system 10 can be moved to various positions within a plane orthogonal to the measurement axis 7.

As a result, the wavefront measurement apparatus 1' can move the subject optical system 10 to a plurality of positions around the measurement axis 7. Furthermore, it is possible to make different a transmission region of a light beam in the subject optical system 10 at each of the plurality of positions.

Here, in the wavefront measurement apparatus of the present embodiment, it is preferable that the first moving mechanism be configured to rotate the subject optical system to change the transmission region.

Figure 7A:
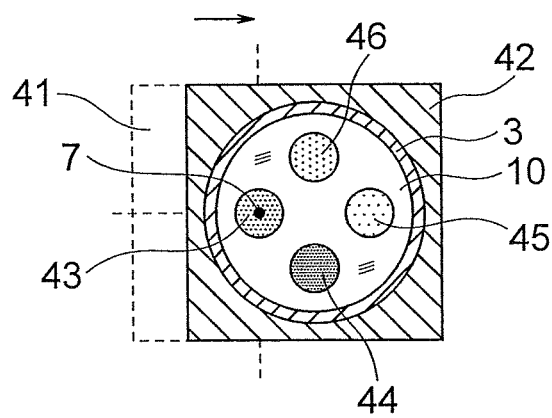
FIG. 7A, FIG. 7B, FIG. 7C, and FIG. 7D are diagrams illustrating a change of a transmission region of a light beam in the subject optical system, where
Figure 7B:
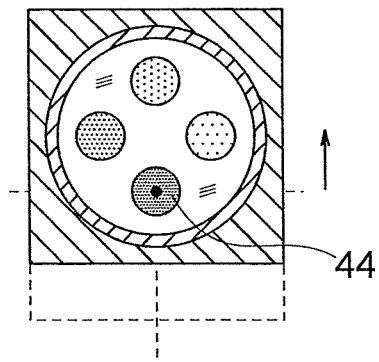
Figure 7C:
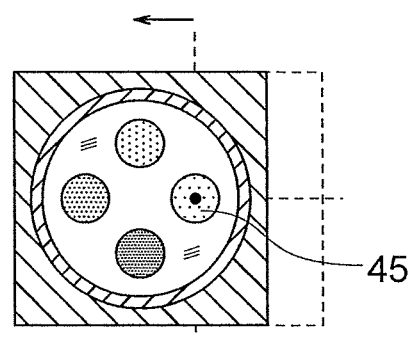
Figure 7D:
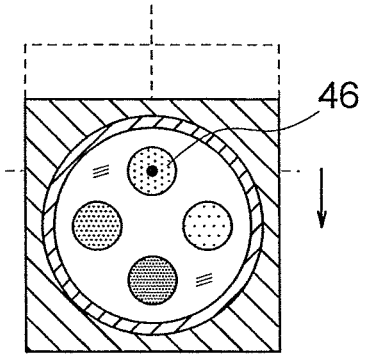

FIG. 7A, FIG. 7B, FIG. 7C, and FIG. 7D are diagrams illustrating a change of a transmission region of a light beam in the subject optical system. FIG. 7A is a diagram illustrating a transmission region at a first position. FIG. 7B is a diagram illustrating a transmission region at a second position. FIG. 7C is a diagram illustrating a transmission region at a third position. FIG. 7D is a diagram illustrating a transmission region at a fourth position.

In FIG. 7A, FIG. 7B, FIG. 7C, and FIG. 7D, the positions indicated by the broken lines are initial positions of the first moving mechanism 40. Each of the moving stage 41 and the moving stage 42 includes a fixed portion and a moving portion. By moving the moving portion with respect to the fixed portion, an object placed on the moving portion can be moved. Thus, in FIG. 7A, FIG. 7B, FIG. 7C, and FIG. 7D, the positions indicated by the broken lines represent the positions of the fixed portion of the moving stage 41 or the fixed portion of the moving stage 42.

As illustrated in FIG. 7A, the first position is a position obtained by moving the subject optical system 10 rightward in the figure from its initial position. At this position, a region 43 is located on the measurement axis 7. Thus, a light beam L1 passes through the region 43.

As illustrated in FIG. 7B, the second position is a position obtained by moving the subject optical system 10 upward in the figure from its initial position. At this position, a region 44 is located on the measurement axis 7. Thus, the light beam L1 passes through the region 44.

As illustrated in FIG. 7C, the third position is a position obtained by moving the subject optical system 10 leftward in the figure from its initial position. At this position, a region 45 is located on the measurement axis 7. Thus, the light beam L1 passes through the region 45.

As illustrated in FIG. 7D, the fourth position is a position obtained by moving the subject optical system 10 downward in the figure from its initial position. At this position, a region 46 is located on the measurement axis 7. Thus, the light beam L1 passes through the region 46.

In this manner, by using the first moving mechanism 40, it is possible to make different the transmission region of the light beam in the subject optical system 10 at each of the plurality of positions.

Figure 8:
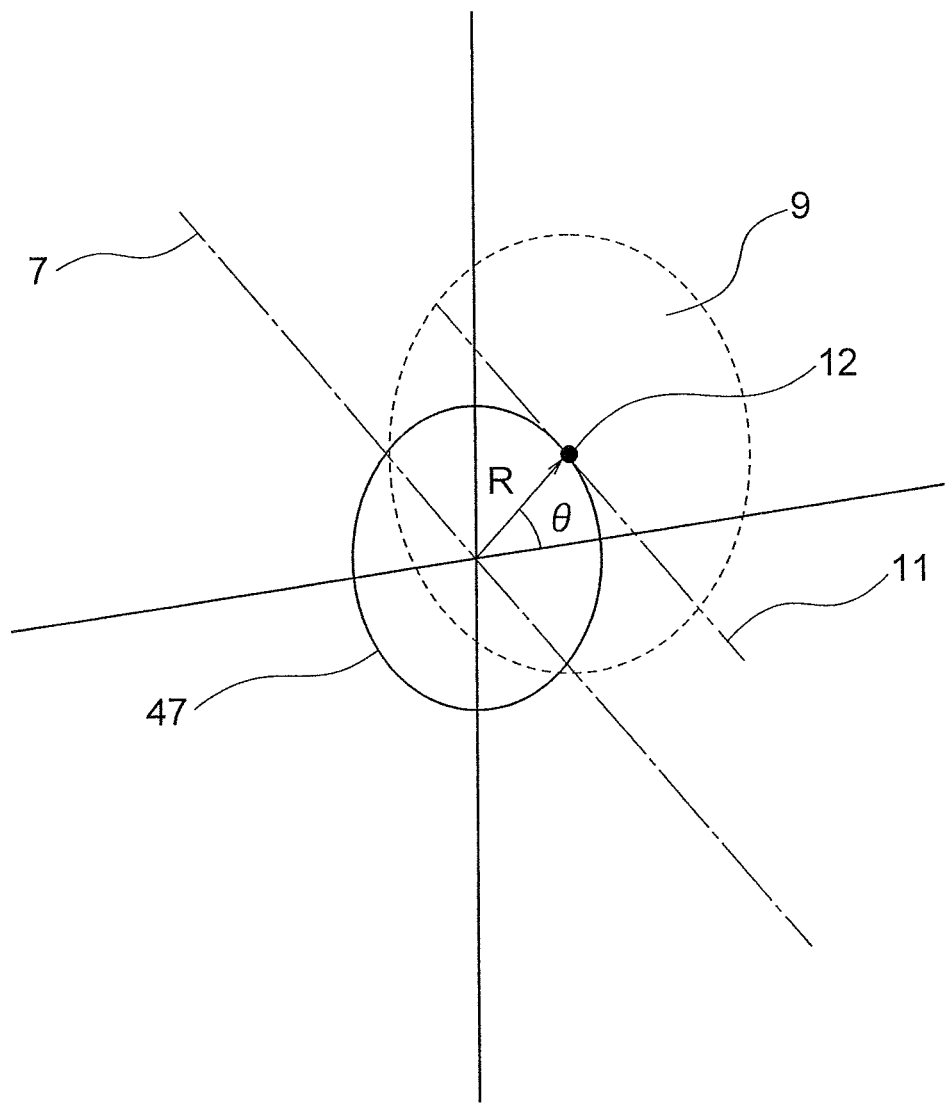
FIG. 8 is a diagram illustrating how the opening portion moves.

The subject optical system 10 is inserted in an opening portion 9. Thus, how the subject optical system 10 moves can be grasped from how the opening portion 9 moves. FIG. 8 is a diagram illustrating how the center of the opening portion moves.

In FIG. 8, the opening portion 9 is indicated by the broken line, and a moving locus 47 is indicated by the solid line. The moving locus 47 represents how a center 12 of the opening portion 9 moves. The moving locus 47 matches with the circumference of a circle centered at the measurement axis 7. In the opening portion 9, since the subject optical system 10 is inserted, the subject optical system 10 also moves on the circumference of the circle centered at the measurement axis 7. In this manner, by using the first moving mechanism 40, it is possible to rotate the subject optical system 10 along the moving locus 47. By doing this, the transmission region of the light beam in the subject optical system 10 is changed.

Moreover, in the wavefront measurement apparatus of the present embodiment, it is preferred that the first moving mechanism be configured to move the subject optical system with respect to the measurement axis in a revolution orbit, and the wavefront measurement unit be configured to acquire wavefront aberration data while the subject optical system moves in the revolution orbit.

As described above, the moving locus 47 matches with the circumference of the circle centered at the measurement axis 7. Since the movement along the circumference is a locus indicating revolution, the opening portion 9 is made to be revolved around the measurement axis 7. Since the subject optical system 10 is inserted in the opening portion 9, the subject optical system 10 also revolves around the measurement axis 7. It can be said that the moving locus 47 represents a revolution locus and the measurement axis 7 is a revolution axis.

By using the first moving mechanism 40, it is possible to move the subject optical system 10 in the revolution orbit. Moreover, by moving the subject optical system 10 discretely, it is possible to stop the subject optical system 10 at a plurality of positions on the revolution orbit. By doing this, it is possible to acquire wavefront aberration data at the plurality of positions while the subject optical system 10 moves in the revolution orbit.

In the wavefront measurement apparatus 1', the subject optical system 10 is moved to the plurality of positions around the measurement axis 7. This movement can be expressed by a vector. As illustrated in FIG. 8, the magnitude of the shift amount of the subject optical system 10 is represented by R. The magnitude R of the shift amount is a magnitude with reference to the measurement axis 7.

For the purpose of indicating the amount and direction of shift, the movement of the subject optical system 10 is expressed by a vector whose origin is a point on the measurement axis 7. This vector is referred to as "revolution shift vector". When the subject optical system 10 is shifted in the X direction, the revolution shift vector is expressed by (R, 0). When the subject optical system 10 shifts in the Y direction, on the other hand, the revolution shift vector is expressed by (0, R). Moreover, provided that the angle around the measurement axis is represented by θ, when the subject optical system 10 is shifted in the θ direction, the revolution shift vector is expressed by (R cos θ, R sin θ).

The subject optical system 10 is shifted in a manner that θ is changed to 350 degrees in increments of 10 degrees, such as 0 degrees, 10 degrees, and 20 degrees. This motion of the subject optical system 10 is referred to as "revolution", and θ is referred to as "revolution angle". However, the increments of shifting the subject optical system 10 are not necessarily required to be 10 degrees.

At each position at which the subject optical system 10 is shifted, a light beam transmitted through the subject optical system is measured by the wavefront measurement unit 5. Then, in the wavefront data generation unit 6, wavefront aberration data is generated from results measured at the positions.

Moreover, by moving the subject optical system in the revolution orbit, it is possible to make a measurement of off-axis wavefront aberration easily at each revolution angle during the revolution. The off-axis wavefront aberration measurement data obtained in this way can be used to check the presence/absence of abnormality over the circumferential direction of the subject optical system.

Moreover, a light beam may be transmitted through a half or more of the effective diameter of the subject optical system by a light projection optical system. In this manner, the presence/absence of abnormality can be checked over the entire effective diameter of the subject optical system in the measurement of off-axis wavefront aberration during the revolution.

In the wavefront measurement apparatus of the first embodiment and the wavefront measurement apparatus of the second embodiment (hereinafter referred to as "wavefront measurement apparatus of the present embodiment"), it is preferable that the light reception optical system include at least a front optical system located closest to the light source unit and a rear optical system located closest to the wavefront measurement unit, and a rear focus position of the front optical system and a position of front focal point of the rear optical system be aligned with each other or be conjugate with each other.

Figure 13:
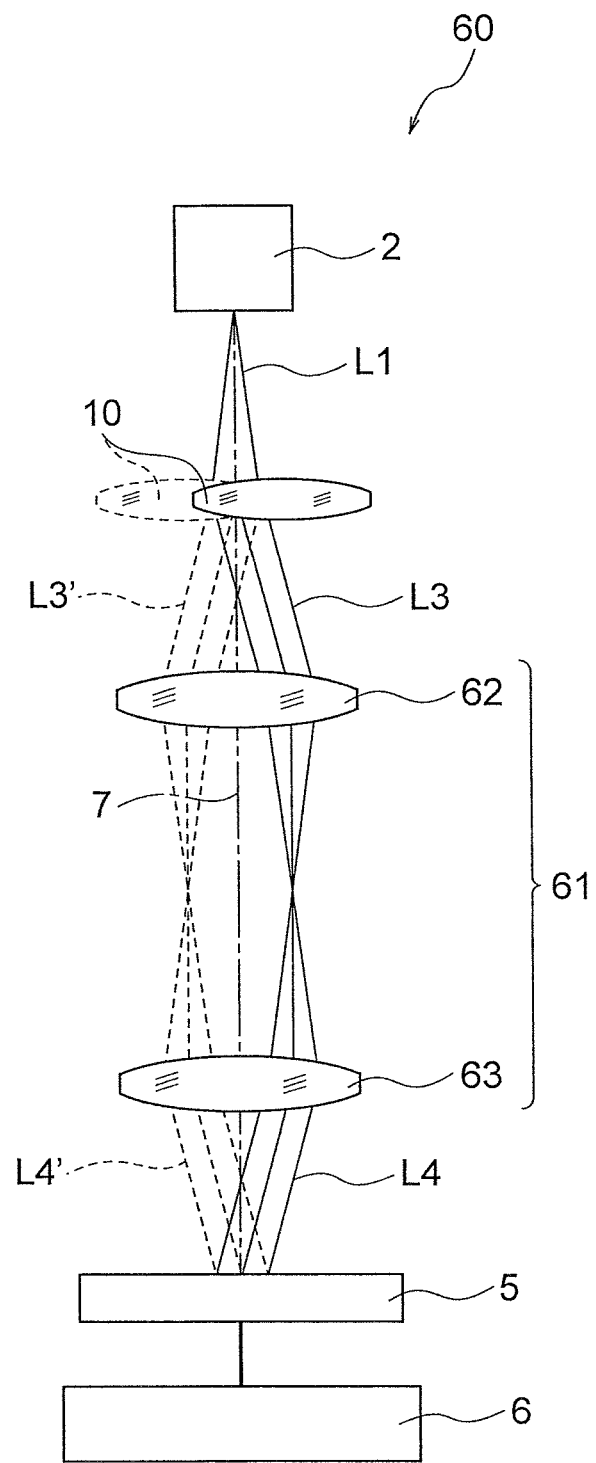
FIG. 13 is a diagram illustrating a configuration of a light reception optical system.

FIG. 13 is a diagram illustrating a configuration of the light reception optical system. The same components as those in the wavefront measurement apparatus 1' illustrated in FIG. 5 are denoted by the same reference numerals, and detailed descriptions thereof are omitted.

The light reception optical system can be formed of two or more optical systems. In a wavefront measurement apparatus 60, the light reception optical system is formed of two optical systems. Specifically, a light reception optical system 61 is formed of a lens 62 and a lens 63. The lens 62 is located closest to the light source unit 2, and the lens 63 is located on the wavefront measurement unit 5 side. Thus, the lens 62 corresponds to a front optical system, and the lens 63 corresponds to a rear optical system.

In the wavefront measurement apparatus 60, since the light reception optical system 61 is formed of the lens 62 and the lens 63, the rear focus position of the lens 62 and the position of front focal point of the lens 63 are aligned with each other. Thus, the light reception optical system 61 is an optical system having an infinite focal length.

Here, in the wavefront measurement apparatus of the present embodiment, it is preferable that a light reception optical system and a wavefront measurement unit be positioned such that the rear focus position of the lens 63 is aligned with the wavefront measurement unit.

Since the rear focus position of the lens 62 and the position of front focal point of the lens 63 are aligned with each other, the position of front focal point of the lens 62 and the wavefront measurement unit 5 are made to have an optically conjugate relation when the wavefront measurement unit 5 is made to be aligned with the rear focus position of the lens 63.

Furthermore, in the wavefront measurement apparatus of the present embodiment, it is preferable that a holding unit and a reception optical system be positioned such that an opening portion is aligned with the position of front focal point of the lens 62.

When the subject optical system 10 is inserted in the opening portion 9, the subject optical system 10 is located in the neighborhood of the position of front focal point of the lens 62. As a result, the subject optical system 10 and the wavefront measurement unit 5 are made to have a substantially optically conjugate relation. Thus, light beams L3 and L3' that have exited from the subject optical system 10 are guided to the wavefront measurement unit 5.

Furthermore, in the wavefront measurement apparatus of the present embodiment, it is preferable that the subject optical system and the light reception optical system be positioned such that the rear principal point of the subject optical system is aligned with the position of front focal point of the lens 62.

With this configuration, the subject optical system 10 and the wavefront measurement unit 5 are made to have an optically conjugate relation. Thus, the light beam L3 and L3' that have exited from the subject optical system 10 are always guided to the wavefront measurement unit 5.

Specifically, the light beams L3 and L3' enter the lens 62 and are then refracted by the lens 62. The subject optical system 10 is disposed in the neighborhood of the position of front focal point of the lens 62 or at the position aligned with the position of front focal point of the lens 62. Thus, the light beams that have exited from the lens 62 are condensed at the rear focus position of the lens 62. Moreover, a center ray of the light beams that have exited from the lens 62 is substantially parallel to the measurement axis 7.

Light beams that have passed through the rear focus position of the lens 62 become diverging light beams and enter the lens 63. As described above, the rear focus position of the lens 62 is aligned with the position of front focal point of the lens 63. Thus, light beams that have entered the lens 63 become parallel light beams and exit from the lens 63. Light beams L4 and L4' that have exited from the lens 63 approach the measurement axis 7 so as to intersect with the measurement axis 7. As a result, the light beams L4 and L4' can be caused to enter the wavefront measurement unit 5.

As described above, the subject optical system 10 and the wavefront measurement unit 5 are made to have an optically conjugate relation by the light reception optical system 61. Thus, it is possible to make the light beams L3 and L3' that have exited from the subject optical system 10 to be entered to the wavefront measurement unit 5 irrespective of the travel directions of the light beams L3 and L3'.

Moreover, the wavefront at the position of the wavefront measurement unit 5 and the wavefront immediately after exiting from the subject optical system 10 are maintained to be the same shape. In other words, the wavefront shape immediately after exiting from the subject optical system 10 is reproduced to the wavefront measurement unit 5.

Moreover, a relay optical system may be disposed between the lens 62 and the lens 63. In the case where the relay optical system is disposed, a rear focus position of the lens 62 and a position of front focal point of the lens 63 are made to have an optically conjugate relation. With this configuration, it is possible to obtain the same function and effect as those when the rear focus position of the lens 62 and the position of front focal point of the lens 63 are aligned with each other.

In the case where an SH sensor is used for the wavefront measurement unit 5, the number of microlens arrays determines spatial resolution of the wavefront shape. Thus, wavefront aberration can be measured more accurately as the number of microlens arrays occupied in the light beam becomes larger. Even when the diameter of the light beam L3 after being transmitted through the subject optical system 9 is small, a sufficient number of microlens arrays can be used by increasing the diameter of the light beam L4 entering the wavefront measurement unit 5 by the light reception optical system 4.

For example, when the focal length of the lens 62 is 60 mm and the focal length of the lens 63 is 120 mm, the magnification of the light reception optical system 4 is 2 (120/60=2), and the diameter of the light beam L4 entering the wavefront measurement unit 5 can be increased by the reception optical system 4 to be twice as large as the diameter of the light beam L3 that have been transmitted through the subject optical system 9.

When a ray angle of the light beam that has been transmitted through the subject optical system 9 is large, if the ray angle of the light beam entering each lens of the microlens array is large, the light beam does not always fall within an image pickup element. The ray angle is an angle formed by a ray forming the light beam and the measurement axis 7.

When aberration of the wavefront immediately after exiting from the subject optical system 10 is large, the ray angle of each ray corresponding to a ray entering each lens of the microlens array is greatly changed, thus a large fluctuation in intervals of spot images projected on the image pickup element 32 is caused, and it becomes difficult to analyze wavefront aberration.

For example, when the focal length of the lens 62 is 60 mm and the focal length of the lens 63 is 120 mm, the magnification of the light reception optical system 4 is 2 (120/60=2), and the ray angle of the light beam L4 can be reduced to ½ of the ray angle of the light beam L3 (due to Helmholtz Lagrange invariant).

In this manner, by changing the magnification of the light reception optical system 61, even when the ray angle of the light beam L3 is large and even when the ray angle for each ray corresponding to the beam entering each lens of the microlens array is greatly changed, the ray angle of the light beam L4 can be suppressed within a ray angle that can be measured by an SH sensor.

In the wavefront measurement apparatus 40, the light reception optical system 61 is a single focus optical system. Thus, at least one of the focal length of the lens 62 or the focal length of the lens 63 only needs to be changed in order to change the diameter of the light beam L4 entering the wavefront measurement unit 5. Specifically, at least one of the lens 62 or the lens 63 only needs to be replaced. By making such arrangement, it is possible to change the diameter of the light beam L4 entering the wavefront measurement unit 5.

The light reception optical system 61 may be a zoom optical system (afocal zoom). By making such arrangement, it is possible to change the diameter of the light beam L4 can be freely without replacing the lens forming the light reception optical system 61.

The case where an optical system having an infinite focal length is used for the light reception optical system has been described above. However, an optical system having a finite focal length may be used for the light reception optical system. In this case, the rear principal point of the subject optical system is aligned with a predetermined position in the light reception optical system, and the wavefront measurement unit of the subject optical system may be aligned with an image position at the predetermined position. The image position at the predetermined position is a position at which a real image of an object is formed when the object is disposed at the predetermined position in the light reception optical system.

Moreover, in the wavefront measurement apparatus of the present embodiment, it is preferable to dispose a light projection optical system between the light source unit and the holding unit. Here, it is preferable that the light projection optical system be configured to generate condensed light beam. Moreover, it is preferable that the light projection optical system and the holding unit be positioned such that the position of a condensing point of condensed light beams is aligned with the position of front focal point of the subject optical system.

Figure 14:
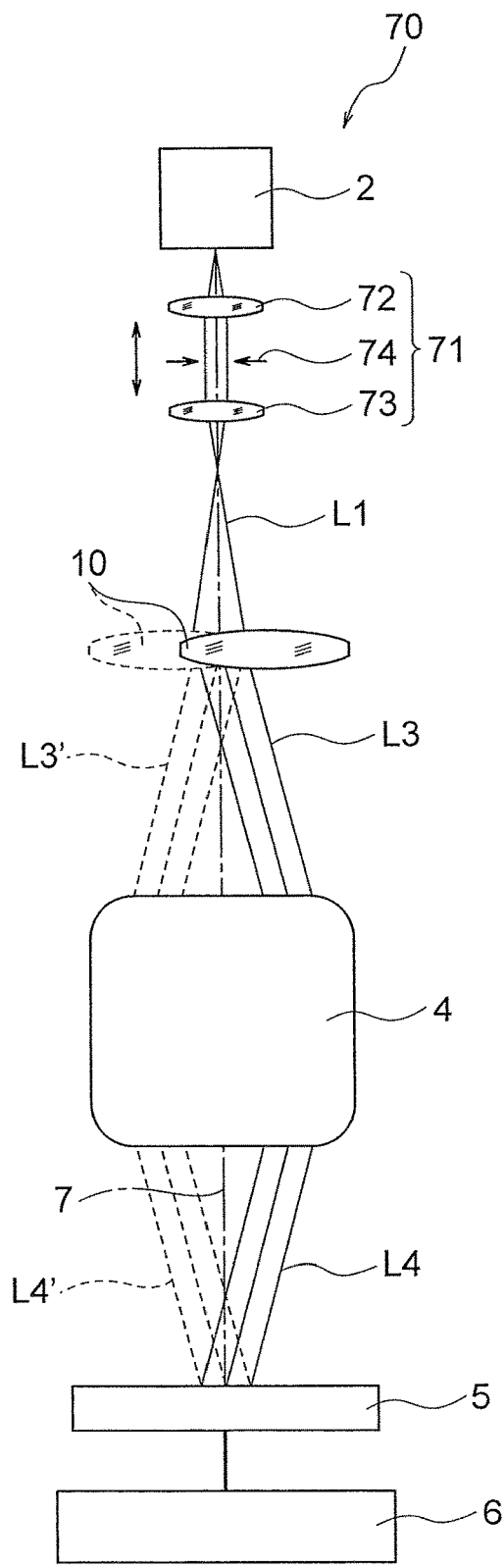
FIG. 14 is a diagram illustrating a configuration of a light projection optical system.

FIG. 14 is a diagram illustrating a configuration of the light projection optical system. The same components as those in the wavefront measurement apparatus 1' illustrated in FIG. 5 are denoted by the same reference numerals, and detailed descriptions are omitted. The configuration of the light projection optical system illustrated in FIG. 14 is a configuration which is used in a case where a subject optical system having positive refractive power is measured.

In a wavefront measurement apparatus 70, a light projection optical system 71 is disposed between the light source unit 2 and the holding unit 3. The light projection optical system 71 is formed of a lens 72 and a lens 73. In the light projection optical system 71, the rear focus position of the lens 72 and the position of front focal point of the lens 73 are aligned with each other. Thus, the light projection optical system 71 is an optical system having an infinite focal length.

Moreover, the light source unit 2 is located at the position of front focal point of the lens 72. More specifically, a light emitting region of the light source unit 2 is located at the position of front focal point of the lens 72. Thus, diverging light beams emitted from the light source unit 2 are converted into parallel light beams by the lens 72. The parallel light beams enter the lens 73 and are condensed by the lens 73.

In this example, the subject optical system 10 has positive refractive power. Thus, the front focus of the subject optical system 10 is located on the upper side of the light projection optical system 71 in the figure. For this reason, in the light projection optical system. 71, an image of the light emitting region of the light source unit 2 is formed on the upper side of the light projection optical system 71. As a result, it is possible to convert light beams L3 and L3' that have exited from the subject optical system 10 into parallel light beams.

By changing the focal length of the lens 72 and the focal length of the lens 73, the position of the image of the light emitting region, it is possible to set freely the size of the image of the light emitting region, and the numerical aperture at the image position of the light emitting region. Thus, lenses having focal lengths may be used for the lens 72 and the lens 73 depending on the subject optical system 9.

Moreover, the light projection optical system 71 may include an optical aperture 74. In the wavefront measurement apparatus 70, the optical aperture 74 is disposed between the lens 72 and the lens 73, more specifically, at the rear focus position of the lens 72. However, the position at which the optical aperture 74 is disposed is not limited to this position.

Light beams between the lens 72 and the lens 73 are parallel. For this reason, by changing the size of the opening portion of the optical aperture 74, it is possible to change the diameter of the parallel light beams entering the lens 73. As a result, it is possible to change the numerical aperture of condensed light beams that exit from the lens 35. Specifically, it is possible to change the light beam diameter of the light beam L2 entering the subject optical system 9. Thus, an optical aperture having an opening portion having a suitable size may be used for the optical aperture 74 depending on the subject optical system 9.

Figure 15:
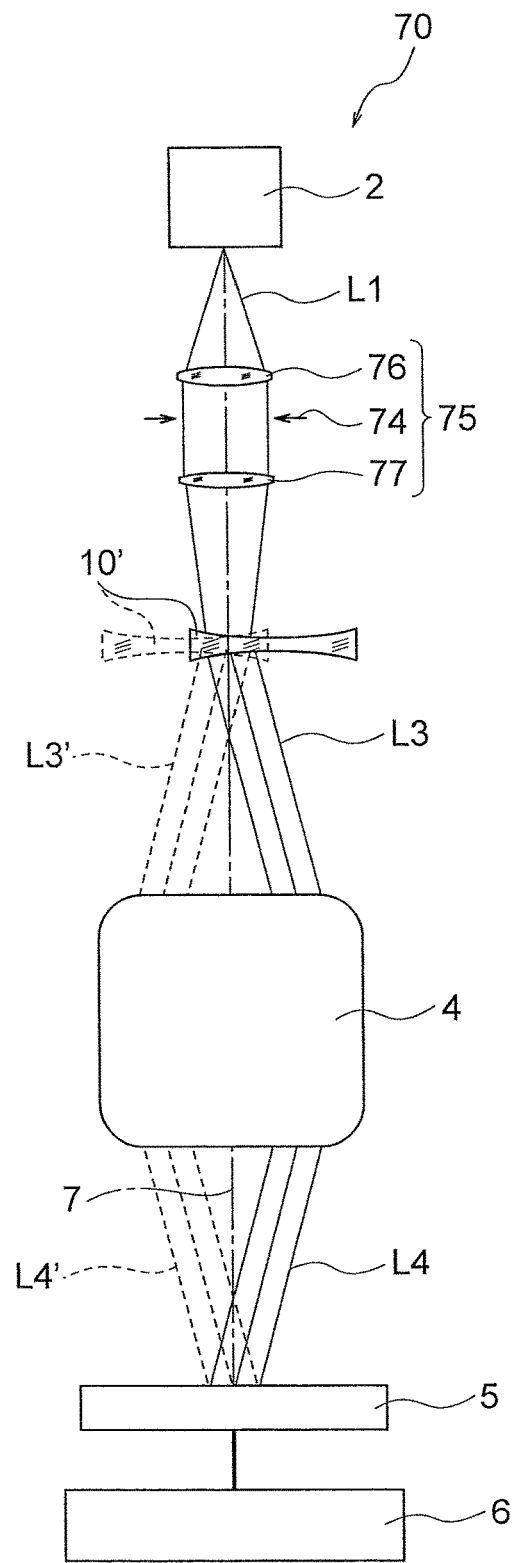
FIG. 15 is a diagram illustrating another configuration of the light projection optical system.

FIG. 15 is a diagram illustrating another configuration of the light projection optical system. The same components as those in the wavefront measurement apparatus 1' illustrated in FIG. 5 are denoted by the same reference numerals, and detailed descriptions are omitted. The configuration of the light projection optical system illustrated in FIG. 15 is a configuration which is used in a case where a subject optical system having negative refractive power is measured.

In a wavefront measurement apparatus 70, a light projection optical system 75 is disposed between the light source unit 2 and the holding unit 3. The light projection optical system 75 is formed of a lens 76 and a lens 77. In the light projection optical system 75, the rear focus position of the lens 76 and the position of front focal point of the lens 77 are aligned with each other. Thus, the light projection optical system 75 is an optical system having an infinite focal length.

Moreover, the light source unit 2 is located at the position of front focal point of the lens 76. More specifically, a light emitting region of the light source unit 2 is located at the position of front focal point of the lens 76. Thus, diverging light beams emitted from the light source unit 2 are converted into parallel light beams by the lens 76. The parallel light beams enter the lens 77 and are condensed by the lens 77.

In this example, a subject optical system 10' has negative refractive power. Thus, the front focus of the subject optical system 10' is located on the lower side of the subject optical system 10' in the figure. For this reason, in the light projection optical system 75, an image of the light emitting region of the light source unit 2 is formed on the lower side of the subject optical system 10'. As a result, it is possible to convert light beams L3 and L3' that have exited from the subject optical system 10' into parallel light beams.

The case where an optical system having an infinite focal length is used for the light projection optical system has been described above. However, an optical system having a finite focal length may be used for the light projection optical system. In this case, the light source unit may be aligned with a predetermined position in the light projection optical system, and the position of front focal point of the subject optical system may be aligned with an image position at the predetermined position. The image position at the predetermined position is a position at which a real image of an object is formed when the object is disposed at the predetermined position in the light projection optical system.

In the wavefront measurement apparatus of the present embodiment, it is preferable that the light projection optical system be capable of being driven in the direction of the measurement axis.

By moving the light projection optical system 71 and the light projection optical system 75 in the direction along the measurement axis 7, a condensing point can be produced at any position on the measurement axis 7. Thus, for example, by moving the light projection optical system 71, a subject optical system 10' having negative refractive power can be measured similarly to the light projection optical system 75. It is preferable that the light source unit 2 be moved together with the light projection optical system 71.

In the wavefront measurement apparatus of the present embodiment, it is preferable that the light projection optical system be a zoom lens.

By making such arrangement, a condensing point can be formed at any position on the measurement axis 7 without moving the light projection optical system 71 or the light projection optical system 75.

In the wavefront measurement apparatus of the present embodiment, it is preferable that the light projection optical system be coaxial with the light reception optical system.

It is preferable that the wavefront measurement apparatus of the present embodiment have a second moving mechanism, and the second moving mechanism be configured to rotate the subject optical system.

Figure 16:
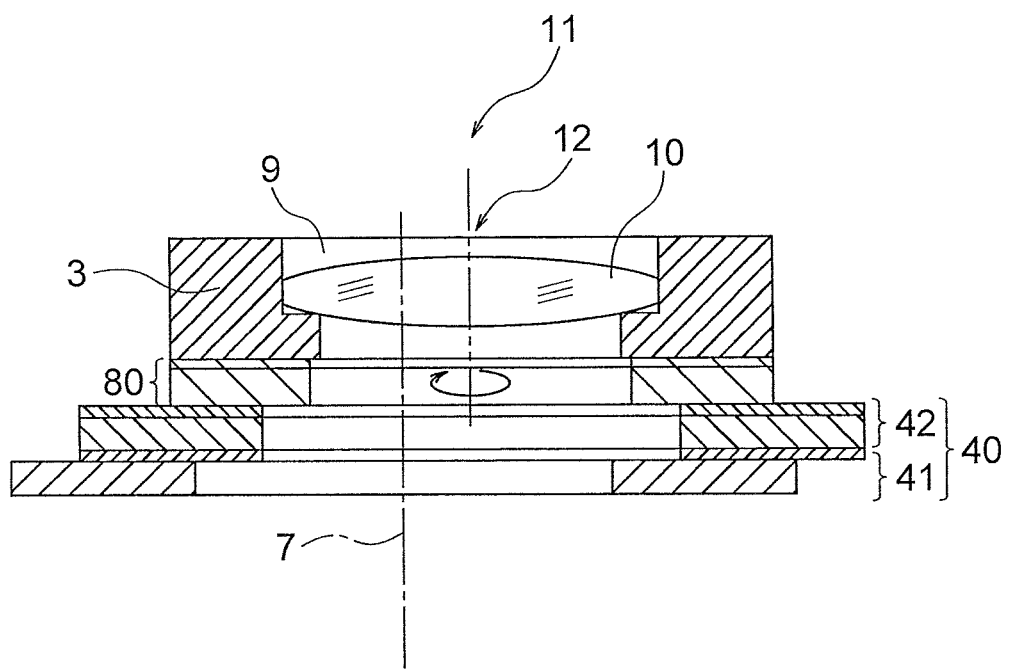
FIG. 16 is a diagram illustrating an example of a second moving mechanism.

FIG. 16 illustrates an example of the second moving mechanism. The same components as those in FIG. 6 are denoted by the same reference numerals, and detailed descriptions are omitted.

A second moving mechanism 80 is, for example, a rotating stage. The second moving mechanism 80 is disposed between the first moving mechanism 40 and the holding unit 3. When the second moving mechanism 80 is a rotating stage, the center axis of the rotating stage is aligned with the center axis 11 of the opening portion 9. Thus, by rotating the rotating stage, it is possible to rotate the subject optical system 10. Since the center axis of the rotating stage is the axis for rotating the subject optical system 10, it can be said to be a rotation axis.

It is preferable that the wavefront measurement apparatus of the present embodiment include a front-back inverting mechanism, and the front-back inverting mechanism be configured to rotate the subject optical system around a rotation axis that is an axis orthogonal to the measurement axis.

Figure 17A:
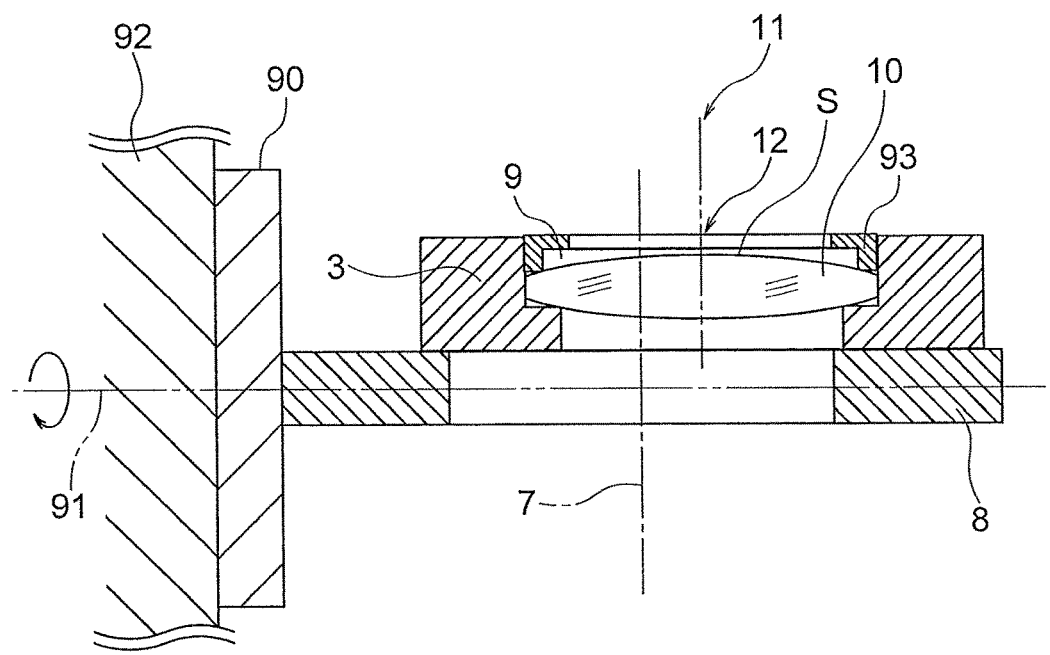
FIG. 17A and FIG. 17B are diagrams illustrating an example of a front-back inverting mechanism, where
Figure 17B:
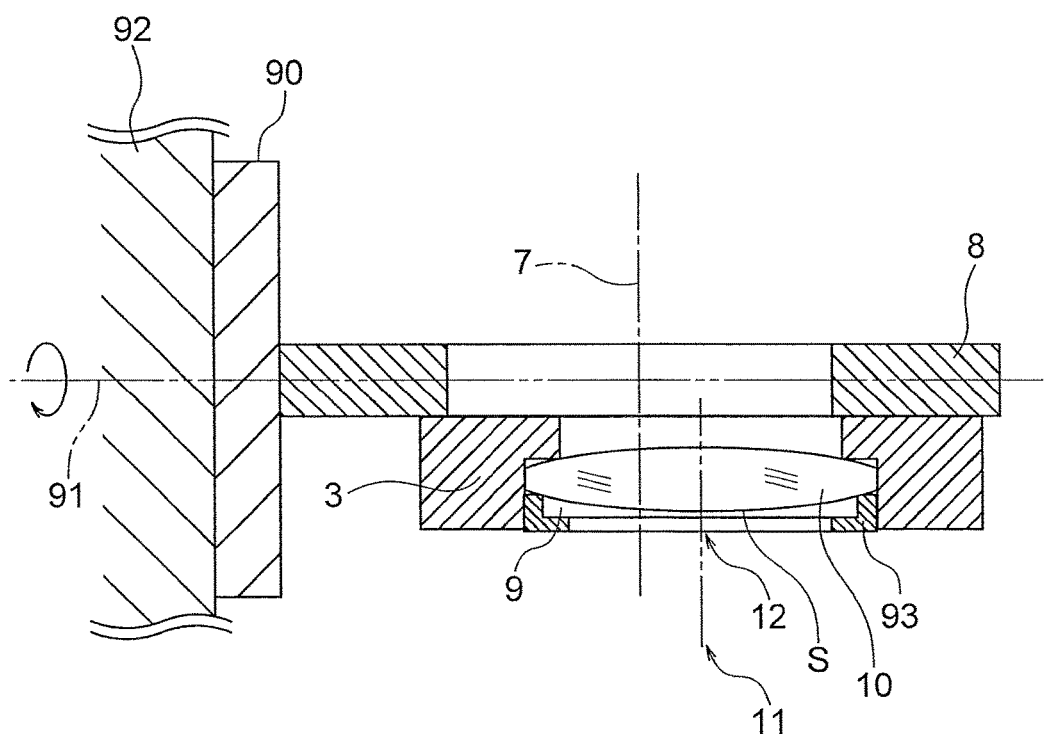

FIG. 17A and FIG. 17B are diagrams illustrating an example of the front-back inverting mechanism. FIG. 17A is a diagram illustrating the state before inverted. FIG. 17B is a diagram illustrating the inverted state. The same configuration as in FIG. 2 is denoted by the same reference numeral, and its detailed description is omitted.

A front-back inverting mechanism 90 is disposed between the main body unit 92 of the wavefront measurement apparatus and the stage 8. The front-back inverting mechanism 90 is, for example, a rotating stage. When the front-back inverting mechanism 90 is a rotating stage, the front-back inverting mechanism 90 is mounted to the main body unit 92 such that a center axis 91 of the rotating stage is orthogonal to the measurement axis 7.

By rotating the rotating stage, it is possible to invert the subject optical system 10. In FIG. 17A, a lens surface S of the subject optical system is located in the upward direction in the figure. By rotating the rotating stage by 180 degrees from this state, as illustrated in FIG. 17B, it is possible to make a state in which the lens surface S of the subject optical system 10 is oriented in the downward direction in the figure. The center axis 91 of the rotating stage is an axis for rotating the subject optical system 10, that is, a front-back inversion axis.

In FIG. 17A and FIG. 17B, the subject optical system 10 is pressed against the holding unit 3 by a frame member 93. Moreover, the holding unit 3 is fixed to the stage 8. By doing this, even when the subject optical system 10 is rotated, it is possible to prevent the holding unit 3 and the subject optical system 10 from falling off.

Figure 18A:
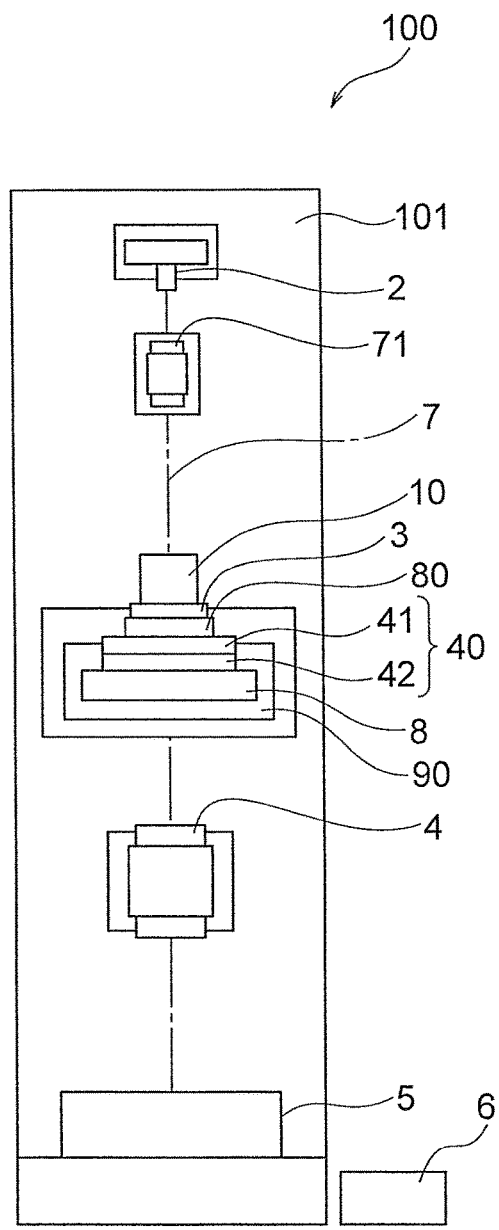
FIG. 18A and FIG. 18B are a diagram illustrating an overall configuration of a wavefront measurement apparatus.
Figure 18B:
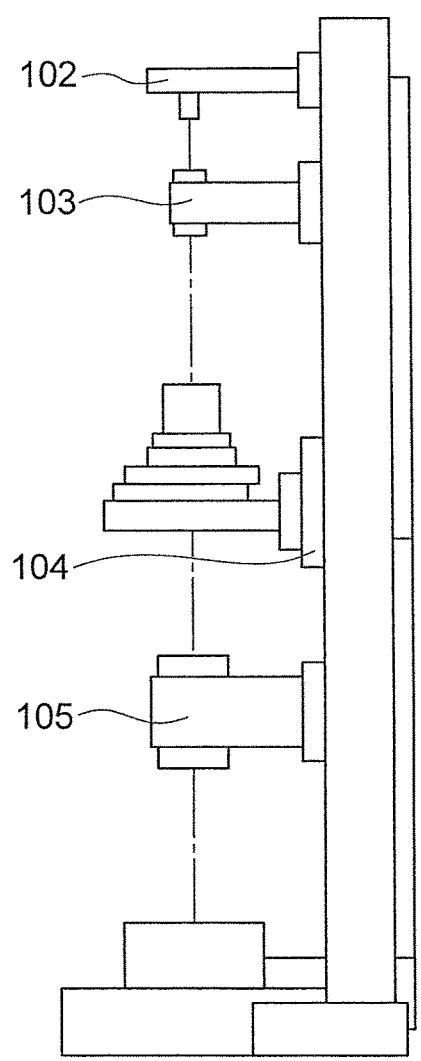

FIG. 18A and FIG. 18B illustrate an overall configuration of the wavefront measurement apparatus of the present embodiment. The same configurations as those illustrated in the drawings referred to above are denoted by the same reference numbers, and detailed descriptions are omitted.

A wavefront measurement apparatus 100 includes a main body unit 101. In the main body unit 101, the light source unit 2, the light projection optical system 71, the holding unit 3, the light reception optical system 4, the wavefront measurement unit 5, and the wavefront data generation unit 6 are provided.

The light source unit 2 is mounted to the main body unit 101 through a holding member 102. The light projection optical system 71 is mounted to the main body unit 101 through a holding member 103. The light reception optical system 4 is mounted to the main body unit 101 through a holding member 105.

The holding unit 3 is mounted to the second moving mechanism 80. The second moving mechanism 80 is mounted to the first moving mechanism 40. The first moving mechanism 40 is mounted to the stage 8. The stage 8 is mounted to the front-back inverting mechanism 90. The front-back inverting mechanism 90 is mounted to the main body unit 101 through a holding member 104.

In the wavefront measurement apparatus 100, it is possible to make a measurement of subject optical systems having various focal lengths. If the light reception optical system 4 is not replaced even when a subject optical system to be measured is changed, the position conjugate with the wavefront measurement unit 5 does not change. However, the position of the rear principal point of the subject optical system 10 changes each time a subject optical system to be measured is changed.

As described above, it is preferable that the rear principal point of the subject optical system 10 and the wavefront measurement unit 5 be made to have an optically conjugate relation. For this reason, it is preferable that the holding member 104 be provided with a moving mechanism.

By moving the subject optical system 10 with the moving mechanism of the holding member 104, the rear principal point of the subject optical system 10 and the wavefront measurement unit 5 can be made to have an optically conjugate relation.

In the case where an optical system having an infinite focal length is used for the light reception optical system 4, for example, as illustrated in FIG. 13, the light reception optical system 4 is formed of the lens 62 and the lens 63. In this case, by moving the subject optical system 10, the rear principal point position of the subject optical system 10 is made to be aligned with the position of front focal point of the lens 62.

In the case where an optical system having a finite focal length is used for the light reception optical system 4, by moving the subject optical system 10, the rear principal point position of the subject optical system 10 is made to be aligned with a position conjugate with the wavefront measurement unit 5.

When the position of the subject optical system 10 is changed, the position of front focal point of the subject optical system 10 changes. If the light projection optical system 71 is not replaced even when a subject optical system to be measured is changed, the condensing point generated by the light projection optical system 71 and the position of front focal point of the subject optical system 10 are not aligned with each other. For this reason, it is preferable that the holding members 102 and 103 be each provided with a moving mechanism.

By moving the light source unit 2 by the moving mechanism of the holding member 102 and moving the light projection optical system 71 by the moving mechanism of the holding member 103, it is possible to align with the condensing point generated by the light projection optical system 71 and the position of front focal point of the subject optical system 10.

In the case where an optical system having an infinite focal length is used for the light projection optical system 71, for example, as illustrated in FIG. 14, the light projection optical system 71 is formed of the lens 72 and the lens 73. In this case, by moving the holding light source unit 2 and the light projection optical system 71, the rear focus position of the lens 73 is made to be aligned with the position of front focal point of the subject optical system 10.

In the case where an optical system having a finite focal length is used for the light projection optical system 71, by moving the holding light source unit 2 and the light projection optical system 71, a condensing point formed by the light projection optical system 71 is made to be aligned with the position of front focal point of the subject optical system 10.

In the case where an optical system having a finite focal length is used for the light projection optical system 71, by simply moving the light projection optical system 71, the condensing point formed by the light projection optical system 71 can be aligned with the position of front focal point of the subject optical system 10 depending on cases.

The light source unit 2 is held by the holding member 102, and the light projection optical system 71 is held by the holding member 103. However, the light source unit 2 and the light projection optical system 71 may be held by the same holding member, and the holding member may have a moving mechanism.

The light projection optical system 71 may be replaced with another light projection optical system. Moreover, the light projection optical system 71 may be a zoom lens. Also in this case, condensing point generated by the light projection optical system 71 and the position of front focal point of the subject optical system 10 are not always aligned with each other. For this reason, as described above, by adjusting the position of the light source unit or the light projection optical system, condensing point generated by the light projection optical system 71 and the position of front focal point of the subject optical system 10 may be aligned with each other.

The light reception optical system 4 may be replaced with another light reception optical system. Moreover, the light reception optical system 4 may be a zoom lens. Also in this case, the position conjugate with the wavefront measurement unit 5 changes in some cases. Also in this case, the subject optical system 10 may move as described above. Moreover, if necessary, the light reception optical system 4 or the wavefront measurement unit 5 may move. By making such arrangement, the rear principal point of the subject optical system 10 and the wavefront measurement unit 5 can be made to have an optically conjugate relation.

A wavefront measurement method of the present embodiment is described. The wavefront measurement method of the present embodiment includes a step of making a neighborhood of a subject optical system and a neighborhood of a wavefront measurement unit to have an optically conjugate relation, an eccentricity driving step of driving the subject optical system to be eccentric with respect to a measurement axis of a wavefront measurement apparatus, and a wavefront data acquisition step of acquiring, by the wavefront measurement unit and a wavefront data generation unit, wavefront aberration data on a light beam transmitted through the subject optical system.

Prior to wavefront measurement, the subject optical system is set in the wavefront measurement apparatus. At this time, the subject optical system is set in the wavefront measurement apparatus such that the neighborhood of the subject optical system and the neighborhood of the wavefront measurement unit are made to have an optically conjugate relation. Furthermore, the subject optical system is set in the wavefront measurement apparatus such that the subject optical system is eccentric with respect to the measurement axis of the wavefront measurement apparatus.

After the subject optical system is set in the wavefront measurement apparatus, acquisition of wavefront aberration data on light beams transmitted through the subject optical system is made. The acquisition of the wavefront aberration data is specifically described.

Figure 19:
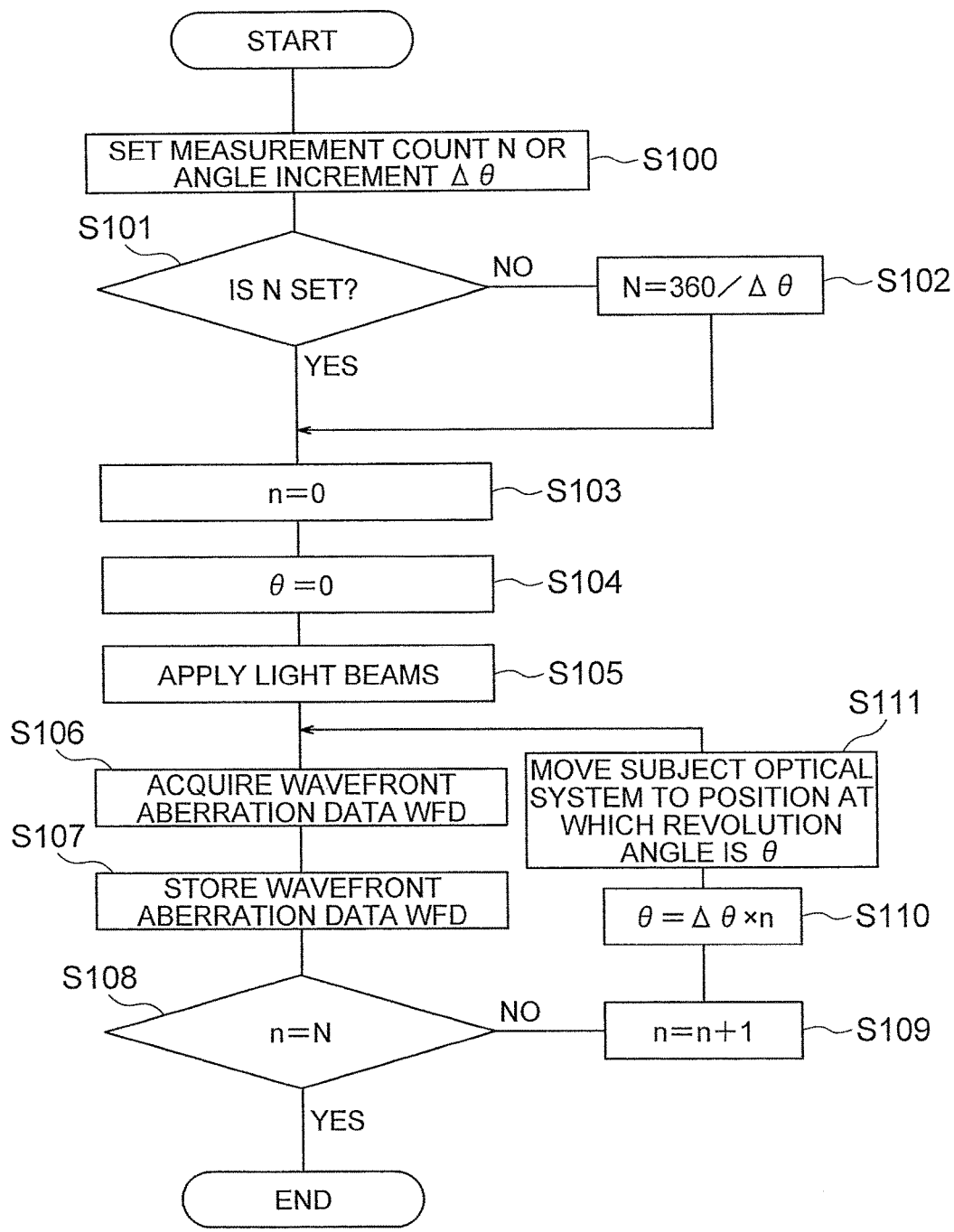
FIG. 19 is a flowchart of a wavefront measurement method of the first embodiment.

In the wavefront measurement method of the first embodiment, by revolving the subject optical system, off-axis wavefront aberration is measured. FIG. 19 is a flowchart of the wavefront measurement method of the first embodiment.

As described above, in the wavefront measurement apparatus of the present embodiment, the subject optical system is moved to a plurality of positions around the measurement axis, and a transmission region of a light beam in the subject optical system is made different at each of the plurality of positions. For this reason, in the wavefront measurement method of the first embodiment, at Step S100, the measurement count is set. At the setting the measurement count, is set by designating the measurement count may be designated, but an angle increment $\Delta\theta$ may be designated. The angle increment $\Delta\theta$ is the amount of change of the angle for shifting the subject optical system 10, such as 0 degrees, 10 degrees, and 20 degrees.

At Step S101, confirmation of the setting contents is executed. When the angle increment $\Delta\theta$ is set, the measurement count is determined from the angle increment $\Delta\theta$ at Step S102.

At Step S103, a parameter n indicating a measurement count is initialized. At Step S104, a parameter $\theta$ indicating a revolution angle is initialized. Then, Step S105 is executed. At Step S105, light beams are applied to the subject optical system.

In the first measurement, light beams are applied to the subject optical system in a state in which the subject optical system is set in the wavefront measurement apparatus, that is, in a state in which the revolve angle $\theta$ is 0. At Step S106, acquisition of wavefront aberration data WFD is executed using light beams transmitted through the subject optical system. At Step S107, storage of the acquired wavefront aberration data WFD is executed. By doing this, the first measurement is finished.

Subsequently, at Step S108, confirmation of the measurement count is executed. When the measurement count does not match with a set count, the measurement count is incremented by 1 at Step S109. Moreover, at Step S110, Δθ is added, and thereby new revolve angle θ is set.

At Step S111, movement of the subject optical system is executed on the basis of the newly set revolve angle θ. The new position of the subject optical system is a position corresponding to the revolve angle θ. Then, acquisition and storage of the wavefront aberration data WFD at the new position is executed.

Step S106 to Step S111 are repeated until the measurement count matches with the set count. When the measurement count matches with the set count, the measurement is finished.

In this manner, in the measurement method of the present embodiment, wavefront aberration data WFD at each revolve angle is acquired in the state before the subject optical system rotates, that is, in the state in which the subject optical system is first set in the wavefront measurement apparatus. In the case where a Shack-Hartmann sensor is used for the wavefront measurement unit, the same number of light spot images (hereinafter referred to as "spot group") as the number of microlenses are formed. By imaging the spot group by an image pickup element, position data is acquired for each spot of the spot group. When Δθ is 10 degrees, 36 pieces of wavefront aberration data WFD are acquired. No problem occurs if a slight axial deviation is present between the measurement axis and the revolution axis.

Figure 20:
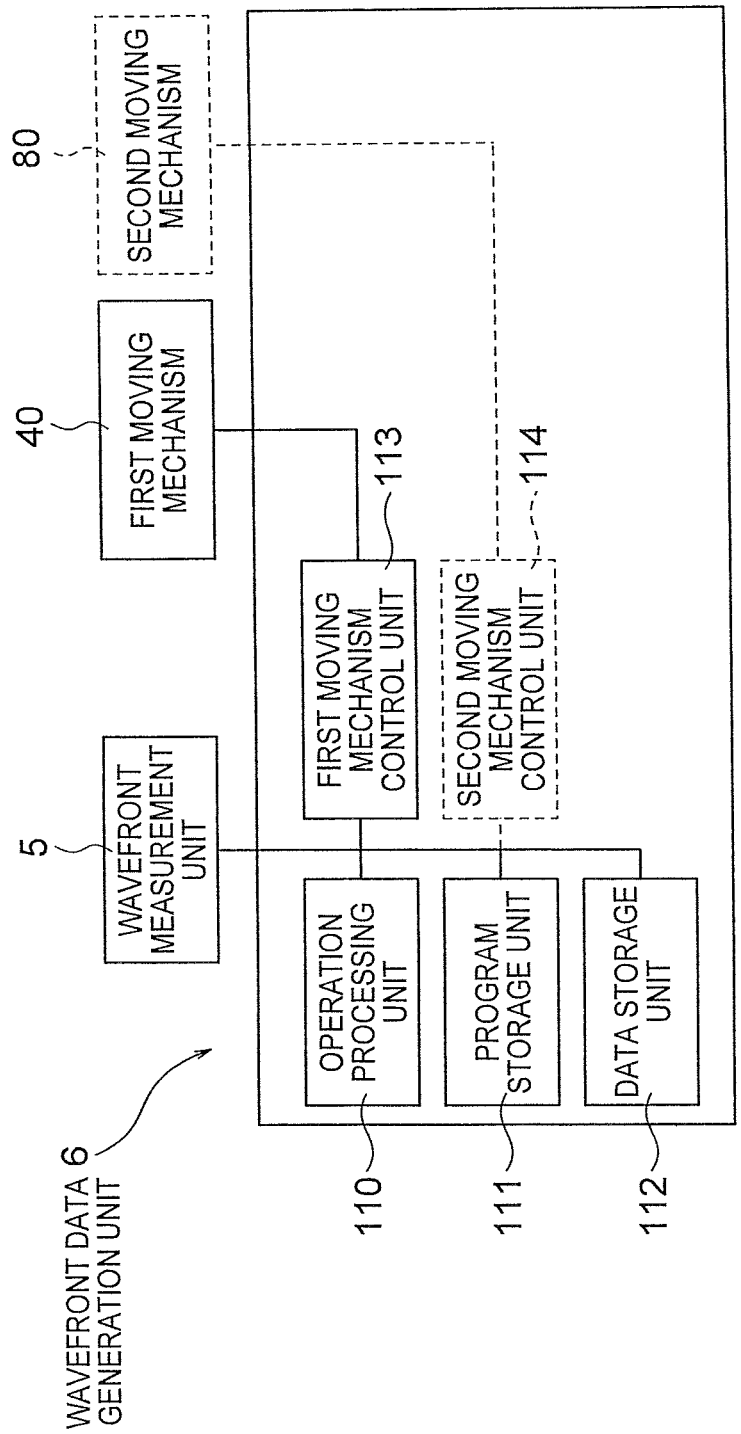
FIG. 20 is a diagram illustrating an example of a configuration of the wavefront data generation unit.

FIG. 20 illustrates an example of the configuration of the wavefront data generation unit. The wavefront data generation unit 6 includes an operation processing unit 110, a program storage unit 111, a data storage unit 112, and a first moving mechanism control unit 113. A second moving mechanism control unit 114 is described later in a wavefront measurement method of a second embodiment.

The operation processing unit 110 performs various kinds of operation and processing in accordance with a designated computer program.

The program storage unit 111 stores therein a computer program for executing predetermined processing in the operation processing unit 110. In the program storage unit 111, for example, a program for executing the processing of the flowchart illustrated in FIG. 19 is stored. This program may be read from outside the wavefront data generation unit 6. Thus, the program storage unit 111 may be omitted.

The data storage unit 112 stores therein wavefront aberration data WFD acquired by the wavefront measurement unit 5 and the results of processing performed by the operation processing unit 110.

The first moving mechanism control unit 113 controls the first moving mechanism 40 on the basis of an instruction from the operation processing unit 110. The subject optical system is moved by the first moving mechanism 40 to a position corresponding to a revolution angle θ.

In FIG. 20, the second moving mechanism control unit 114 and the second moving mechanism 80 are illustrated. In the wavefront measurement method of the first embodiment, however, the movement of the subject optical system is only revolution. Thus, to move the subject optical system, it may be sufficient that the first moving mechanism control unit 113 and the first moving mechanism 40 are provided, and the second moving mechanism control unit 114 and the second moving mechanism 80 are not necessary.

Figure 21:
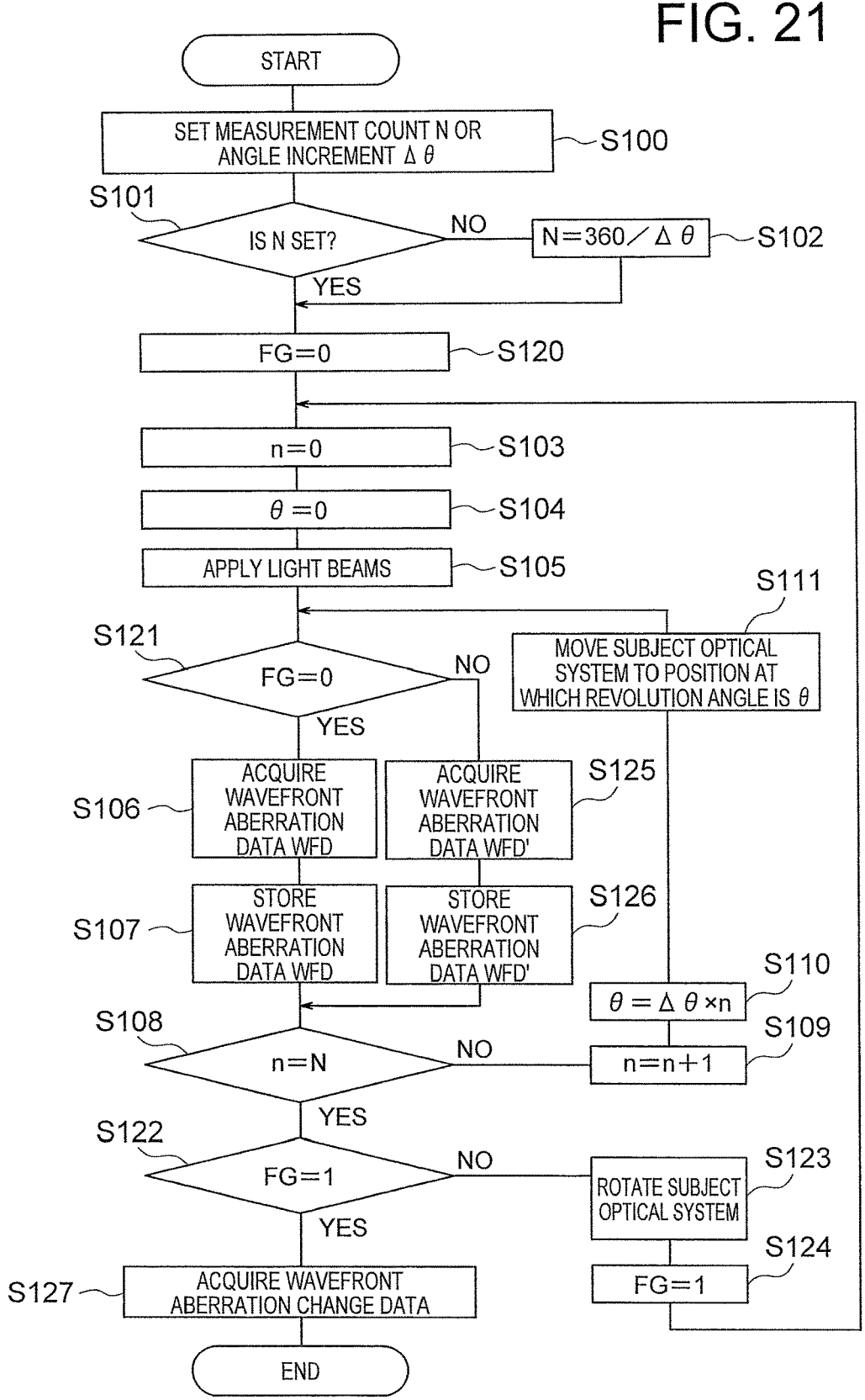
FIG. 21 is a flowchart of a wavefront measurement method of the second embodiment.

The wavefront measurement method of the second embodiment is a method of measuring off-axis wavefront aberration by revolving the subject optical system as well as by rotating. FIG. 21 is a flowchart of the wavefront measurement method of the second embodiment. The same processing as that in the flowchart of the wavefront measurement method of the first embodiment is denoted by the same reference numeral, and detailed descriptions are omitted.

Considering the measurement by the measurement method of the first embodiment as "off-axis wavefront aberration measurement by revolution", in the measurement method of the second embodiment, "off-axis wavefront aberration measurement by revolution" is performed while rotating the subject optical system. a state before rotating the subject optical system is referred to as "first state", and a state after rotating the subject optical system is referred to as "second state".

In the measurement method of the second embodiment, a parameter FG is used in order to distinguish between the first state and the second state. At Step S120, the parameter FG indicating a rotation state is initialized. A state in which the subject optical system is set in the wavefront measurement apparatus is the first state.

At Step S121, confirmation of the rotation state is executed. When the current state is the first state, Step S106 to Step S111 are repeated until the measurement count matches with a set count. When the measurement count matches with the set count, the measurement in the first state is finished.

After the measurement in the first state is finished, the flow proceeds to Step S122. At Step S122, confirmation of the rotation state is executed. When the current state is the first state, Step S123 is executed. At Step S123, rotation of the subject optical system is executed. It is preferable that the rotation angle be 180 degrees.

After the rotation is finished, at Step S124, 1 is set to the parameter FG in order to indicate the second state. Then, the flow returns to Step S103.

At Step S121, confirmation of the rotation state is executed. Since FG=1 is established, it is determined at Step S121 that the current state is the second state. By doing this, Step S125 and Step S126 are executed. At Step S125, acquisition of wavefront aberration data WFD' is executed using light beams transmitted through the subject optical system. At Step S126, storage of the acquired wavefront aberration data WFD' is executed. Acquisition and storage of the wavefront aberration data WFD' is repeatedly executed until the measurement count matches with the set count.

When the measurement count matches with the set count, the measurement in the second state is finished. After the measurement in the second state is finished, the flow proceeds to Step S127. At Step S127, acquisition of wavefront aberration change data is executed. At Step S127, the wavefront aberration data acquired in the first state is set as reference wavefront data, and the wavefront aberration data acquired in the second state is set as measurement wavefront data, thereby acquisition of the wavefront aberration change data associated with rotation is executed.

In the measurement method of the second embodiment, the subject optical system is rotated by 180 degrees, but the rotation angle is not limited to this value. No problem occurs if a slight axial deviation is present between the measurement axis and the rotation axis. No problem occurs if a slight axial deviation is present between the axis of the subject optical system and the rotation axis.

In this manner, in the measurement method of the second embodiment, wavefront aberration data WFD' is acquired at each revolution angle in a state after rotating the subject optical system in addition to the state before rotating the subject optical system. In the case where a Shack-Hartmann sensor is used for the wavefront measurement unit, position data is acquired for each spot of the spot group. When Δθ is 10 degrees, 36 pieces of wavefront aberration data WFD' are obtained even in the state after rotating the subject optical system. No problem occurs if a slight axial deviation is present between the measurement axis and the revolution axis.

The wavefront aberration data WFD before rotation of the subject optical system is set as reference wavefront aberration data and the wavefront aberration data WFD' after the rotation is set as measurement wavefront aberration data, thereby wavefront aberration change data is analyzed. The wavefront aberration change data is analyzed in the revolution angle state, that is, at each of the plurality of positions at which the wavefront aberration data WFD and WFD' are acquired. As a result, 36 pieces of wavefront aberration change data are acquired.

In order to implement the wavefront measurement method of the second embodiment, it is preferable that the wavefront measurement apparatus of the present embodiment include: a pre-rotation wavefront data acquisition control unit; a post-rotation wavefront data acquisition control unit; and a wavefront change data analysis unit, a first state be a state before the rotation by the second moving mechanism is performed, a second state be a state after the rotation by the second moving mechanism is performed, the pre-rotation wavefront data acquisition control unit be configured to move, in the first state, the subject optical system with respect to the measurement axis in a revolution orbit and store therein wavefront aberration data acquired at each of the plurality of positions in the revolution orbit, the post-rotation wavefront data acquisition control unit be configured to move, in the second state, the subject optical system with respect to the measurement axis in a revolution orbit and store therein wavefront aberration data acquired at each of the plurality of positions in the revolution orbit, and the wavefront change data analysis unit be configured to acquire wavefront aberration change data associated with the rotation by setting the wavefront aberration data acquired in the first state as reference wavefront data and setting the wavefront aberration data acquired in the second state as measurement wavefront data.

Figure 22:
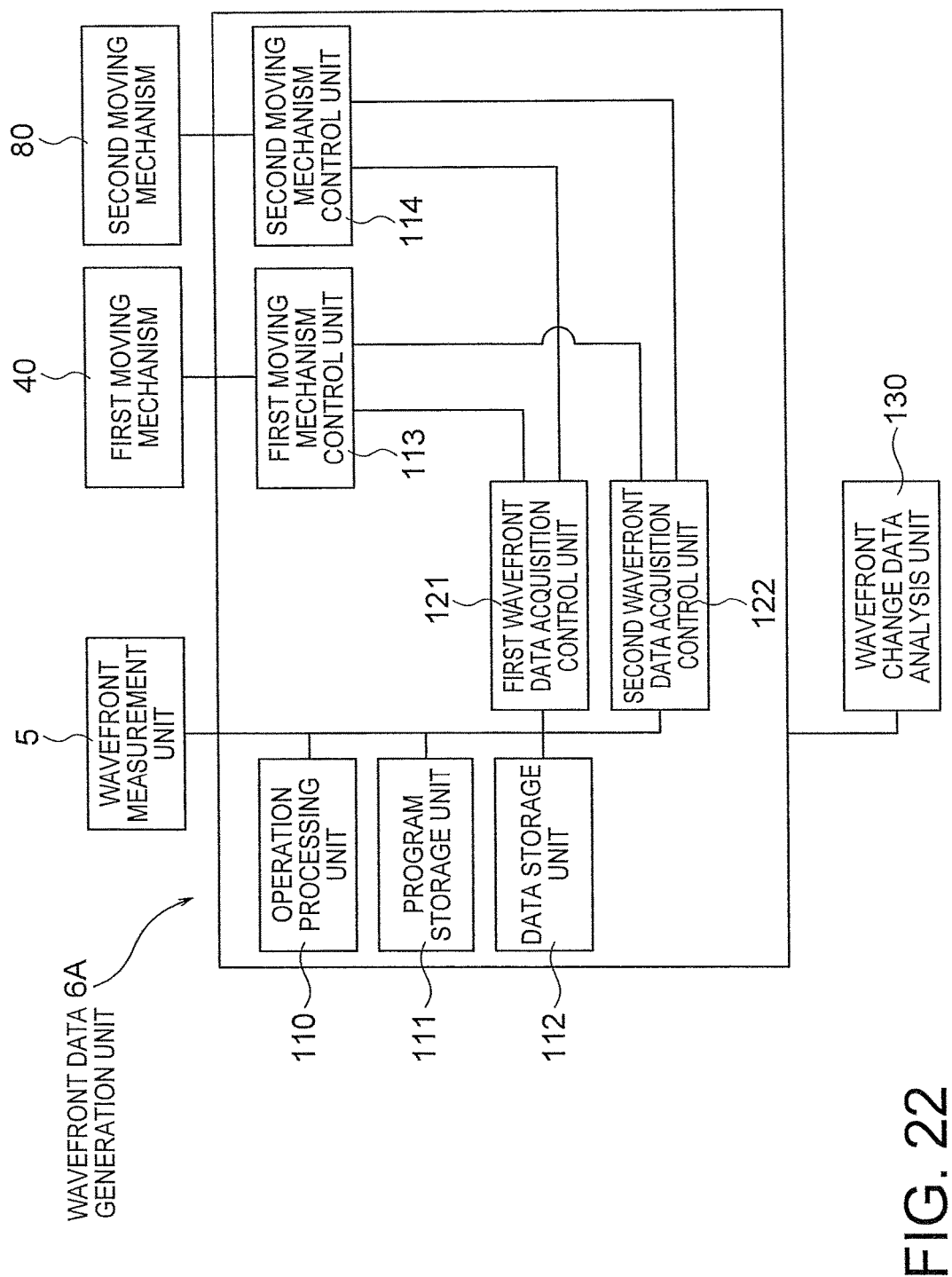
FIG. 22 is a diagram illustrating a processing unit including the wavefront data generation unit.

FIG. 22 illustrates a processing unit including the wavefront data generation unit. The same components as those in FIG. 20 are denoted by the same reference numerals, and detailed descriptions are omitted.

A wavefront data generation unit 6A includes an operation processing unit 110, a program storage unit 111, a data storage unit 112, a first wavefront data acquisition control unit 121, a second wavefront data acquisition control unit 122, a first moving mechanism control unit 113, and a second moving mechanism control unit 114. Moreover, a wavefront change data analysis unit 130 is connected to the wavefront data generation unit 6A.

The first wavefront data acquisition control unit 121 is a pre-rotation wavefront data acquisition control unit. The first wavefront data acquisition control unit 121 executes processing on the basis of a first program. The processing in the first program is processing for moving, in the first state, that is, in the state before rotating the subject optical system, the subject optical system with respect to the measurement axis in a revolution orbit and executing acquisition and storage of the wavefront aberration data WFD at a plurality of positions in the revolution orbit.

Thus, the first moving mechanism control unit 113 and the second moving mechanism control unit 114 control the first moving mechanism 40 and the second moving mechanism 80 on the basis of an instruction from the first wavefront data acquisition control unit 121.

The second wavefront data acquisition control unit 122 is a post-rotation wavefront data acquisition control unit. The second wavefront data acquisition control unit 122 executes processing on the basis of a second program. The processing in the second program is processing for moving, in the second state, that is, in the state after rotating the subject optical system, the subject optical system with respect to the measurement axis in a revolution orbit and executing acquisition and storage of the wavefront aberration data WFD' at the plurality of positions in the revolution orbit.

Thus, the first moving mechanism control unit 113 and the second moving mechanism control unit 114 control the first moving mechanism 40 and the second moving mechanism 80 on the basis of an instruction from the second wavefront data acquisition control unit 122.

In this manner, by using the first wavefront data acquisition control unit 121 and the second wavefront data acquisition control unit 122, it is possible to reduce a load of the operation processing unit 110 and to improve processing speed as well.

The processing by the second wavefront data acquisition control unit 122 may be performed by the first wavefront data acquisition control unit 121.

Moreover, the processing by the first wavefront data acquisition control unit 121 and the processing by the second wavefront data acquisition control unit 122 may be performed by the operation processing unit 110. In this case, the wavefront data generation unit 6 illustrated in FIG. 20 can be used instead of the wavefront data generation unit 6A.

Figure 23:
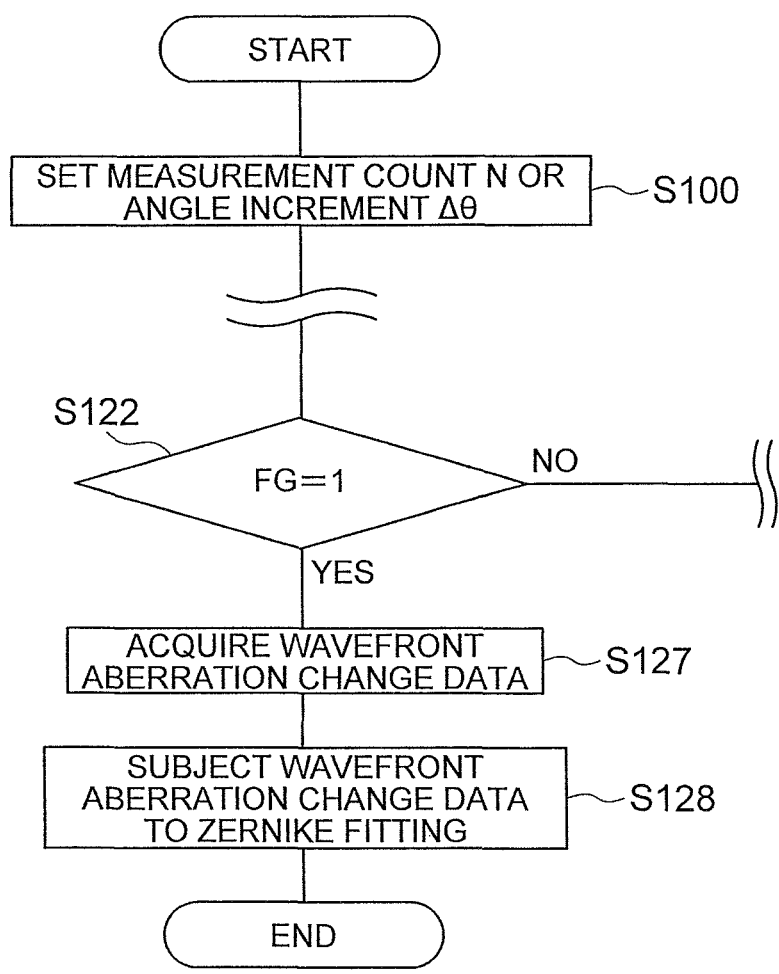
FIG. 23 is a flowchart of a wavefront measurement method of a third embodiment.

A wavefront measurement method of a third embodiment is a method for performing Zernike fitting. FIG. 23 is a flowchart of the wavefront measurement method of the third embodiment. In FIG. 23, the illustration of many pieces of processing in the flowchart of the wavefront measurement method of the second embodiment is omitted.

As described above, at Step S127, wavefront aberration change data associated with rotation is acquired. At Step S128, Zernike fitting is performed for the wavefront aberration change data.

When a Shack-Hartmann sensor is used for the wavefront measurement unit, position data is acquired for each spot of the spot group. Here, the positions of each spot of a spot group of reference wavefront aberration data and the positions of each spot of a spot group of measurement wavefront aberration data are acquired.

For this reason, how much the position of the spot group of the measurement wavefront aberration data is displaced with reference to the position of the spot group of the reference wavefront aberration data is calculated for every spot of the spot group of the measurement wavefront aberration data.

Then, the change amounts of the positions of the spots of the spot group of the measurement wavefront aberration data are fitted to a differential function of a Zernike polynomial. By doing this, Zernike coefficients are obtained. The obtained Zernike coefficients are referred to as "Zernike wavefront aberration change data". In this manner, it is possible to quantify the aberration amounts.

The reference wavefront aberration data and the measurement wavefront aberration data are data on the same subject optical system. Thus, processing using the reference wavefront aberration data can be considered to be performing self-reference.

In order to implement the wavefront measurement method of the third embodiment, in the wavefront measurement apparatus of the present embodiment, it is preferable that the wavefront change data analysis unit be configured to perform Zernike fitting on wavefront aberration change data acquired at each of a plurality of positions, and acquire Zernike wavefront aberration change data at each of the plurality of positions.

The wavefront measurement method of the third embodiment is performed by the wavefront change data analysis unit 130 illustrated in FIG. 22.

Moreover, the processing by the wavefront change data analysis unit 130 may be performed by the operation processing unit 110. In this case, the processing performed by the processing unit illustrated in FIG. 22 may be performed by the wavefront data generation unit 6 illustrated in FIG. 20.

Figure 24:
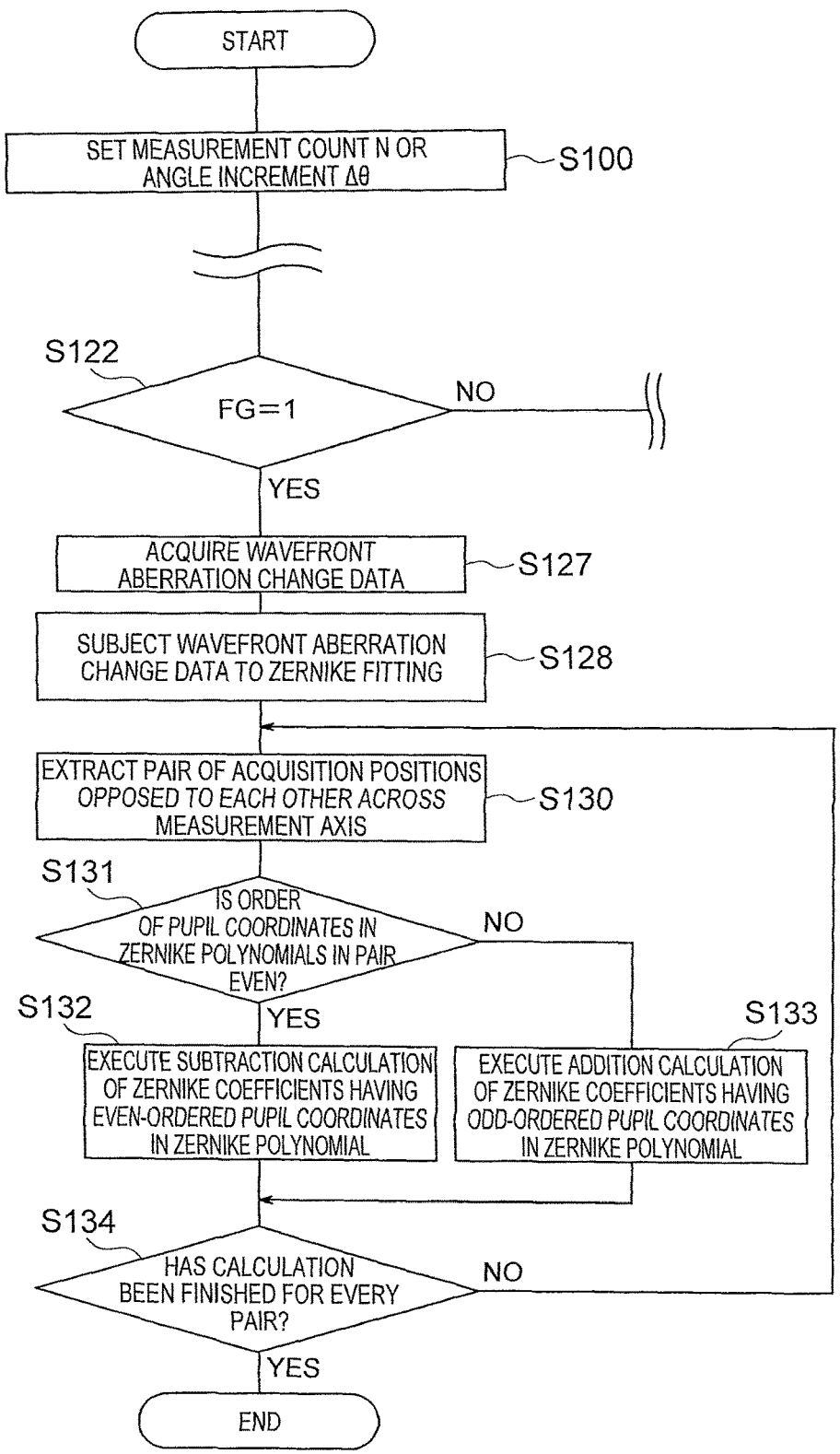
FIG. 24 is a flowchart of a wavefront measurement method of a fourth embodiment.

A wavefront measurement method of a fourth embodiment is a method performed subsequently to the wavefront measurement method of the third embodiment. FIG. 24 is a flowchart of the wavefront measurement method of the fourth embodiment. The same processing as that in FIG. 23 is denoted by the same reference number, and detailed descriptions are omitted.

When the measurement method of the third embodiment is regarded as "self-reference method", in the measurement method of the fourth embodiment, calculation of addition and subtraction is performed by using Zernike wavefront aberration change data obtained by the self-reference method.

As described above, wavefront aberration data is acquired at a plurality of positions on a revolution orbit, and Zernike wavefront aberration change data is acquired for each acquisition position. When Δθ is 10 degrees, 36 pieces of Zernike wavefront aberration change data are acquired. For this reason, at Step S130, a pair of acquisition positions opposed to each other across the measurement axis are extracted.

Since the extracted pair of positions are opposed to each other across the measurement axis, they are symmetric about the measurement axis by 180 degrees. For example, Zernike wavefront aberration change data at the position at which θ is 0 degrees and Zernike wavefront aberration change data at the position at which θ is 180 degrees are paired. Moreover, Zernike wavefront aberration change data at the position at which θ is 40 degrees and Zernike wavefront aberration change data at the position at which θ is 220 degrees are paired.

Subsequently, Step S131 is executed. At Step S131, confirmation of the order of pupil coordinates in Zernike polynomials is executed for Zernike wavefront aberration change data on the extracted pair. Then, when the order of pupil coordinates in Zernike polynomials is even order, Step S132 is executed. When the order of pupil coordinates in Zernike polynomials is odd order, Step S133 is executed.

At Step S132, subtraction calculation of Zernike coefficients having even-ordered pupil coordinates in Zernike polynomial is executed between Zernike wavefront aberration change data. At Step S133, addition calculation of Zernike coefficients having odd-ordered pupil coordinates in Zernike polynomials is executed between Zernike wavefront aberration change data. At Step S134, confirmation of the number of pairs for which this processing has been finished is executed.

The result obtained by this calculation is referred to as "aberration component". The aberration component can be considered to be an aberration component that is generated in proportion to one power of an eccentricity amount of the subject optical system or generated in proportion to one power of a displacement amount of the subject optical system.

The aberration component can also be acquired as follows. In general, wavefront aberration caused by one power of the eccentricity amount of the subject optical system is represented by a function of object height coordinates. The object height coordinates can be considered to correspond to shift amount of the subject optical system. Thus, aberration components can be acquired by fitting Zernike wavefront aberration data to the function by using an algorithm such as the least squares method.

In order to implement the wavefront measurement method of the fourth embodiment, it is preferable that the wavefront measurement apparatus of the present embodiment include an aberration component amount extraction and analysis unit, and the aberration component amount extraction and analysis unit be configured to: for Zernike wavefront aberration change data obtained in each state, subtract Zernike coefficients having the pupil coordinates of the even order in Zernike polynomials and add Zernike coefficients having the pupil coordinates of the odd order in Zernike polynomials between Zernike wavefront aberration change data that are symmetric about the measurement axis by 180 degrees to extract aberration components.

Figure 25:
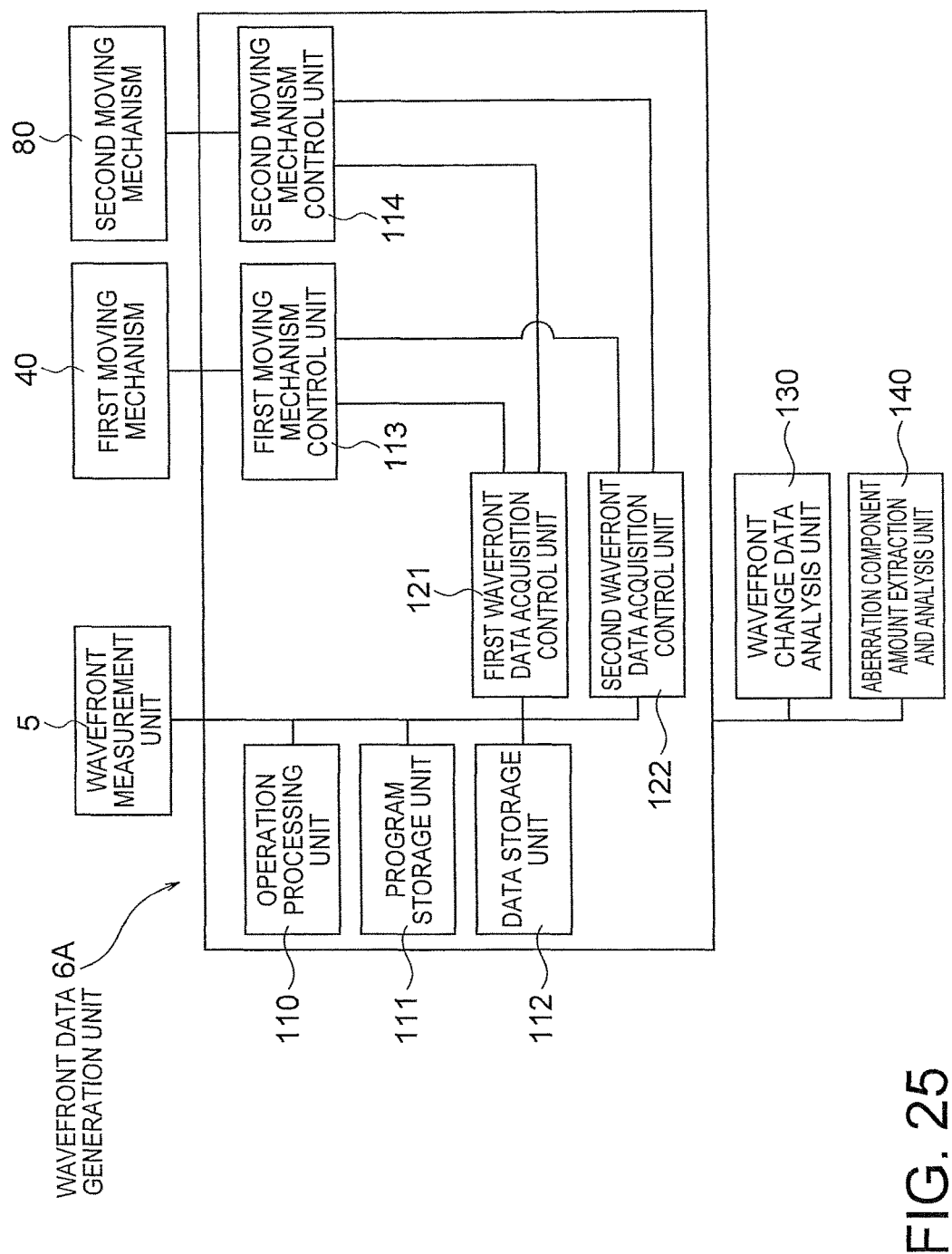
FIG. 25 is a diagram illustrating another processing unit including the wavefront data generation unit.

FIG. 25 illustrates another processing unit including the wavefront data generation unit. The same components as those in FIG. 22 are denoted by the same reference numbers, and detailed descriptions are omitted.

An aberration component amount extraction and analysis unit 140 is connected to the wavefront data generation unit 6A. In the aberration component amount extraction and analysis unit 140, Step S130 to Step S134 described above are performed. By doing this, the aberration component is obtained.

Moreover, the processing by the aberration component amount extraction and analysis unit 140 may be performed by the operation processing unit 110. In this case, the processing performed by the processing unit illustrated in FIG. 25 may be performed by the wavefront data generation unit 6 illustrated in FIG. 20.

Figure 26:
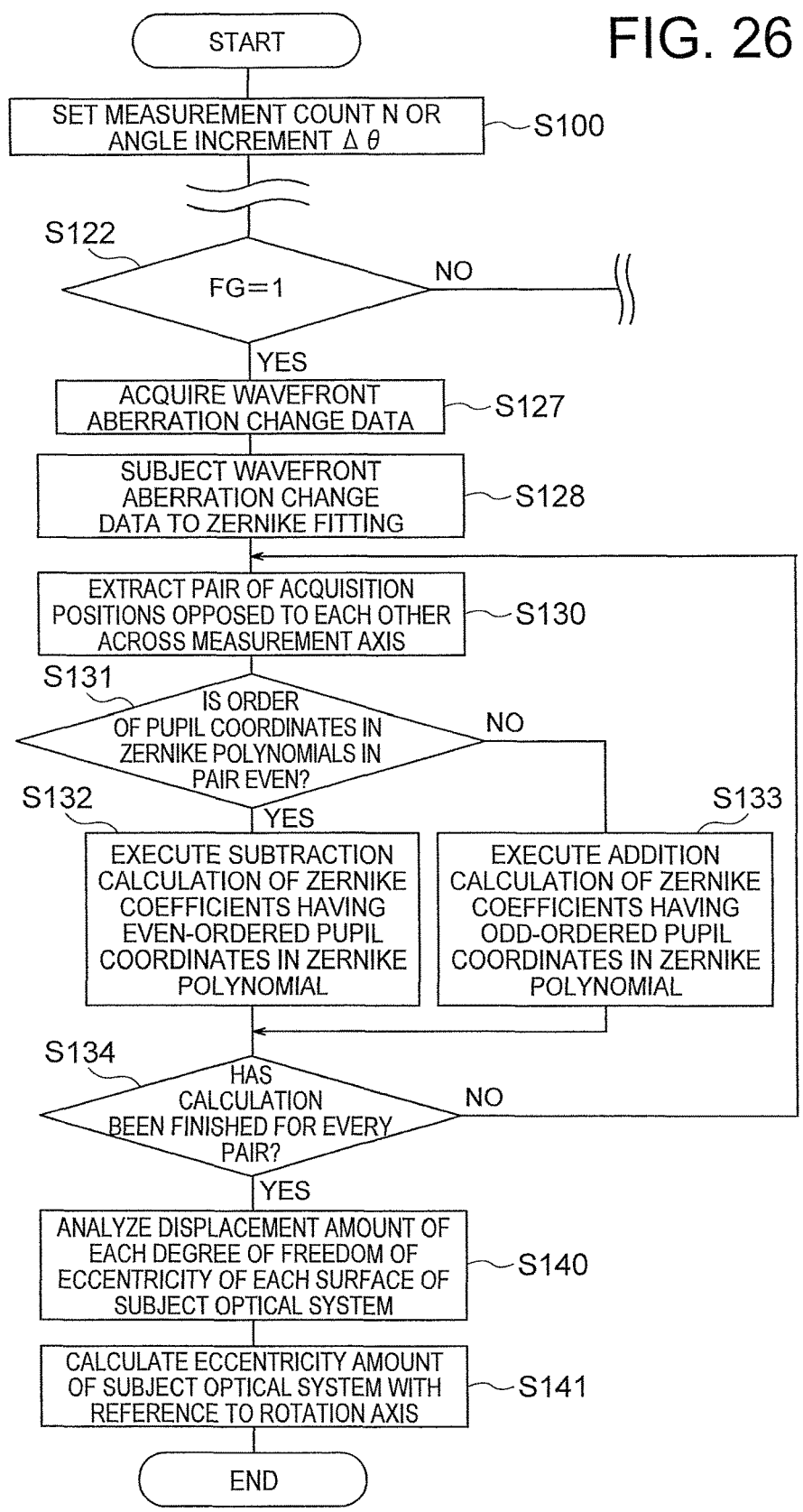
FIG. 26 is a flowchart of a wavefront measurement method of a fifth embodiment.

A wavefront measurement method of a fifth embodiment is a method performed subsequently to the wavefront measurement method of the fourth embodiment. FIG. 26 is a flowchart of the wavefront measurement method of the fifth embodiment. The same processing as that in FIG. 24 is denoted by the same reference number, and detailed descriptions are omitted.

Considering the measurement method of the fourth embodiment as "1st-order eccentric aberration extraction method", in the measurement method of the fifth embodiment, by using aberration components obtained by the 1st-order eccentric aberration extraction method, the eccentricity amount of the subject optical system with reference to the rotation axis is calculated.

In the rotation axis reference eccentricity amount calculation unit, Step S140 is executed, but before the execution of Step S140, eccentric aberration sensitivity is calculated in advance. The eccentric aberration sensitivity is calculated by using an optical CAD and the like. Note that, the eccentric aberration sensitivity is calculated as follows so as to be the amount expressed by the component of one power of the eccentricity amount.

Wavefront aberration change data which corresponds to the design shape of the subject optical system is calculated in advance. The wavefront aberration change data indicates a wavefront aberration shape change of transmitted wavefront aberration obtained when a subject surface is eccentric by a unit eccentricity amount.

Subsequently, the wavefront aberration change data is subjected to Zernike fitting, and whereby a Zernike coefficient, that is, Zernike wavefront aberration change data is acquired. Next, the following calculation is performed on the Zernike wavefront aberration change data in two states of 180-degree symmetrical revolution angles.

Zernike coefficients having terms of the pupil coordinates of even in Zernike polynomials are subtracted, and Zernike coefficients having terms of the pupil coordinates of odd in Zernike polynomials are added. The results obtained by this calculation are referred to as "eccentric aberration sensitivity". The eccentric aberration sensitivity can be considered to be a unit eccentricity amount for each degree of freedom of eccentricity of each surface of the subject optical system or an aberration component amount that is generated in proportion to one power of the unit displacement amount.

At Step S140, simultaneous linear equations are established for the eccentric aberration sensitivity, the aberration component, and the displacement amount of each degree of freedom of eccentricity of each surface of the subject optical system associated with rotation. Then, the simultaneous linear equations are analyzed by an algorithm such as the least squares method. By doing this, the displacement amount for each degree of freedom of eccentricity of each surface of the subject optical system associated with rotation is calculated.

In order to implement the wavefront measurement method of the fifth embodiment, it is preferable that the wavefront measurement apparatus of the present embodiment include a rotation axis reference eccentricity amount calculation unit, and the rotation axis reference eccentricity amount calculation unit be configured to calculate an eccentricity amount of the subject optical system with reference to a rotation axis from the analyzed displacement amount of each degree of freedom of eccentricity of each surface of the subject optical system.

Figure 27:
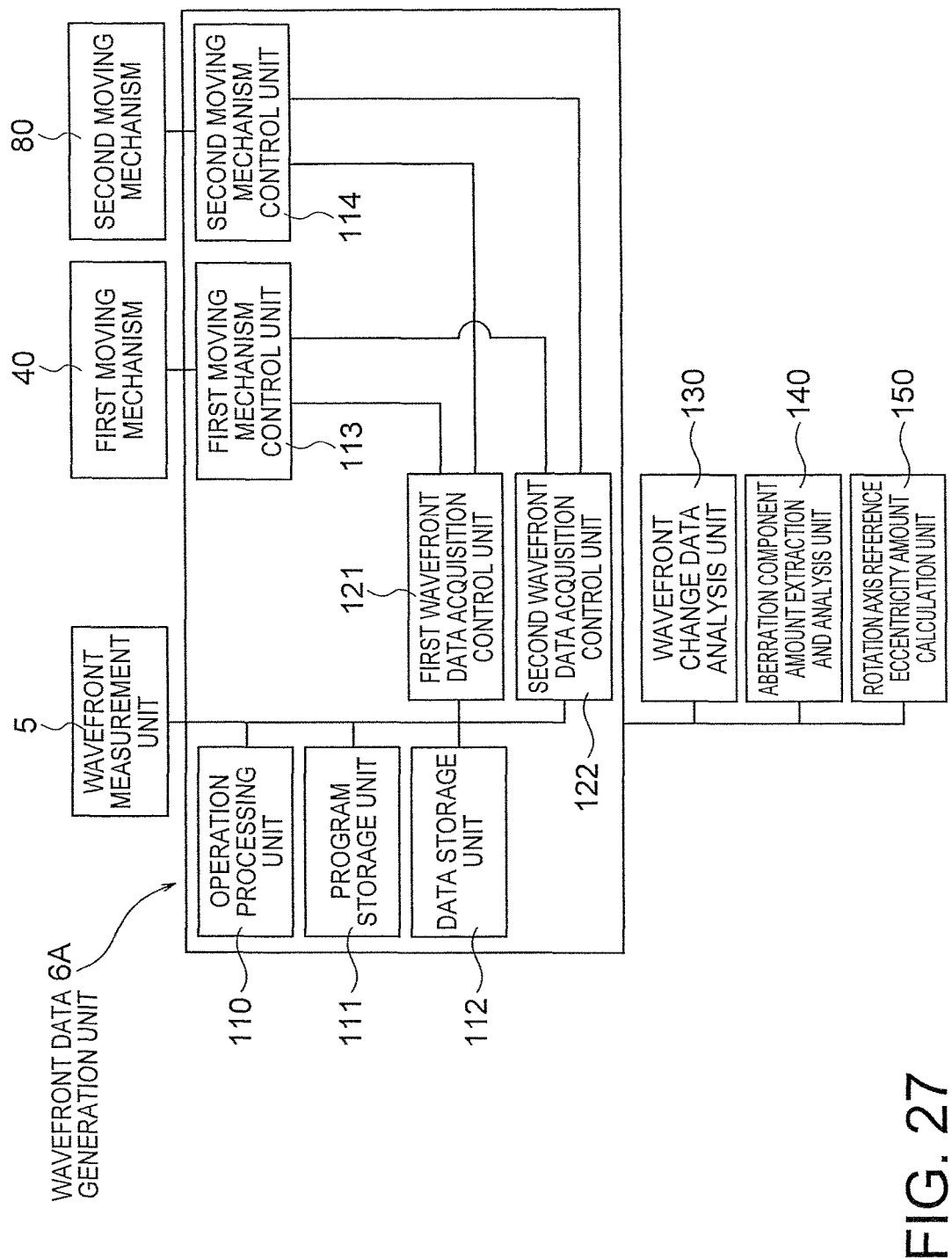
FIG. 27 is a diagram illustrating another processing unit including the wavefront data generation unit.

FIG. 27 illustrates another processing unit including the wavefront data generation unit. The same components as those in FIG. 25 are denoted by the same reference numbers, and detailed descriptions are omitted.

A rotation axis reference eccentricity amount calculation unit 150 is connected to the wavefront data generation unit 6A. In the rotation axis reference eccentricity amount calculation unit 150, Step S140 and Step S141 described above are performed. By doing this, the eccentricity amount of the subject optical system with reference to the rotation axis is obtained.

Moreover, the processing by the rotation axis reference eccentricity amount calculation unit 150 may be performed by the operation processing unit 110. In this case, the processing performed by the processing unit illustrated in FIG. 27 may be performed by the wavefront data generation unit 6 illustrated in FIG. 20.

An example of eccentricity calculation is described. By the analysis of the simultaneous linear equations, a displacement amount of each degree of freedom of eccentricity of each surface of the subject optical system associated with rotation is obtained. For this displacement amount of each degree of freedom of eccentricity, it is possible to specify as a position on a space by providing a reference position in consideration of the rotation angle. Specifically, when the rotation angle is 180 degrees, the displacement amount of each degree of freedom of eccentricity of each surface of the subject optical system associated with rotation is divided by −2, and thereby it is possible to specify the position of the lens surface before the rotation with reference to the rotation axis.

Figure 28:
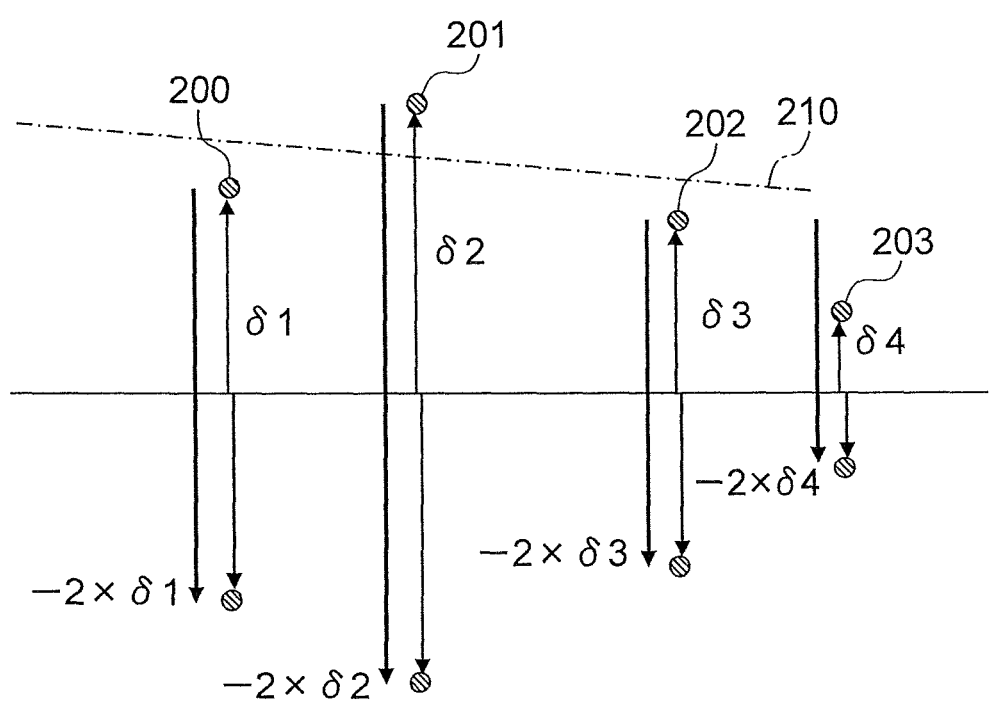
FIG. 28 is a diagram illustrating a movement amount of a spherical center caused by rotation of the subject optical system.

For example, when the lens surface is formed of a spherical surface, the position of the lens surface can be indicated with the spherical center. FIG. 28 is a diagram illustrating a movement amount of a spherical center caused by rotation of the subject optical system. In FIG. 28, the subject optical system 10 is formed of four lens surfaces.

In the first state, specifically, in the state before the rotation is performed, spherical centers 200, 201, 202, and 203 are disposed on one side of the rotation axis. When the rotation is performed from this state, the spherical centers 200, 201, 202, and 203 are moved to the other side of the rotation axis. The other side is in a position opposite to one side with the rotation axis interposed therebetween.

As illustrated in FIG. 28, the eccentricity amount of the spherical center with respect to the rotation axis is 51 in the spherical center 200, 52 in the spherical center 201, 53 in the spherical center 202, and 54 in the spherical center 203. By rotation of the subject optical system 10, each of the spherical centers 200, 201, 202, and 203 is displaced. The displacement amount is −2 times as large as the eccentricity amount before the rotation with respect to the rotation axis.

When a plurality of lens surfaces exist, the eccentricity amount between the lens surfaces may be evaluated. In this case, as illustrated in FIG. 28, a new axis 210 is set to minimize the eccentricity amount of a plurality of lens surfaces distributed in the space. Thereafter, the eccentricity amount of the lens surfaces is evaluated based on the new axis 210.

To set the new axis 210, for example, a temporary axis is set, a distance from the temporary axis to the corresponding spherical center on a surface of each lens is obtained, and the sum of squares of the distances is obtained. Thereafter, the temporary axis is changed, to set a temporary axis with the minimum sum of squares as the new axis. As another example, an amount obtained by dividing a distance from the temporary axis to the corresponding spherical center on a surface of each lens by the curvature radius of the lens is obtained, and the sum of squares of the amounts is obtained. Thereafter, the temporary axis may be changed to set a temporary axis with the minimum sum of squares as the new axis.

Further, it is possible to define a unique axis on a space, and to calculate the eccentricity amount as a position of the lens surface with reference to the axis. For example, it is possible to calculate a inclination of an aspherical surface axis of a second surface and a position of an aspherical surface apex of the second surface with reference to an aspherical surface axis of a first surface.

In the wavefront measurement apparatus and the wavefront measurement method of the present embodiment, wavefront aberration data is measured while the subject optical system is moved along a revolution orbit. With this movement, acquisition of the wavefront aberration data is preformed in the circumferential direction relative to the subject optical system. Thus, for example, according to the wavefront measurement apparatus and the wavefront measurement method of the present embodiment, robust eccentricity measurement can be performed even when the subject optical system has a surface precision error.

The surface precision error can be canceled by a self-reference method (wavefront measurement method of the second embodiment: method for rotating subject optical system) for a case where shapes whose surface precision errors are the same shape when rotated by 180 degrees, surface curvature radius errors and rotationally symmetric waviness (shapes such as 4th term, 9th term, 16th term of Zernike terms illustrated in Table 1), astigmatism (shapes such as 5th term, 6th term, 12th term, and 13th term), and four-leafed shapes (shapes such as 17th term and 18th term). However, for shapes having surface precision errors of the trefoil shape (10th term, 11th term . . . ), it is hard to cancel the errors by the self-reference method involving 180-degree rotation.

For surface precision errors of the trefoil shape, even if the eccentricity is measured by a measurement of the cross-sectional shape, the eccentricity amount may change depending on the orientation of the subject optical system in this method. On the other hand, in the wavefront measurement apparatus and the wavefront measurement method of the present embodiment, significantly robust eccentricity measurement can be performed irrespective of the orientation of the subject optical system.

In the wavefront measurement apparatus 1', it is possible to determine surface apex positions of the subject optical system 10 by analyzing wavefront aberration data. For this reason, the case where a surface apex positions is determined by measuring a subject optical system with two patterns is described.

Figure 9:
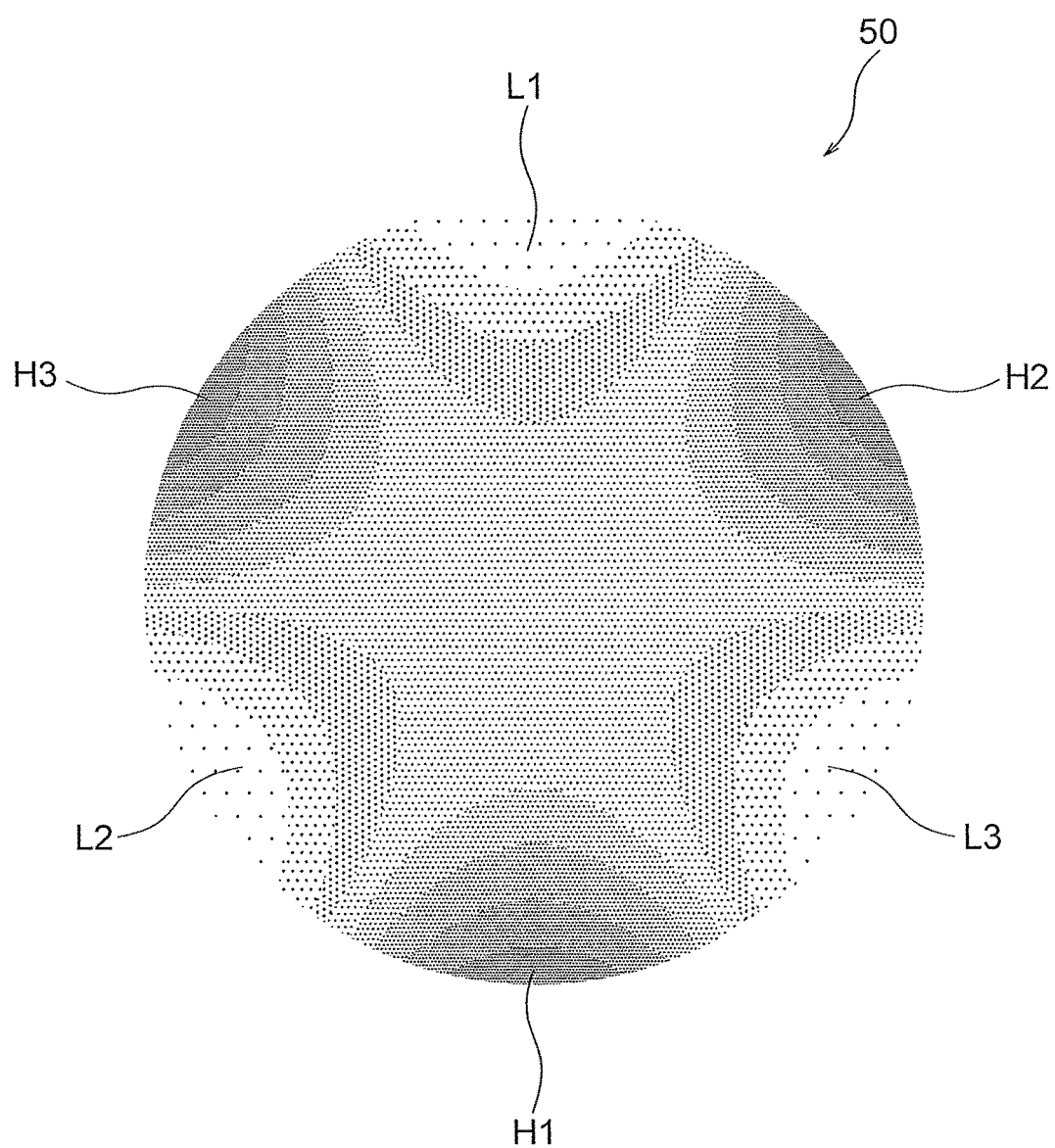
FIG. 9 is a diagram illustrating a surface shape of the subject optical system.

FIG. 9 is a diagram illustrating the surface shape of the subject optical system. The subject optical system 10 is a single lens. A lens surface 50 has concave portions and convex portions at a peripheral part of the lens. Specifically, as illustrated in FIG. 9, the lens surface 50 has a concave portion L1 and a convex portion H1, a concave portion L2 and a convex portion H2, and a concave portion L3 and a convex portion H3. The concave portion and the convex portion are opposed to each other across the center of the surface. The surface shape illustrated in FIG. 9 is the shape caused by manufacturing errors, and is not the shape determined by design.

Here, consider the case where the same subject optical system 10 is used to perform measurement a plurality of times. It should be understood that before measurement, the shape and eccentric position of lens surfaces are unknown. For this reason, when a reference position is provided to the measurement apparatus and the subject optical system 10 is set in the measurement apparatus, for example, the following situation occurs.

In the first measurement, the subject optical system 10 is set such that the concave portion L1 is aligned with a reference position. In the second measurement, the subject optical system 10 is set such that the convex portion H2 is aligned with the reference position. In the third measurement, the subject optical system 10 is set such that an intermediate position between the convex portion H3 and the concave portion L2 is aligned with the reference position.

In this manner, the situation in which a particular site in the subject optical system 10 is not aligned with the reference position is referred to as "the orientation of the subject optical system with respect to the reference position is different". Examples of the particular site in the subject optical system 10 include a concave portion, a convex portion, and a surface apex position (eccentric position).

Figure 10A:
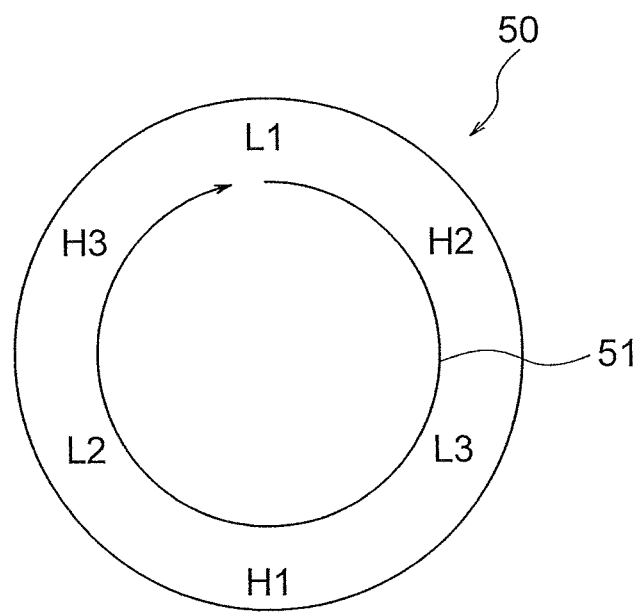
FIG. 10A and FIG. 10B are diagrams illustrating measurement patterns, where
Figure 10B:
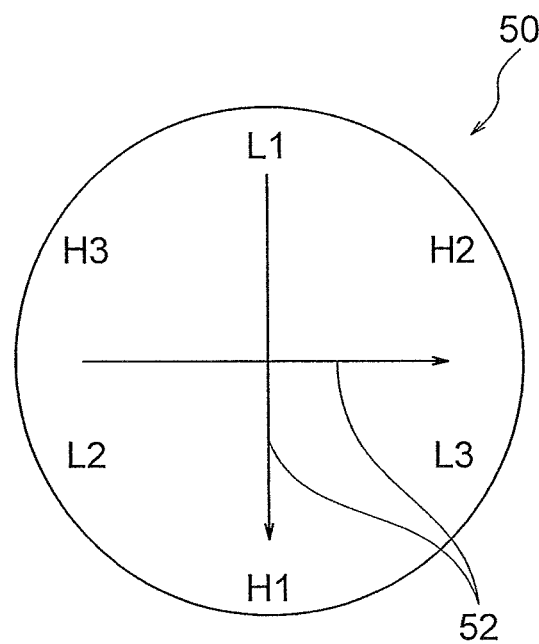

FIG. 10A and FIG. 10B are diagrams illustrating measurement patterns. FIG. 10A is a diagram illustrating a first pattern, and FIG. 10B is a diagram illustrating a second pattern.

In measurement with a first pattern 51, as illustrated in FIG. 10A, a light beam applied to the peripheral part of the lens surface 50 is moved so as to draw a circle. The first pattern 51 is the same as a pattern in which the position of the light beam is fixed and the subject optical system is caused to revolve. Thus, the first pattern 51 can be regarded as a measurement pattern in the wavefront measurement apparatus of the present embodiment.

In measurement with a second pattern 52, as illustrated in FIG. 10B, the light beam applied to the lens surface 50 is moved in the cross direction. The second pattern 52 is one of measurement patterns that are frequently used in conventional measurement apparatus.

In each of the measurement with the first pattern 51 and the measurement with the second pattern 52, a light beam is measured at a plurality of positions while the light beam is moved. Then, the surface apex position is calculated by using the measured measurement data at each position. Thus, in the measurement with the first pattern 51, the surface apex position is calculated when the movement of drawing a circular is finished. In the measurement with the second pattern 52, the surface apex position is calculated when the movement of drawing a cross shape is finished.

The situation in which the orientation of the subject optical system 10 with respect to the reference position is different each time the subject optical system 10 is placed on the measurement apparatus can be reproduced by rotating the lens surface 50.

Figure 11A:
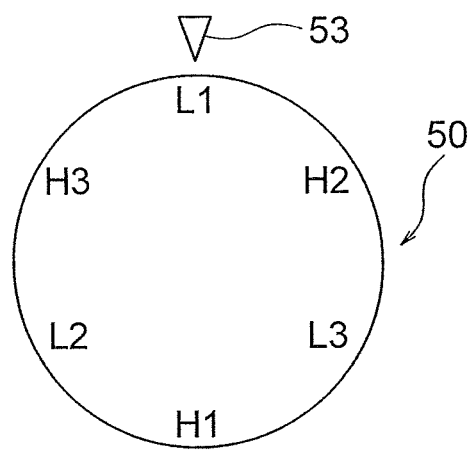
FIG. 11A, FIG. 11B, and FIG. 11C are diagrams illustrating how a lens surface is rotated, where
Figure 11B:
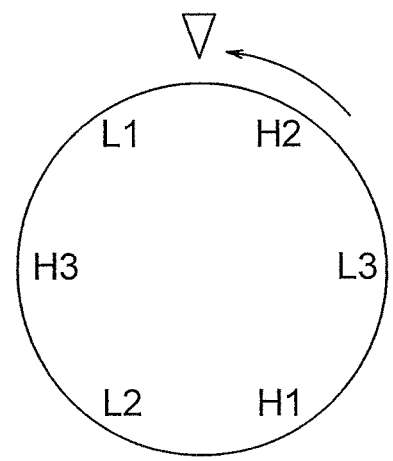
Figure 11C:
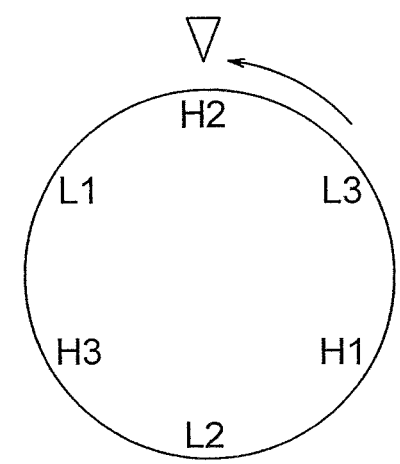

FIG. 11A, FIG. 11B, and FIG. 11C are diagrams illustrating how the lens surface is rotated. FIG. 11A is a diagram when the rotation angle is 0 degrees. FIG. 11B is a diagram when the rotation angle is 30 degrees. FIG. 11C is a diagram when the rotation angle is 60 degrees.

In FIG. 11, a reference position 53 is a reference position of the measurement apparatus. In the first measurement, as illustrated in FIG. 11A, the lens surface 50 is set such that the concave portion L1 is aligned with a reference position 53. The measurement with the first pattern 51 is performed in this state, and a surface apex position is calculated. Subsequently, the measurement with the second pattern 52 is performed in the same state, and a surface apex position is calculated.

Next, the lens surface is rotated by 30 degrees, and the second measurement is performed. In the second measurement, as illustrated in FIG. 11B, the lens surface 50 is set such that the intermediate position between the concave portion L1 and the convex portion H2 is aligned with the reference position 53. The measurement with the first pattern 51 is performed in this state, and a surface apex position is calculated. Subsequently, the measurement with the second pattern 52 is performed in the same state, and a surface apex position is calculated.

Further, the lens surface is rotated by 30 degrees, and the third measurement is performed. In the third measurement, as illustrated in FIG. 11C, the lens surface 50 is set such that the convex portion H2 is aligned with the reference position 53. The measurement with the first pattern 51 is performed in this state, and a surface apex position is calculated. Subsequently, the measurement with the second pattern 52 is performed in the same state, and a surface apex position is calculated.

In this manner, the rotation of the lens surface and the measurement with the first pattern 51 and with the second pattern 52 at each position are performed until the lens surface is rotated once. The results are illustrated in FIG. 12A and FIG. 12B.

Figure 12A:
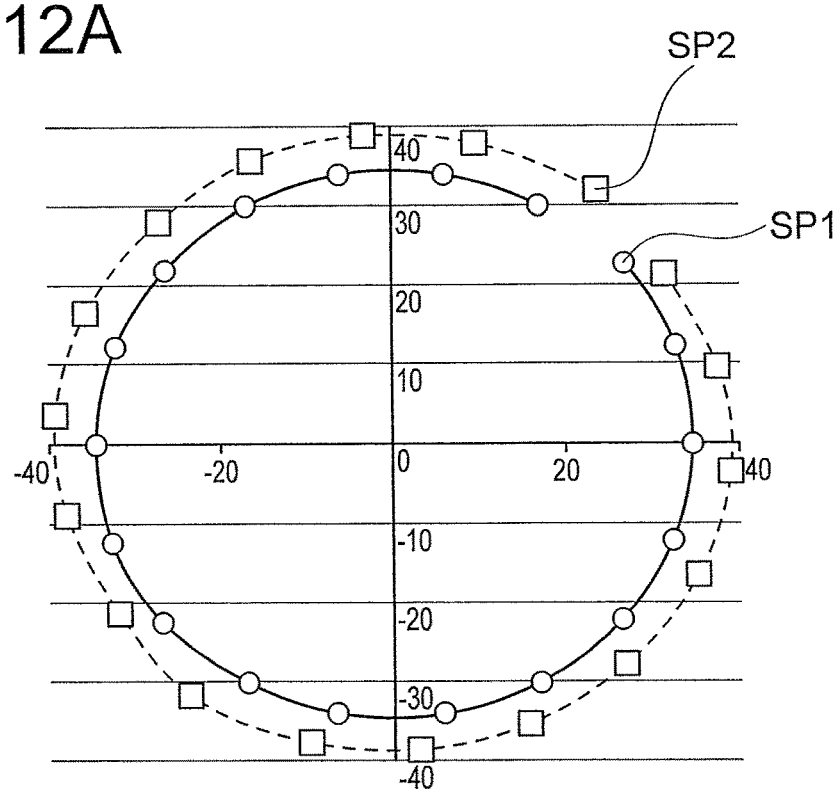
FIG. 12A and FIG. 12B are diagrams illustrating positions of surface apex, where
Figure 12B:
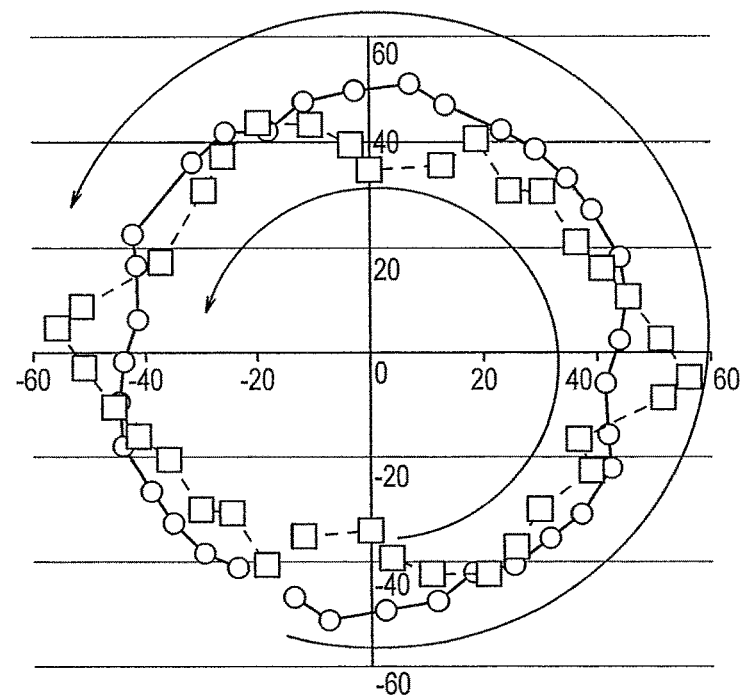

FIG. 12A and FIG. 12B are diagrams illustrating positions of the surface apex. FIG. 12A is a diagram illustrating surface apex positions determined by measurement with a first pattern. FIG. 12B is a diagram illustrating surface apex positions determined by measurement with a second pattern. In FIG. 12A and FIG. 12B, the origin represents the rotation axis, and the XY axes are two orthogonal axes orthogonal to the rotation axis and represent the direction and magnitude of the eccentricity amount.

FIG. 12A and FIG. 12B illustrates measurement results obtained by rotating the lens surface by 20 degrees each. In this case, since the measurement count is 18, the number of surface apex positions obtained by the measurement is also 18. For simple illustration, points of a surface apex position SP1 of a first surface are connected by the solid line, and points of a second surface apex position SP2 are connected by the broken line.

In the case of the measurement with the first pattern, as illustrated in FIG. 12A, the first surface apex position SP1 is located on the inner side of the second surface apex position SP2 at any angle. Thus, in the case of the measurement with the first pattern, even when the orientation of the subject optical system 10 with respect to the reference position is different, the surface apex position is accurately determined. In other words, the surface apex position is accurately determined even when the subject optical system 10 is set in the measurement apparatus in any direction.

It means that when the subject optical system is eccentric, the eccentricity amount and the eccentric position are accurately determined. Wavefront aberration is necessary to determine the eccentricity amount and the eccentric position, and hence the wavefront aberration can be accurately determined by the measurement with the first pattern.

In the case of the measurement with the second pattern, on the other hand, as illustrated in FIG. 12B, depending on the rotation angle, the first surface apex position SP1 may be located on the inner side of the second surface apex position SP2, or the first surface apex position SP1 may be located on the outer side of the second surface apex position SP2. Thus, in the case of the measurement with the second pattern, when the orientation of the subject optical system 10 with respect to the reference position is different, it means that the surface apex position varies. In other words, it means that the surface apex position varies depending on the direction at a time of setting the subject optical system 10 in the measurement apparatus.

In this manner, according to the wavefront measurement apparatus of the second embodiment, it is possible to determine the wavefront aberration, the eccentricity amount, and the surface apex position even when the subject optical system 10 is set in the measurement apparatus in any direction.

As described above, simultaneous linear equations are established for the eccentric aberration sensitivity, the aberration components, and the displacement amount of each degree of freedom of eccentricity of each surface of the subject optical system associated with the rotation. Then, the simultaneous linear equations are analyzed by an algorithm such as the least squares method. As a result, the displacement amount of each degree of freedom of eccentricity of each surface of the subject optical system associated with the rotation can be calculated. When the calculation is performed, a fitting residual error can be considered to reflect manufacturing errors other than the eccentricity of the subject optical system. Thus, it is possible to use this information as a clue of the performance of the subject optical system and analysis of manufacturing errors.

Moreover, in the wavefront measurement method of the present embodiment, it is preferable to perform the wavefront measurement by using the above-mentioned front-back inverting mechanism 90. According to the wavefront measurement method of the present embodiment, it is possible to measure the eccentric for each degree of freedom of eccentricity even when the number of degrees of freedom of eccentricity is large. Or, it is possible to improve the accuracy of eccentric measurement.

In the wavefront measurement apparatus 100 illustrated in FIG. 18A and FIG. 18B, the holding unit 3 is located on the second moving mechanism 80. Moreover, the second moving mechanism 80 is located on the first moving mechanism 40. Thus, the holding unit 3 is structured to be able to generate off-axis shift together with a rotating mechanism (second moving mechanism) for rotating the subject optical system 10. In the wavefront measurement apparatus 100, revolution measurement is performed by the off-axis shift, and it is possible to implement the self-reference method involving the rotation of the subject optical system in the state where the off-axis shift is generated.

The feature of the wavefront measurement method of the present embodiment is that a step of rotating the holding unit 3 about the axis perpendicular to the measurement axis 7 by 180 degrees is included. This rotating axis is the front-back inversion axis 91. In the wavefront measurement method of the present embodiment, the front-back inversion axis 91 is parallel to the Y axis in the wavefront measurement apparatus.

In the wavefront measurement method of the present embodiment, off-axis wavefront aberration measurement by revolution, a self-reference method, and a 1st-order eccentric aberration extraction method are performed in a state before the holding unit is rotated around the front-back inversion axis 91.

Next, the holding unit 3 is rotated by 180 degrees about the front-back inversion axis 91. When the holding unit 3 is rotated by 180 degrees about the front-back inversion axis 91, the front and back of the subject optical system 10 are inverted around the Y axis. No problem occurs if a slight axial deviation is present between the measurement axis 7 and the rotation axis (for example, the center axis 11 of the opening portion 9). In this case, the relative positional relation between the rotation axis and the subject optical system 10 is not changed.

Figure 29A:
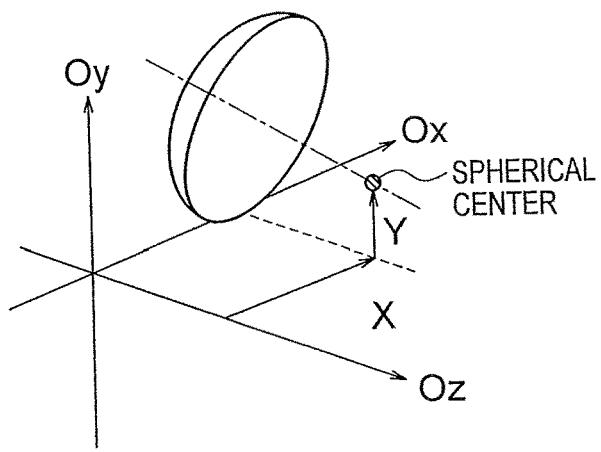
FIG. 29A, FIG. 29B, and FIG. 29C are diagrams for explaining degree of freedom of eccentricity, where
Figure 29B:
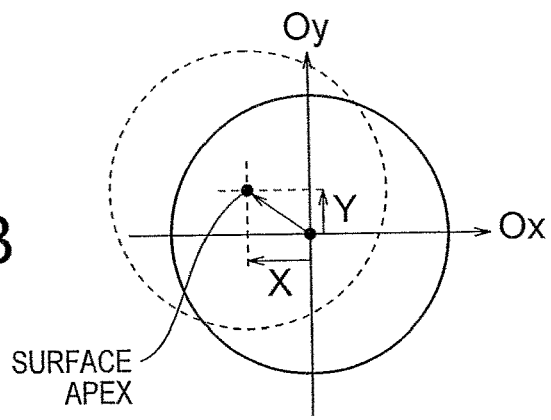
Figure 29C:
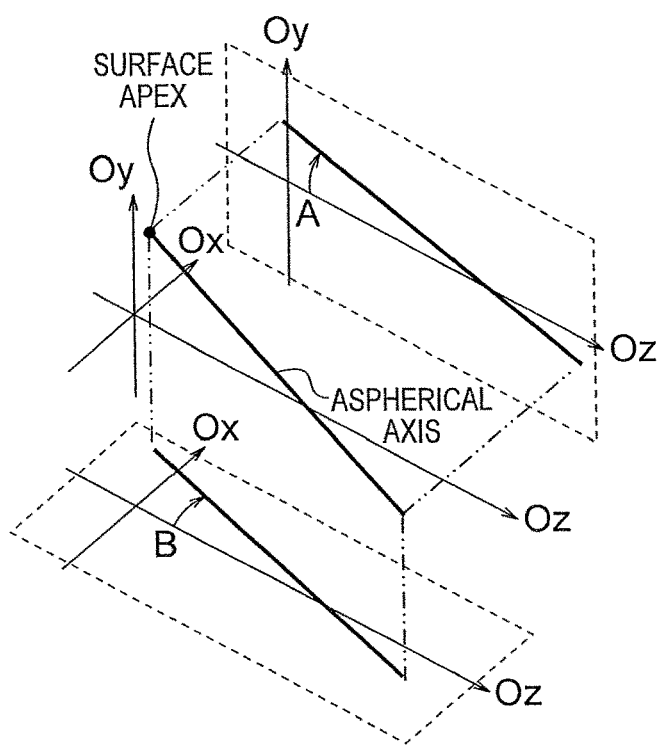

Here, the degree of freedom of eccentricity will be explained hereinafter. The degree of the freedom of the eccentricity indicates the type of eccentricity. The degree of the freedom of the eccentricity is roughly classified into shift and tilt. FIGS. 29A, 29B, and 29C are diagrams for explaining degree of freedom of eccentricity, where FIG. 29A illustrates degree of freedom of eccentricity in a spherical surface, and FIG. 29B and FIG. 29C illustrate degree of freedom of eccentricity in an aspherical surface.

As illustrated in FIG. 29A, eccentricity in a spherical surface can be indicated by a position of the spherical center. The degree of the freedom of the eccentricity in a spherical surface is geometrically only a shift in an X direction and a shift in a Y direction.

Moreover, in a spherical surface, even if the spherical surface is tilted with a certain point on a space serving as a center, the tilt can be regarded as a shift in the X direction, a shift in the Y direction, and a spacing displacement occurring in a Z direction. Accordingly, the degree of the freedom of the eccentricity in a spherical surface can be regarded as only a shift in the X direction and a shift in the Y direction.

Spacing displacement also occurs in manufacturing. Spacing displacement in manufacturing is, for example, an error in thickness in a lens, and an error in a space between lenses in a two-lens system. The spacing displacement caused by a manufacturing error cannot actually be distinguished from spacing displacement caused when the spherical surface is tilted.

By contrast, as illustrated in FIGS. 29B and 29C, an aspherical surface includes an aspherical surface top and an aspherical surface axis. An aspherical surface axis is a rotational-symmetrical axis. Because an aspherical surface includes an aspherical surface axis, an aspherical surface includes a tilt in an A direction and a tilt in a B direction, in addition to a shift in the X direction and a shift in the Y direction, as degree of freedom of eccentricity. The shift in the X direction and the shift in the Y direction serve as degrees of freedom of eccentricity with respect to the surface top of the aspherical surface. Moreover, the tilt in the A direction and the tilt in the B direction serve as degrees of freedom of eccentricity with respect to the aspherical surface axis.

When the holding unit 3 is rotated by 180 degrees around the front-back inversion axis 91, for the eccentricity amount of the subject optical system 10 with respect to the rotation axis, the sign in the X direction is inverted, but the sign thereof in the B direction remains unchanged. Moreover, the sign in the Y direction remains unchanged, and the sign thereof in the A direction is reversed.

Figure 30A:
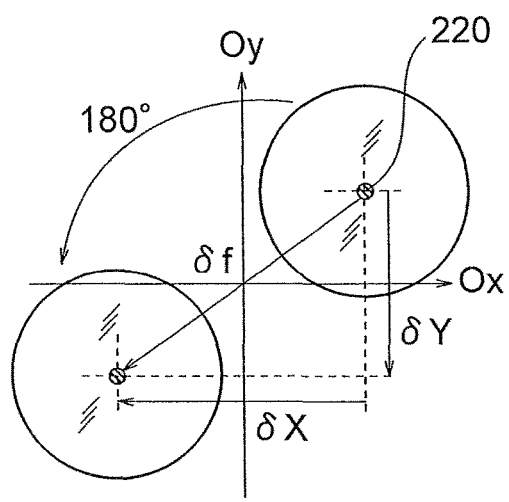
FIG. 30A and FIG. 30B are diagrams illustrating movement of a spherical center caused by rotation, where
Figure 30B:
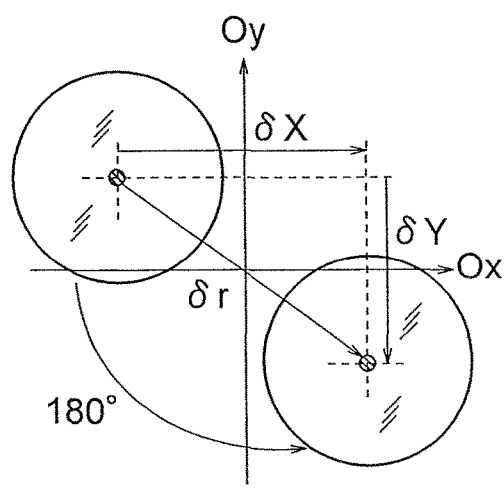

This point will be explained hereinafter. In the case where the lens surface is a spherical surface, when the lens surface is eccentric, the spherical center is moved by rotation. FIGS. 30A and 30B are diagrams illustrating movement of the spherical center caused by the rotation, where FIG. 30A illustrates movement of the spherical center in forward measurement, and FIG. 30B illustrates movement of the spherical center in reverse measurement. FIGS. 30A and 30B illustrate the lens surface in the vicinity of the spherical center with a circle. Accordingly, the two circles merely indicate part of the same lens surface.

The forward measurement is a measurement before rotating the holding unit 3 by 180 degrees around the front-back inversion axis 91. Movement of the spherical center in forward measurement will be explained with reference to FIG. 30A. Before the rotation, the spherical center 220 is located in the first quadrant of the OxOy coordinate system. Then, after the rotation, the spherical center 220 is located in the third quadrant. The movement amount of the spherical center 220 is δf, an x component is δX, and a y component is δY.

The reverse measurement is a measurement after rotating the holding unit 3 by 180 degrees around the front-back inversion axis 91. Movement of the spherical center in reverse measurement will be explained with reference to FIG. 30B. Before the rotation, the spherical center 220 is located in the second quadrant of the OxOy coordinate system. Then, after the rotation, the spherical center 220 is located in the fourth quadrant. The movement amount of the spherical center 220 is δr, an x component is δX, and a y component is δY.

As described above, in measurement to perform rotation around the front-back inversion axis 91, the subject optical system 10 is disposed such that the absolute value of the predetermined distance is the same between reverse measurement and forward measurement. Accordingly, "|δf|=|δr|" is satisfied.

In the vector indicating movement of the spherical center 220, the direction of the vector of the Y component is the same between forward measurement and reverse measurement. By contrast, the direction of the vector of the X component is reversed between forward measurement and reverse measurement.

In view of the above, when calculation is performed using the measurement results obtained in reverse measurement, the sign of the numerical value is required to be inverted.

Next, simultaneous linear equations are established for the eccentric aberration sensitivity, the aberration components obtained before and after rotation around the front-back inversion axis 91, and the displacement amount of each degree of freedom of eccentricity of each surface of the subject optical system associated with the rotation. Then, the simultaneous linear equations are analyzed by an algorithm such as the least squares method. By doing this, the displacement amount of each degree of freedom of eccentricity of each surface of the subject optical system associated with the rotation is calculated. Note that, for each degree of freedom of eccentricity of the eccentric aberration sensitivity after the rotation by front-back inversion, the sign in the X direction is inverted, the sign in the B direction is unchanged, the sign in the Y direction is unchanged, and the sign in the A direction is reversed. The calculated displacement amount of each degree of freedom of eccentricity is a displacement amount with reference to the rotation axis before the rotation about the front-back inversion axis.

The eccentricity is calculated in the same manner as the processing illustrated in FIG. 26.

Figure 31A:
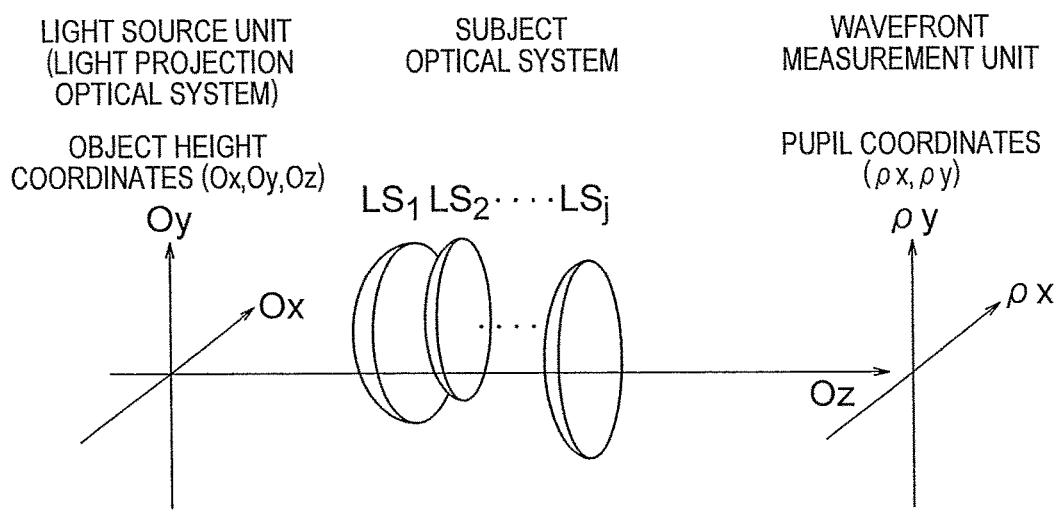
FIG. 31A and FIG. 31B are diagrams illustrating coordinates in a measurement system and the eccentricity of a subject optical system, where
Figure 31B:
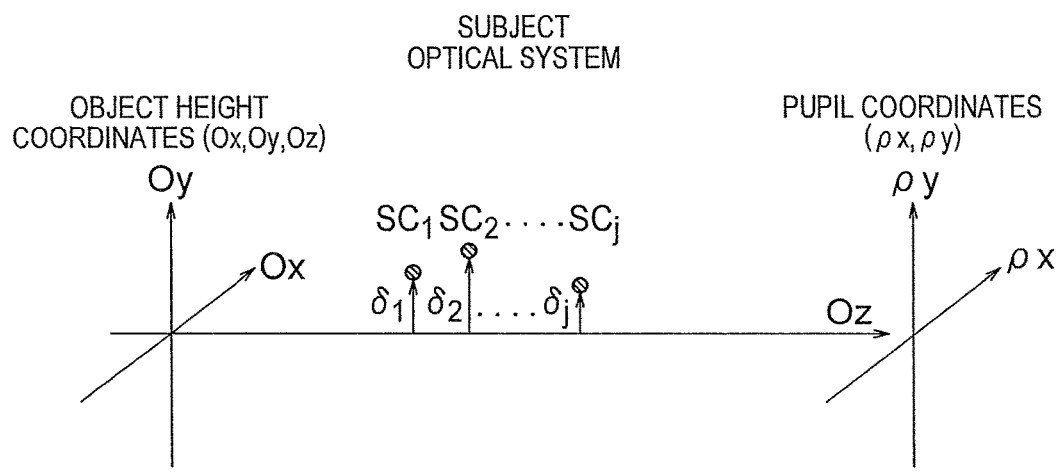

The point for extracting the aberration component proportional to one power of the displacement amount of each surface of the subject optical system will be explained. Coordinates used in the following Expressions will be explained hereinafter. FIGS. 31A and 31B are diagrams illustrating coordinates in a measurement system and eccentricity of a subject optical system, where FIG. 31A is a diagram illustrating eccentricity with lens surfaces, and FIG. 31B is a diagram illustrating eccentricity with spherical centers.

In FIGS. 31A and 31B, a coordinate of the light source unit (the light projection system) is illustrated with an Ox axis, an Oy axis, and an Oz axis, and a coordinate of the wavefront measurement unit is illustrated with a ρx axis and a ρy axis. Moreover, the coordinates of the light source unit is indicated with the object height coordinates (Ox,Oy,Oz), and the coordinates of the wavefront measurement unit is indicated with the pupil coordinates (ρx,ρy).

As illustrated in FIG. 31A, the subject optical system is formed of lens surfaces from a first lens surface $LS_1$ to a jth lens surface $LS_j$. Suppose that the lens surfaces are shifted from the Oz axis in the Y direction. Moreover, suppose that each of the lens surfaces is a spherical surface.

As illustrated in FIG. 29A, when the lens surface is a spherical surface, the eccentricity of the lens surface can be indicated with the spherical center thereof. For this reason, FIG. 31B illustrates shifts of the lens surfaces using the spherical centers. In FIG. 31B, $SC_1$, $SC_2$, . . . , and $SC_j$ indicate spherical centers of the respective lens surfaces. Moreover, $\delta_1, \delta_2, \ldots,$ and $\delta_j$ indicate the shift amounts of the respective lens surfaces in the Y direction.

The 1st-order eccentric aberration extraction method is described. Consider a rotationally symmetric subject optical system having no manufacturing errors such as an eccentric error and a surface precision error. Wavefront aberration of a light beam transmitted through the subject optical system is expressed by $\Phi(Ox,Oy,\rho x,\rho y)$. Since the subject optical system is rotationally symmetric, $\Phi$ can be expanded by a power polynomial using the following three terms (Reference: M. Born and E. Wolf, Principles of Optics).

$$Ox^2+Oy^2, \rho x^2+\rho y^2, Ox\rho x+Oy\rho y$$

In other words, Φ can be expressed by the following Expression (1). From Expression (1), it is understood that the order of object coordinates multiplied by a term having the pupil coordinates of even order is also even, and the order of object coordinates multiplied by a term having the pupil coordinates of odd order is also odd.

$$\Phi(Ox, Oy, \rho x, \rho y) = \sum_{l'=0}^{\infty}\sum_{n'=0}^{\infty}\sum_{m=0}^{\infty} a_{l'n'm}(Ox^2+Oy^2)^{l'}(\rho x^2+\rho y^2)^{n'}(Ox\rho x+Oy\rho y)^{m} \quad (1)$$

Next, consider Φ obtained when the object coordinates are shifted in the X direction by δx and in the Y direction by δy. Φ in this case is expanded to the form in which terms including δx and δy are added to Expression (1) as expressed by Expression (2).

$$\Phi(Ox+\delta x, Oy+\delta y, \rho x, \rho y) = \sum_{l'=0}^{\infty}\sum_{n'=0}^{\infty}\sum_{m=0}^{\infty} a_{l'n'm}((Ox+\delta x)^2+(Oy+\delta y)^2)^{l'} \quad (2)$$
$$(\rho x^2+\rho y^2)^{n'}((Ox+\delta x)\rho x+(Oy+\delta y)\rho y)^{m}$$

From Expression (2), it is understood that, for terms multiplied with δx and δy as odd-ordered total of δx and δy, the multiplied polynomial is the product of the even order of pupil coordinates and the odd order of object coordinates, or the product of odd order of pupil coordinates and even order of object coordinates (It is facilitated by considering that one order of object height coordinates in Expression (1) is replaced with δx·δy. Thus, the term whose order of object coordinates is even in Expression (1) is changed to the term whose order of coordinates is odd, and the term whose order of object coordinates is odd in Expression (1) is changed to the term whose order of coordinates is even.).

For preventing complications, when expression is made by polynomials of pupil coordinates and object coordinates using brackets, Expression (2) is expressed by the following Expression (3).

Φ(Ox+δx,Oy+δy,ρx,ρy)=+δxx(Polynomial consisting of the product of even order in pupil coordinates and odd order in object coordinates)+δxx(Polynomial consisting of the product of odd order in pupil coordinates and even order in object coordinates)+δyx(Polynomial consisting of the product of even order in pupil coordinates and odd order in object coordinates)+δyx(Polynomial consisting of the product of odd order in pupil coordinates and even order in object coordinates)+δx²x(Polynomial consisting of the product of even order in pupil coordinates and even order in object coordinates)+δx²x(Polynomial consisting of the product of odd order in pupil coordinates and odd order in object coordinates)+δy²x(Polynomial consisting of the product of even order in pupil coordinates and even order in object coordinates)+δy²x(Polynomial consisting of the product of odd order in pupil coordinates and odd order in object coordinates)+δxδyx(Polynomial consisting of the product of even order in pupil coordinates and even order in object coordinates)+δxδyx(Polynomial consisting of the product of odd order in pupil coordinates and odd order in object coordinates)+ (3)

A coefficient of each term in polynomials in brackets is expressed as follows.

$$a_{l'n'm}$$

The polynomials in brackets in Expression (3) can be expanded by using Zernike polynomials for pupil coordinates. Thus, in the 1st-order eccentric aberration extraction method, when the subtraction is performed as follows, it is possible to extract terms multiplied with the odd order of δx and the odd order of δy to terms having the pupil coordinates of even order.

Φ(Ox+δx,Oy+δy,ρx,ρy)−Φ(−Ox+δx,−O+δy,ρx,ρy)

Moreover, in the 1st-order eccentric aberration extraction method, when the addition is performed as follows, it is possible to extract terms multiplied with the odd order of δx and the odd order of δy to terms having the pupil coordinates of odd order.

Φ(Ox+δx,Oy+δy,ρx,ρy)+Φ(−Ox+δx,−Oy+δy,ρx,ρy)

If the amounts of δx and δy are minute, the aberration amount of a term multiplied with the third, fifth, . . . orders of δx and the third, fifth, . . . orders of δy is considered to be ignorably small. Thus, it may be considered that the term multiplied with the first order of δx and the first order of δy can be extracted by performing the 1st-order eccentric aberration extraction method.

Thus, the result after subtraction is expressed by the following Expression (4).

Φ(Ox+δx,Oy+δy,ρx,ρy)−Φ(−Ox+δy,−Oy+δy,ρx,ρy)=+
δxx(Polynomial consisting of the product of
even order in pupil coordinates and odd order
in object coordinates)×2+δyx(Polynomial con-
sisting of the product of even order in pupil
coordinates and odd order in object coordi-
nates)×2 (4)

By contrast, the result after addition is expressed by the following Expression (5).

Φ(Ox+δx,Oy+δy,ρx,ρy)+Φ(−Ox+δx,−Oy+δy,ρx,ρy)=+
δxx(Polynomial consisting of the product of
odd order in pupil coordinates and even order
in object coordinates)×2+δyx(Polynomial con-
sisting of the product of odd order in pupil
coordinates and even order in object coordi-
nates)×2 (5)

Wavefront aberration of a light beam transmitted through the subject optical system is considered to be the sum of aberrations generated when the light beam is transmitted through each surface of the subject optical system (Reference: H. H. Hopkins, Wave Theory of Aberrations). When aberration generated by a k surface is represented by Φk, wavefront aberration Φ of the light beam transmitted through the subject optical system can be considered as follows.

$$\Phi(Ox, Oy, \rho x, \rho y) = \sum_{k} \Phi k(Ox, Oy, \rho x, \rho y)$$

Note that, Φk is expressed by the following Expression (6).

$$\Phi(Ox, Oy, \rho x, \rho y) = \sum_{l'=0}^{\infty}\sum_{n'=0}^{\infty}\sum_{m=0}^{\infty} a_{l'n'm}(Ox^2 + Oy^2)^{l'}(\rho x^2 + \rho y^2)^{n'}(Ox\rho x + Oy\rho y)^m \quad (6)$$

Ox, Oy, ρx, ρy are represented as coordinates of the whole subject optical system, rather than coordinates for each k surface. Consider Φk, which is obtained when the k surface is eccentric in the X direction by δkx and in the Y direction by δky. Φk is expressed by the following Expression (7).

$$\Phi k(Ox - \delta kx, Oy - \delta kx, \rho x, \rho y) = \sum_{l'=0}^{\infty}\sum_{n'=0}^{\infty}\sum_{m=0}^{\infty} a_{kl'n'm}((Ox - \delta kx)^2 + (Oy - \delta ky)^2)^{l'} \quad (7)$$
$$(\rho x^2 + \rho y^2)^{n'}((Ox - \delta x)\rho kx + (Oy - \delta ky)\rho y)^m$$

For preventing complications, when expression is made by polynomials of pupil coordinates and object coordinates using brackets, Expression (7) is expressed by the following Expression (8).

Φk(Ox−δkx,Oy−δkx,ρx,ρy)=+δkx×(Polynomial consisting of the product of even order in pupil coordinates and odd order in object coordinates)+δkx×(Polynomial consisting of the product of odd order in pupil coordinates and even order in object coordinates)+δky×(Polynomial consisting of the product of even order in pupil coordinates and odd order in object coordinates)+δky×(Polynomial consisting of the product of odd order in pupil coordinates and even order in object coordinates)+δkx²×(Polynomial consisting of the product of even order in pupil coordinates and even order in object coordinates)+δkx²×(Polynomial consisting of the product of odd order in pupil coordinates and odd order in object coordinates)+δky²×(Polynomial consisting of the product of even order in pupil coordinates and even order in object coordinates)+δky²×(Polynomial consisting of the product of odd order in pupil coordinates and odd order in object coordinates)+δkxδky×(Polynomial consisting of the product of even order in pupil coordinates and even order in object coordinates)+δkxδky×(Polynomial consisting of the product of odd order in pupil coordinates and odd order in object coordinates)+ (8)

Similarly to the calculation of δx and δy, it is considered that if the amounts of δkx and δky are minute, the 1st-order eccentric aberration extraction method can be used to extract the term multiplied with the first order of δkx and the first order of δky. It is possible to extract the term multiplied with one power of the eccentricity amount for each degree of freedom of eccentricity, for not only the k surface but also for each surface of the subject optical system.

The result after subtraction is expressed by the following Expression (9).

Φk(Ox−δx,Oy−δy,ρx,ρy)−Φk(−Ox−δx,−Oy−δy,ρx,ρy)=+δkx×(Polynomial consisting of the product of even order in pupil coordinates and odd order in object coordinates)+δky×(Polynomial consisting of the product of even order in pupil coordinates and odd order in object coordinates) (9)

By contrast, the result after addition is expressed by the following Expression (10).

Φk(Ox−δx,Oy−δy,ρx,ρy)+Φk(−Ox−δx,−Oy−δy,ρx,ρy)=+δkx×(Polynomial consisting of the product of odd order in pupil coordinates and even order in object coordinates)+δky×(Polynomial consisting of the product of odd order in pupil coordinates and even order in object coordinates) (10)

The number of degrees of freedom of eccentricity of the first surface is two, X and Y, for a spherical surface, and four, X, Y, B, and A, for an aspherical surface. In the above description, the number of degrees of freedom of eccentricity is two, X and Y. When the degrees of freedom of eccentricity for B and A are taken into consideration, the description of the derivation thereof is omitted, but the terms of δkB and δkA are extracted similarly by implementing the 1st-order eccentric aberration extraction method.

In the 1st-order eccentric aberration extraction method, aberrations are added or subtracted depending on whether the pupil coordinates are even-ordered or odd-ordered. By subjecting actually measured wavefront aberration to Zernike fitting, aberration components corresponding to terms of the pupil coordinates of even order and aberration components corresponding to terms odd order can be separated from each other. Table 1 illustrates Zernike polynomials.

TABLE 1

| Zernike term | Expression |
| --- | --- |
| 1 | 1 |
| 2 | ρx |
| 3 | ρy |
| 4 | 2 (ρx^2 + ρy^2) − 1 |
| 5 | ρx^2 − ρy^2 |
| 6 | 2ρxρy |
| 7 | 3 (ρx^2 + ρy^2) ρx − 2ρx |
| 8 | 3 (ρx^2 + ρy^2) ρy − 2ρy |
| 9 | 6 (ρx^2 + ρy^2) ^2 − 6 (ρx^2 + ρy^2) + 1 |
| 10 | (ρx^2 − 3ρy^2) ρx |
| 11 | (3ρx^2 − ρy^2) ρy |
| 12 | (4 (ρx^2 + ρy^2) − 3) (ρx^2 − ρy^2) |
| 13 | (4 (ρx^2 + ρy^2) − 3) (2ρxρy) |
| 14 | (10 (ρx^2 + ρy^2) ^2 − 12 (ρx^2 + ρy^2) + 3) ρx |
| 15 | (10 (ρx^2 + ρy^2) ^2 − 12 (ρx^2 + ρy^2) + 3) ρy |
| 16 | 20 (ρx^2 + ρy^2) ^3 − 30 (ρx^2 + ρy^2) ^2 + 12 (ρx^2 + ρy^2) − 1 |
| 17 | (ρx^2 − ρy^2) ^2 − (2ρxρy) ^2 |
| 18 | 2 (ρx^2 − ρy^2) (2ρxρy) |

According to the 1st-order eccentric aberration extraction method, it is possible to treat the eccentricity amount and the aberration amount (first aberration component) generated by the eccentricity amount as having a linear relation.

The self-reference method is described. In general, not only aberration from the subject optical system but also aberration (system aberration) generated by manufacturing errors of the measurement apparatus are included in aberration obtained by actual measurement. Examples of the manufacturing errors include an inclination of a microlens array of a Shack-Hartmann sensor with respect to an image pickup element, a distortion of a substrate, and a surface precision error and an alignment error during assembling of a light projection optical system or a light reception optical system.

Moreover, in actual measurement, there are various axes, for example, the axis of a light projection optical system, the axis of a light reception optical system, and the axis of a subject optical system. These axes are eccentric in actuality, and are thus used to mean rough axes. It is difficult to completely align these axes with a revolution axis. The revolution axis is an axis passing through the center position of a revolution orbit at a time of moving the subject optical system in the revolution orbit.

In calculating the eccentricity amount of the subject optical system in such a case, the meaning of the eccentricity amount becomes ambiguous, such as what is the reference for the determined eccentricity amount.

The self-reference method is a method of solving such a problem. In the self-reference method, it is possible to remove system aberration caused by manufacturing errors of the measurement apparatus, and at the same time, to create a reference axis for the eccentricity amount of the subject optical system. By doing this, highly accurate eccentricity measurement can be implemented.

In the self-reference method, measurement before rotating the subject optical system and measurement after rotating the subject optical system is performed. Wavefront aberration of the subject optical system acquired by the measurement before rotation is expressed by the following Expression (11).

Note that, δkx+Jx and δky+Jy represent eccentricity amounts of the k surface of the subject optical system with reference to the axis of the light projection optical system, which are determined by ignoring the revolution shift vector amount given in the state in which the subject optical system is disposed at a position away from the revolution axis, sys represents system aberration, Jx and Jy represent eccentricity amounts of the revolution axis with reference to the axis of the light projection optical system, and δkx and δky represent eccentricity amounts of the subject optical system with reference to the rotation axis.

Moreover, since δkx, δky, Jx, and Jy are minute amounts, terms that are proportional to the cube or more of δkx, δky, Jx, and Jy are ignored.

$\Phi_{rotated\ by\ 0\ degrees}$ (Ox, Oy) =
$\Phi$ (Ox, Oy, ρx, ρy, δ1x + Jx, δ1y + Jy, δ2x + Jx, δ2y, + Jy ... , δkx + Jx, δky + Jy) = sys + $\sum_k \Phi k$ (Ox, Oy, ρx, ρy, δkx + Jx, δky + Jy) = sys +
+ (δ1x + Jx) × (Polynomial consisting of the product of even order in pupil coordinates and odd order in object coordinates)
+ (δ1x + Jx) × (Polynomial consisting of the product of odd order in pupil coordinates and even order in object coordinates)
+ (δ1y + Jy) × (Polynomial consisting of the product of even order in pupil coordinates and odd order in object coordinates)
+ (δ1y + Jy) × (Polynomial consisting of the product of odd order in pupil coordinates and even order in object coordinates)
+ (δ1x + Jx)² × (Polynomial consisting of the product of even order in pupil coordinates and even order in object coordinates)
+ (δ1x + Jx)² × (Polynomial consisting of the product of odd order in pupil coordinates and odd order in object coordinates)
+ (δ1y + Jy)² × (Polynomial consisting of the product of even order in pupil coordinates and even order in object coordinates)
+ (δ1y + Jy)² × (Polynomial consisting of the product of odd order in pupil coordinates and odd order in object coordinates)
+ (δ1x + Jx) (δ1y + Jy) × (Polynomial consisting of the product of even order in pupil coordinates and even order in object coordinates)
+ (δ1x + Jx) (δ1y + Jy) × (Polynomial consisting of the product of odd order in pupil coordinates and odd order in object coordinates)
+ (δ2x + Jx) × (Polynomial consisting of the product of even order in pupil coordinates and odd order in object coordinates)
+ (δ2x + Jx) × (Polynomial consisting of the product of odd order in pupil coordinates and even order in object coordinates)
+ (δ2y + Jy) × (Polynomial consisting of the product of even order in pupil coordinates and odd order in object coordinates)
+ (δ2y + Jy) × (Polynomial consisting of the product of odd order in pupil coordinates and even order in object coordinates)
+ (δ2x + Jx)² × (Polynomial consisting of the product of even order in pupil coordinates and even order in object coordinates)
+ (δ2x + Jx)² × (Polynomial consisting of the product of odd order in pupil coordinates and odd order in object coordinates)
+ (δ2y + Jy)² × (Polynomial consisting of the product of even order in pupil coordinates and even order in object coordinates)
+ (δ2y + Jy)² × (Polynomial consisting of the product of odd order in pupil coordinates and odd order in object coordinates)
+ (δ2x + Jx) (δ2y + Jy) × (Polynomial consisting of the product of even order in pupil coordinates and even order in object coordinates)
+ (δ2x + Jx) (δ2y + Jy) × (Polynomial consisting of the product of odd order in pupil coordinates and odd order in object coordinates)
+ ...
+ (δkx + Jx) × (Polynomial consisting of the product of even order in pupil coordinates and odd order in object coordinates)
+ (δkx + Jx) × (Polynomial consisting of the product of odd order in pupil coordinates and even order in object coordinates)
+ (δky + Jy) × (Polynomial consisting of the product of even order in pupil coordinates and odd order in object coordinates)
+ (δky + Jy) × (Polynomial consisting of the product of odd order in pupil coordinates and even order in object coordinates)
+ (δkx + Jx)² × (Polynomial consisting of the product of even order in pupil coordinates and even order in object coordinates)
+ (δkx + Jx)² × (Polynomial consisting of the product of odd order in pupil coordinates and odd order in object coordinates)
+ (δky + Jy)² × (Polynomial consisting of the product of even order in pupil coordinates and even order in object coordinates)
+ (δky + Jy)² × (Polynomial consisting of the product of odd order in pupil coordinates and odd order in object coordinates)
+ (δkx + Jx) (δky + Jy) × (Polynomial consisting of the product of even order in pupil coordinates and even order in object coordinates)
+ (δkx + Jx) (δky + Jy) × (Polynomial consisting of the product of odd order in pupil coordinates and odd order in object coordinates)
(11)

Wavefront aberration of the subject optical system acquired by the measurement after rotation is expressed by the following Expression (12). The subject optical system is rotated by 180 degrees around the rotation axis.

$\Phi_{rotated\ by\ 180\ degrees}$ (Ox, Oy) =
$\Phi$ (Ox, Oy, ρx, ρy, −δ1x + Jx, −δ1y + Jy, −δ2x + Jx, −δ2y, + Jy ..., −δkx + Jx, −δky + Jy) = sys + $\sum_k \Phi k$ (Ox, Oy, ρx, ρy, −δkx + Jx, −δky + Jy) = sys +
+ (−δ1x + Jx) × (Polynomial consisting of the product of even order in pupil coordinates and odd order in object coordinates)
+ (−δ1x + Jx) × (Polynomial consisting of the product of odd order in pupil coordinates and even order in object coordinates)
+ (−δ1y + Jy) × (Polynomial consisting of the product of even order in pupil coordinates and odd order in object coordinates)
+ (−δ1y + Jy) × (Polynomial consisting of the product of odd order in pupil coordinates and even order in object coordinates)
+ (−δ1x + Jx)² × (Polynomial consisting of the product of even order in pupil coordinates and even order in object coordinates)
+ (−δ1x + Jx)² × (Polynomial consisting of the product of odd order in pupil coordinates and odd order in object coordinates)
+ (−δ1y + Jy)² × (Polynomial consisting of the product of even order in pupil coordinates and even order in object coordinates)
+ (−δ1y + Jy)² × (Polynomial consisting of the product of odd order in pupil coordinates and odd order in object coordinates)
+ (−δ1x + Jx) (−δ1y + Jy) × (Polynomial consisting of the product of even order in pupil coordinates and even order in object coordinates)
+ (−δ1x + Jx) (−δ1y + Jy) × (Polynomial consisting of the product of odd order in pupil coordinates and odd order in object coordinates)
+ (−δ2x + Jx) × (Polynomial consisting of the product of even order in pupil coordinates and odd order in object coordinates)
+ (−δ2x + Jx) × (Polynomial consisting of the product of odd order in pupil coordinates and even order in object coordinates)
+ (−δ2y + Jy) × (Polynomial consisting of the product of even order in pupil coordinates and odd order in object coordinates)

-continued

+ (−δ2y + Jy) × (Polynomial consisting of the product of odd order in pupil coordinates and even order in object coordinates)
+ (−δ2x + Jx)² × (Polynomial consisting of the product of even order in pupil coordinates and even order in object coordinates)
+ (−δ2x + Jx)² × (Polynomial consisting of the product of odd order in pupil coordinates and odd order in object coordinates)
+ (−δ2y + Jy)² × (Polynomial consisting of the product of even order in pupil coordinates and even order in object coordinates)
+ (−δ2y + Jy)² × (Polynomial consisting of the product of odd order in pupil coordinates and odd order in object coordinates)
+ (−δ2x + Jx) (−δ2y + Jy) × (Polynomial consisting of the product of even order in pupil coordinates and even order in object coordinates)
+ (−δ2x + Jx) (−δ2y + Jy) × (Polynomial consisting of the product of odd order in pupil coordinates and odd order in object coordinates)
+ . . .
+ (−δkx + Jx) × (Polynomial consisting of the product of even order in pupil coordinates and odd order in object coordinates)
+ (−δkx + Jx) × (Polynomial consisting of the product of odd order in pupil coordinates and even order in object coordinates)
+ (−δky + Jy) × (Polynomial consisting of the product of even order in pupil coordinates and odd order in object coordinates)
+ (−δky + Jy) × (Polynomial consisting of the product of odd order in pupil coordinates and even order in object coordinates)
+ (−δkx + Jx)² × (Polynomial consisting of the product of even order in pupil coordinates and even order in object coordinates)
+ (−δkx + Jx)² × (Polynomial consisting of the product of odd order in pupil coordinates and odd order in object coordinates)
+ (−δky + Jy)² × (Polynomial consisting of the product of even order in pupil coordinates and even order in object coordinates)
+ (−δky + Jy)² × (Polynomial consisting of the product of odd order in pupil coordinates and odd order in object coordinates)
+ (−δkx + Jx) (−δky + Jy) × (Polynomial consisting of the product of even order in pupil coordinates and even order in object coordinates)
+ (−δkx + Jx) (−δky + Jy) × (Polynomial consisting of the product of odd order in pupil coordinates and odd order in object coordinates)  (12)

The self-reference method is implemented, and wavefront aberration change data is calculated from the wavefront aberration before rotation and the wavefront aberration after rotation.

$\Phi_{rotated\ by\ 180\ degrees}(Ox,Oy) - \Phi_{rotated\ by\ 0\ degrees}(Ox,Oy) = (\delta 1x) \times$(Polynomial consisting of the product of even order in pupil coordinates and odd order in object coordinates)×(−2)+(δ1x)×(Polynomial consisting of the product of odd order in pupil coordinates and even order in object coordinates)×(−2)+(δ1y)×(Polynomial consisting of the product of even order in pupil coordinates and odd order in object coordinates)×(−2)+(δ1y)×(Polynomial consisting of the product of odd order in pupil coordinates and even order in object coordinates)×(−2)+(2δ1x×Jx)×(Polynomial consisting of the product of even order in pupil coordinates and even order in object coordinates)×(−2)+(2δ1x×Jx)×(Polynomial consisting of the product of odd order in pupil coordinates and odd order in object coordinates)×(−2)+(2δ1y×Jy)×(Polynomial consisting of the product of even order in pupil coordinates and even order in object coordinates)×(−2)+(2δ1y×Jy)×(Polynomial consisting of the product of odd order in pupil coordinates and odd order in object coordinates)×(−2)+(δ1x×Jy+δ1y×Jx)×(Polynomial consisting of the product of even order in pupil coordinates and even order in object coordinates)×(−2)+(δ1y×Jx+δ1x×Jy)×(Polynomial consisting of the product of odd order in pupil coordinates and odd order in object coordinates)×(−2)+(δ2x)×(Polynomial consisting of the product of even order in pupil coordinates and odd order in object coordinates)×(−2)+(δ2x)×(Polynomial consisting of the product of odd order in pupil coordinates and even order in object coordinates)×(−2)+ (δ2y)×(Polynomial consisting of the product of even order in pupil coordinates and odd order in object coordinates)×(−2)+(δ2y)×(Polynomial consisting of the product of odd order in pupil coordinates and even order in object coordinates)×(−2)+(2δ2x×Jx)×(Polynomial consisting of the product of even order in pupil coordinates and even order in object coordinates)×(−2)+(2δ2x×Jx)×(Polynomial consisting of the product of odd order in pupil coordinates and odd order in object coordinates)×(−2)+(2δ2y×Jy)×(Polynomial consisting of the product of even order in pupil coordinates and even order in object coordinates)×(−2)+(2δ2y×Jy)×(Polynomial consisting of the product of odd order in pupil coordinates and odd order in object coordinates)×(−2)+(δ2x×Jy+δ2y×Jx)×(Polynomial consisting of the product of even order in pupil coordinates and even order in object coordinates)×(−2)+(δ2x×Jy+δ2y×Jx)×(Polynomial consisting of the product of odd order in pupil coordinates and odd order in object coordinates)×(−2)+ . . . +(δkx)×(Polynomial consisting of the product of even order in pupil coordinates and odd order in object coordinates)×(−2)+(δkx)×(Polynomial consisting of the product of odd order in pupil coordinates and even order in object coordinates)×(−2)+(δky)×(Polynomial consisting of the product of even order in pupil coordinates and odd order in object coordinates)×(−2)+(δky)×(Polynomial consisting of the product of odd order in pupil coordinates and even order in object coordinates)×(−2)+(2δkx×Jx)×(Polynomial consisting of the product of even order in pupil coordinates and even order in object coordinates)×(−2)+(2δkx×Jx)×(Polynomial consisting of the product of odd order in pupil coordinates and odd order in object coordinates)×(−2)+(2δky×Jy)×(Polynomial consisting of the product of even order in pupil coordinates and even order in object coordinates)×(−2)+(2δky×Jy)×(Polynomial consisting of the product of odd order in pupil coordinates and odd order in object coordinates)×(−2)+(δkx×Jy+δky×Jx)×(Polynomial consisting of the product of even order in pupil coordinates and even order in object coordinates)×(−2)+(δkx×Jy+δky×Jx)×(Polynomial consisting of the product of odd order in pupil coordinates and odd order in object coordinates)×(−2)

In this state, the influence of the eccentricity between the axis of the light projection optical system and the revolution axis has not been removed. Thus, the 1st-order eccentric aberration extraction method is further implemented.

$[\Phi_{rotated\ by\ 180\ degrees}(Ox,Oy) - \Phi_{rotated\ by\ 0\ degrees}(Ox,Oy)] - [\Phi_{rotated\ by\ 180\ degrees}(-Ox,-Oy) - \Phi_{rotated\ by\ 0\ degrees}(-OX,-Oy)] = (\delta 1x) \times$(Polynomial consisting of the product of even order in pupil coordinates and odd order in object coordinates)×(−2)×2+(δ1y)×(Polynomial consisting of the product of even order in pupil coordinates and odd order in object coordinates)×(−2)×2+(2δ1x×Jx)×(Polynomial consisting of the product of odd order in pupil coordinates and odd order in object coordinates)×(−2)×2+(2δ1y×Jy)×(Polynomial consisting of the product of odd order in pupil coordinates and odd order in object coordinates)×(−2)×2+(δ1y×Jx+δ1x×Jy)×(Polynomial consisting of the product of odd order in pupil coordinates and odd order in object coordinates)×(−2)×2+(δ2x)×(Polynomial consisting of the product of even order in pupil coordinates and odd order in object coordinates)×(−2)×2+(δ2y)×(Polynomial consisting of the product of even order in pupil coordinates and odd order in object coordinates)×(−2)×2+(2δ2x×Jx)×(Polynomial consisting of the product of odd order in pupil coordinates and odd order in object coordinates)×(−2)×2+(2δ2y×Jy)×(Polynomial consisting of the product of odd order in pupil coordinates and odd order in object coordinates)×(−2)×2+(δ2x×Jy+δ2y×Jx)× (Polynomial consisting of the product of odd order in pupil coordinates and odd order in object coordinates)×(−2)×2+ . . . +(δkx)×(Polynomial consisting of the product of even order in pupil coordinates and odd order in object coordinates)×(−2)×2+(δky)×(Polynomial consisting of the product of even order in pupil coordinates and odd order in object coordinates)×(−2)×2+(2δkx×Jx)×(Polynomial consisting of the product of odd order in pupil coordinates and odd order in object coordinates)×(−2)×2+(2δky×Jy)×(Polynomial consisting of the product of odd order in pupil coordinates and odd order in object coordinates)×(−2)×2+(δkx×Jy+δky×Jx)× (Polynomial consisting of the product of odd order in pupil coordinates and odd order in object coordinates)×(−2)×2

$[\Phi_{rotated\ by\ 180\ degrees}(Ox,Oy)-\Phi_{rotated\ by\ 0\ degrees}(Ox,Oy)]+[\Phi_{rotated\ by\ 180\ degrees}(-Ox,-Oy)-\Phi_{rotated\ by\ 0\ degrees}(-Ox,-Oy)]=(\delta 1x)\times$(Polynomial consisting of the product of odd order in pupil coordinates and even order in object coordinates)×(−2)×2+(δ1y)×(Polynomial consisting of the product of odd order in pupil coordinates and even order in object coordinates)×(−2)×2+(2δ1x×Jx)×(Polynomial consisting of the product of even order in pupil coordinates and even order in object coordinates)×(−2)×2+(2δ1y×Jy)× (Polynomial consisting of the product of even order in pupil coordinates and even order in object coordinates)×(−2)×2+(δ1x×Jy+δ1y×Jx)× (Polynomial consisting of the product of even order in pupil coordinates and even order in object coordinates)×(−2)×2+(δ2x)×(Polynomial consisting of the product of odd order in pupil coordinates and even order in object coordinates)×(−2)×2+(δ2y)×(Polynomial consisting of the product of odd order in pupil coordinates and even order in object coordinates)×(−2)×2+(2δ2x×Jx)×(Polynomial consisting of the product of even order in pupil coordinates and even order in object coordinates)×(−2)×2+(2δ2y×Jy)× (Polynomial consisting of the product of even order in pupil coordinates and even order in object coordinates)×(−2)×2+(δ2x×Jy+δ2y×Jx)× (Polynomial consisting of the product of even order in pupil coordinates and even order in object coordinates)×(−2)×2+ . . . +(δkx)×(Polynomial consisting of the product of odd order in pupil coordinates and even order in object coordinates)×(−2)×2+(δky)×(Polynomial consisting of the product of odd order in pupil coordinates and even order in object coordinates)×(−2)×2+ (2δkx×Jx)×(Polynomial consisting of the product of even order in pupil coordinates and even order in object coordinates)×(−2)×2+(2δky×Jy)× (Polynomial consisting of the product of even order in pupil coordinates and even order in object coordinates)×(−2)×2+(δkx×Jy+δky×Jx)× (Polynomial consisting of the product of even order in pupil coordinates and even order in object coordinates)×(−2)×2

Based on the characteristics of Zernike fitting, by separating terms of the pupil coordinates of even order, it is possible to obtain aberration components proportional to the eccentricity amount with reference to the rotation axis.

$[\Phi_{rotated\ by\ 180\ degrees}(Ox,Oy)-\Phi_{rotated\ by\ 0\ degrees}(Ox,Oy)]-[\Phi_{rotated\ by\ 180\ degrees}(-Ox,-Oy)-\Phi_{rotated\ by\ 0\ degrees}(-Ox,-Oy)]=(\delta 1x)\times$(Polynomial consisting of the product of even order in pupil coordinates and odd order in object coordinates)×(−2)×2+(δ1y)×(Polynomial consisting of the product of even order in pupil coordinates and odd order in object coordinates)×(−2)×2+(δ2x)×(Polynomial consisting of the product of even order in pupil coordinates and odd order in object coordinates)×(−2)×2+(δ2y)× (Polynomial consisting of the product of even order in pupil coordinates and odd order in object coordinates)×(−2)×2+ . . . +(δkx)×(Polynomial consisting of the product of even order in pupil coordinates and odd order in object coordinates)×(−2)×2+(δky)×(Polynomial consisting of the product of even order in pupil coordinates and odd order in object coordinates)×(−2)×2

Based on the characteristics of Zernike fitting, by separating terms of the pupil coordinates of odd order, it is possible to obtain aberration components proportional to the eccentricity amount with reference to the rotation axis.

$[\Phi_{rotated\ by\ 180\ degrees}(Ox,Oy)-\Phi_{rotated\ by\ 0\ degrees}(Ox,Oy)]+[\Phi_{rotated\ by\ 180\ degrees}(-Ox,-Oy)-\Phi_{rotated\ by\ 0\ degrees}(-Ox,-Oy)]=(\delta 1x)\times$(Polynomial consisting of the product of odd order in pupil coordinates and even order in object coordinates)×(−2)×2+(δ1y)×(Polynomial consisting of the product of odd order in pupil coordinates and even order in object coordinates)×(−2)×2+(δ2x)×(Polynomial consisting of the product of odd order in pupil coordinates and even order in object coordinates)×(−2)×2+(δ2y)×(Polynomial consisting of the product of odd order in pupil coordinates and even order in object coordinates)×(−2)×2+ . . . +(δkx)×(Polynomial consisting of the product of odd order in pupil coordinates and even order in object coordinates)×(−2)×2+(δky)×(Polynomial consisting of the product of odd order in pupil coordinates and even order in object coordinates)×(−2)×2

Here, the fact that by using the self-reference method and the 1st-order eccentric aberration extraction method, it is possible to extract the aberration component proportional to one power of the displacement amount of each surface of the subject optical system associated with the rotation for the wavefront aberration expressed by the object coordinates, the pupil coordinates, and the eccentricity amounts, has been described.

The self-reference method and the 1st-order eccentric aberration extraction method can be applied without any problem to the measurement of off-axis wavefront aberration by moving the subject optical system to be off-axis shift. The object coordinates in the above description correspond to the revolution shift vector.

Consider the influence of the case where the revolution shift vector has an error, that is, the case where there is a positioning error by a device for controlling the position of the subject optical system in the measurement apparatus. Note that, the displacement amount of the subject optical system is on the order of microns, and the size of the revolution shift vector is on the order of millimeters. If a positioning error of the revolution shift vector is several microns, the proportion of this positioning error to an error from the original size of the revolution shift vector is less than 1%.

Thus, even when the magnitude of the revolution shift vector has errors on the order of microns, it is possible to measure aberration components with high accuracy from the above-mentioned expressions of the first aberration components.

The fact that the first aberration component can be extracted without any problem even when the revolution axis is shifted from the axis of the light projection optical system by (Jx, Jy) has been already described above.

The influence of the light reception optical system shifted from the axis of the light projection optical system is included in the system aberration sys. The first aberration component can be extracted without any problem as described above even when the system aberration sys is present.

Even when manufacturing errors, such as an eccentricity error, a surface precision error, and an assembling error, are present in a measurement apparatus including a light projection optical system and a light reception optical system, the manufacturing errors are included in the system aberration sys. The fact that the first aberration component can be extracted without any problem even when the system aberration sys is present has been already described above.

A method of calculating eccentric aberration sensitivity necessary for solving eccentric equations is described. Since the eccentric equations are linear equations, attempt is required to be able to treat the aberration amount generated with respect to the eccentricity amount in the linear form.

As described below, eccentric aberration sensitivity that is proportional to one power of the eccentricity amount is calculated in optical CAD.

A measurement apparatus using a subject optical system, a light projection system, and a light reception system to be used in actual measurement is reflected on lens data in the optical CAD.

Data on the subject optical system is set in an ideal state without any manufacturing errors, such as an eccentricity error and a surface precision error. The axis of the subject optical system, the axis of the light projection system, the axis of the light reception system, the rotation axis, and the revolution axis are set as being aligned.

Under the same application condition and the same revolution shift vector as those in actual measurement, wavefront aberration data by each revolution shift vector is acquired. The resultant is set as reference wavefront aberration data.

Next, in the state in which the unit eccentricity amount is eccentric for each degree of freedom of eccentricity, wavefront aberration data on each revolution shift vector is similarly acquired. The resultant is set as measurement wavefront aberration data.

The wavefront aberration change amount is analyzed from both pieces of the wavefront aberration data. Further, Zernike fitting is performed and quantification is achieved. The resultant is referred to as "Zernike wavefront aberration change sensitivity".

In regard to Zernike wavefront aberration change sensitivity in each revolution shift vector, a 1st-order eccentric aberration extraction method is implemented on symmetric revolution shift vectors. The resultant is referred to as "eccentric aberration sensitivity".

The case of measuring the eccentricity of a double-sided aspherical single lens is described. There are eight degrees of freedom of eccentricity: X of the first surface, X of the second surface, B of the first surface, B of the second surface, Y of the first surface, Y of the second surface, A of the first surface, and A of the second surface.

The displacement amounts of the surfaces associated with the rotation axis are represented by HX1, HX1, HB1, HB2, HY1, Hy1, HA1, and HA2 for the respective degrees of freedom of eccentricity. Eccentric aberration sensitivities for these degrees of freedom of eccentricity are represented by X1, X2, B1, B2, Y1, Y2, A1, and A2. First aberration components obtained by actual measurement are represented by T.

The Zernike term and the revolve angle θ are represented by (Zernike term, revolve angle) using brackets. Eccentric equations are as follows.

$$\begin{pmatrix} T(Z2,0) \\ T(Z2,10) \\ \vdots \\ T(Z2,170) \\ T(Z3,0) \\ T(Z3,10) \\ \vdots \\ T(Z3,170) \\ \vdots \\ T(Zp,0) \\ T(Zp,10) \\ \vdots \\ T(Zp,170) \end{pmatrix} = \begin{pmatrix} X1(Z2,0) & X2(Z2,0) & B1(Z2,0) & B2(Z2,0) & Y1(Z2,0) & Y2(Z2,0) & A1(Z2,0) & A2(Z2,0) \\ X1(Z2,10) & X2(Z2,10) & B1(Z2,10) & B2(Z2,10) & Y1(Z2,10) & Y2(Z2,10) & A1(Z2,10) & A2(Z2,10) \\ \vdots & \vdots & \vdots & \vdots & \vdots & \vdots & \vdots & \vdots \\ X1(Z2,170) & X2(Z2,170) & B1(Z2,170) & B2(Z2,170) & Y1(Z2,170) & Y2(Z2,170) & A1(Z2,170) & A2(Z2,170) \\ X1(Z3,0) & X2(Z3,0) & B1(Z3,0) & B2(Z3,0) & Y1(Z3,0) & Y2(Z3,0) & A1(Z3,0) & A2(Z3,0) \\ X1(Z3,10) & X2(Z3,10) & B1(Z3,10) & B2(Z3,10) & Y1(Z3,10) & Y2(Z3,10) & A1(Z3,10) & A2(Z3,10) \\ \vdots & \vdots & \vdots & \vdots & \vdots & \vdots & \vdots & \vdots \\ X1(Z3,170) & X2(Z3,170) & B1(Z3,170) & B2(Z3,170) & Y1(Z3,170) & Y2(Z3,170) & A1(Z3,170) & A2(Z3,170) \\ \vdots & \vdots & \vdots & \vdots & \vdots & \vdots & \vdots & \vdots \\ X1(Zp,0) & X2(Zp,0) & B1(Zp,0) & B2(Zp,0) & Y1(Zp,0) & Y2(Zp,0) & A1(Zp,0) & A2(Zp,0) \\ X1(Zp,10) & X2(Zp,10) & B1(Zp,10) & B2(Zp,10) & Y1(Zp,10) & Y2(Zp,10) & A1(Zp,10) & A2(Zp,10) \\ \vdots & \vdots & \vdots & \vdots & \vdots & \vdots & \vdots & \vdots \\ X1(Zp,170) & X2(Zp,170) & B1(Zp,170) & B2(Zp,170) & Y1(Zp,170) & Y2(Zp,170) & A1(Zp,170) & A2(Zp,170) \end{pmatrix} \begin{pmatrix} HX1 \\ HX2 \\ HB1 \\ HB2 \\ HY1 \\ HY2 \\ HA1 \\ HA2 \end{pmatrix}$$

Further, the following is obtained by using data after front-back inversion. Note that, the data after front-back inversion are added with dashes. When the front-back inversion is performed around the Y axis, the X sensitivity and the A sensitivity are inverted.

$$
\begin{bmatrix}
T(Z2,0) \\
T(Z2,10) \\
\ldots \\
T(Z2,170) \\
T(Z3,0) \\
T(Z3,10) \\
\ldots \\
T(Z3,170) \\
\ldots \\
T(Zp,0) \\
T(Zp,10) \\
\ldots \\
T(Zp,170) \\
T'(Z2,0) \\
T'(Z2,10) \\
\ldots \\
T'(Z2,170) \\
T'(Z3,0) \\
T'(Z3,10) \\
\ldots \\
T'(Z3,170) \\
\ldots \\
T'(Zp,0) \\
T'(Zp,10) \\
\ldots \\
T'(Zp,170)
\end{bmatrix}
=
\begin{bmatrix}
X1(Z2,0) & X2(Z2,0) & B1(Z2,0) & B2(Z2,0) & Y1(Z2,0) & Y2(Z2,0) & A1(Z2,0) & A2(Z2,0) \\
X1(Z2,10) & X2(Z2,10) & B1(Z2,10) & B2(Z2,10) & Y1(Z2,10) & Y2(Z2,10) & A1(Z2,10) & A2(Z2,10) \\
\ldots & \ldots & \ldots & \ldots & \ldots & \ldots & \ldots & \ldots \\
X1(Z2,170) & X2(Z2,170) & B1(Z2,170) & B2(Z2,170) & Y1(Z2,170) & Y2(Z2,170) & A1(Z2,170) & A2(Z2,170) \\
X1(Z3,0) & X2(Z3,0) & B1(Z3,0) & B2(Z3,0) & Y1(Z3,0) & Y2(Z3,0) & A1(Z3,0) & A2(Z3,0) \\
X1(Z3,10) & X2(Z3,10) & B1(Z3,10) & B2(Z3,10) & Y1(Z3,10) & Y2(Z3,10) & A1(Z3,10) & A2(Z3,10) \\
\ldots & \ldots & \ldots & \ldots & \ldots & \ldots & \ldots & \ldots \\
X1(Z3,170) & X2(Z3,170) & B1(Z3,170) & B2(Z3,170) & Y1(Z3,170) & Y2(Z3,170) & A1(Z3,170) & A2(Z3,170) \\
\ldots & \ldots & \ldots & \ldots & \ldots & \ldots & \ldots & \ldots \\
X1(Zp,0) & X2(Zp,0) & B1(Zp,0) & B2(Zp,0) & Y1(Zp,0) & Y2(Zp,0) & A1(Zp,0) & A2(Zp,0) \\
X1(Zp,10) & X2(Zp,10) & B1(Zp,10) & B2(Zp,10) & Y1(Zp,10) & Y2(Zp,10) & A1(Zp,10) & A2(Zp,10) \\
\ldots & \ldots & \ldots & \ldots & \ldots & \ldots & \ldots & \ldots \\
X1(Zp,170) & X2(Zp,170) & B1(Zp,170) & B2(Zp17,0) & Y1(Zp,170) & Y2(Zp,170) & A1(Zp,170) & A2(Zp,170) \\
-X1'(Z2,0) & -X2'(Z2,0) & B1'(Z2,0) & B2'(Z2,0) & Y1'(Z2,0) & Y2'(Z2,0) & -A'(Z2,0) & -A2'(Z2,0) \\
-X1'(Z2,10) & -X2'(Z2,10) & B1'(Z2,10) & B2'(Z2,10) & Y1'(Z2,10) & Y2'(Z2,10) & -A1'(Z2,10) & -A2'(Z2,10) \\
\ldots & \ldots & \ldots & \ldots & \ldots & \ldots & \ldots & \ldots \\
-X1'(Z2,170) & -X2'(Z2,170) & B1'(Z2,170) & B2'(Z2,170) & Y1'(Z2,170) & Y2'(Z2,170) & -A1'(Z2,170) & -A2'(Z2,170) \\
-X1'(Z3,0) & -X2'(Z3,0) & B1'(Z3,0) & B2'(Z3,0) & Y1'(Z3,0) & Y2'(Z3,0) & -A1'(Z3,0) & -A2'(Z3,0) \\
-X1'(Z3,10) & -X2'(Z3,10) & B1'(Z3,10) & B2'(Z3,10) & Y1'(Z3,10) & Y2'(Z3,10) & -A1'(Z3,10) & -A2'(Z3,10) \\
\ldots & \ldots & \ldots & \ldots & \ldots & \ldots & \ldots & \ldots \\
-X1'(Z3,170) & -X2'(Z3,170) & B1'(Z3,170) & B2'(Z3,170) & Y1'(Z3,170) & Y2'(Z3,170) & -A1'(Z3,170) & -A2'(Z3,170) \\
\ldots & \ldots & \ldots & \ldots & \ldots & \ldots & \ldots & \ldots \\
-X1'(Zp,0) & -X2'(Zp,0) & B1'(Zp,0) & B2'(Zp,0) & Y1'(Zp,0) & Y2'(Zp,0) & -A1'(Zp,0) & -A2'(Zp,0) \\
-X1'(Zp,10) & -X2'(Zp,10) & B1'(Zp,10) & B2'(Zp,10) & Y1'(Zp,10) & Y2'(Zp,10) & -A1'(Zp,10) & -A2'(Zp,10) \\
\ldots & \ldots & \ldots & \ldots & \ldots & \ldots & \ldots & \ldots \\
-X1'(Zp,170) & -X2'(Zp,170) & B1'(Zp,170) & B2'(Zp,170) & Y1'(Zp,170) & Y2'(Zp,170) & -A1'(Zp,170) & -A2'(Zp,170)
\end{bmatrix}
\begin{bmatrix}
HX1 \\ HX2 \\ HB1 \\ HB2 \\ HY1 \\ HY2 \\ HA1 \\ HA2
\end{bmatrix}
$$

By an algorithm such as the least squares method, it is possible to determine the displacement amounts HX1, HX1, HB1, HB2, HY1, Hy1, HA1, and HA2 of the surfaces associated with the rotation axis for the respective degrees of freedom of eccentricity. When the rotation angle is 180 degrees, the values obtained by dividing the displacement amounts by −2 indicate the positions of the respective surfaces with reference to the rotation axis before the front-back inversion.

According to the present invention, the wavefront measurement apparatus and the wavefront measurement method capable of measuring an off-axis transmitted wavefront of a subject optical system in a short period of time by using a simple mechanism can be provided.

As described above, the present invention is suitable for a wavefront measurement apparatus and a wavefront measurement method capable of measuring off-axis transmitted wavefront aberration of a subject optical system in a short period of time by using a simple mechanism.

What is claimed is:

1. A wavefront measurement apparatus, comprising:
   a light source unit disposed on a first side of a measurement axis and configured to apply light beams to a subject optical system;
   a wavefront measurement unit disposed on a second side of the measurement axis and configured to measure light beams transmitted through the subject optical system;
   a holding unit disposed between the light source unit and the wavefront measurement unit and having an opening portion configured to hold the subject optical system;
   a first moving mechanism configured to revolve the subject optical system around the measurement axis in a revolution orbit;
   a second moving mechanism configured to rotate the subject optical system;
   a light reception optical system disposed between the holding unit and the wavefront measurement unit, wherein a neighborhood of the opening portion of the holding unit and a neighborhood of the wavefront measurement unit are made to be optically conjugate with each other by the light reception optical system; and
   a processor which executes a computer program to perform operations including:
   while the subject optical system is in a first state, controlling the first moving mechanism to move the subject optical system in the revolution orbit to a plurality of acquisition positions around the measurement axis, wherein a transmission region of the light beams in the subject optical system is different at each of the plurality of acquisition positions,
   generating, for each of the plurality of acquisition positions, first wavefront aberration data from a result of measurement by the wavefront measurement unit of light transmitted through the subject optical system at each of the plurality of acquisition positions while the subject optical system is in the first state,
   after the first wavefront aberration data is generated, controlling the second moving mechanism to rotate the subject optical system from the first state in which the first wavefront aberration data was obtained to a second state that is different from the first state,
   while the subject optical system is in the second state, controlling the first moving mechanism to move the subject optical system in the revolution orbit to the plurality of acquisition positions around the measurement axis,
   generating, for each of the plurality of acquisition positions, second wavefront aberration data from a result of measurement by the wavefront measurement unit of light transmitted through the subject optical system at each of the plurality of acquisition positions while the subject optical system is in the second state, acquiring wavefront aberration change data associated with the rotation of the subject optical system by setting the first wavefront aberration data as reference wavefront data and setting the second wavefront aberration data as measurement wavefront data, performing Zernike fitting on the wavefront aberration change data corresponding to each of the plurality of acquisition positions, to acquire Zernike wavefront aberration change data corresponding to each of the plurality of acquisition positions, extracting acquisition position pairs, which are pairs of the plurality of acquisition positions that are symmetric about the measurement axis by 180 degrees, and for the acquisition position pairs, subtracting Zernike coefficients having pupil coordinates of even order in Zernike polynomials and adding Zernike coefficients having pupil coordinates of odd order in Zernike polynomials, to extract aberration components.

2. The wavefront measurement apparatus according to claim 1, wherein the opening portion, the light reception optical system, and the wavefront measurement unit are positioned such that the opening portion is made conjugate with the wavefront measurement unit.

3. The wavefront measurement apparatus according to claim 1, wherein the opening portion, the light reception optical system, and the wavefront measurement unit are positioned such that a rear principal point of the subject optical system is conjugate with the wavefront measurement unit.

4. The wavefront measurement apparatus according claim 1, wherein the light reception optical system includes at least a front optical system located closest to the light source unit and a rear optical system located closest to the wavefront measurement unit, and a rear focus position of the front optical system and a position of a front focal point of the rear optical system are aligned with each other or conjugate with each other.

5. The wavefront measurement apparatus according to claim 1, further comprising a light projection optical system between the light source unit and the holding unit.

6. The wavefront measurement apparatus according to claim 5, wherein the light projection optical system is coaxial with the light reception optical system.

7. The wavefront measurement apparatus according to claim 5, wherein the light projection optical system is configured to generate a condensed light beam.

8. The wavefront measurement apparatus according to claim 7, wherein the light projection optical system and the holding unit are positioned such that a position of a condensing point of the condensed light beam is aligned with a position of a front focal point of the subject optical system.

9. The wavefront measurement apparatus according to claim 5, wherein the light projection optical system is capable of being driven in a direction of the measurement axis.

10. The wavefront measurement apparatus according to claim 5, wherein the light projection optical system is a zoom lens.

11. The wavefront measurement apparatus according to claim 1, further comprising a front-back inverting mechanism configured to rotate the subject optical system around a rotation axis that orthogonal to the measurement axis.

12. The wavefront measurement apparatus according to claim 1, wherein the operations performed by the processor further comprise:

calculating an eccentricity amount of the subject optical system with reference to a rotation axis from an analyzed displacement amount of each degree of freedom of eccentricity of each surface of the subject optical system.

13. The wavefront measurement apparatus according to claim 1, wherein the wavefront measurement apparatus has only one optical path along which the light beams travel from the light source unit to the subject optical system held by the holding unit.

14. A wavefront measurement method, comprising:

making a neighborhood of a subject optical system and a neighborhood of a wavefront measurement unit have an optically conjugate relation;

emitting light from a light source to the subject optical system;

while the subject optical system is in a first state, driving the subject optical system to move in a revolution orbit, around a measurement axis, to a plurality of acquisition positions around the measurement axis, wherein a transmission region of the light in the subject optical system is different at each of the plurality of acquisition positions;

generating, for each of the plurality of acquisition positions, first wavefront aberration data from a result of measurement by the wavefront measurement unit of light transmitted through the subject optical system at each of the plurality of acquisition positions while the subject optical system is in the first state;

after the first wavefront aberration data is generated, driving the subject optical system to rotate from the first state in which the first wavefront aberration data was obtained to a second state that is different from the first state;

while the subject optical system is in the second state, driving the subject optical system to move in the revolution orbit to the plurality of acquisition positions around the measurement axis;

generating, for each of the plurality of acquisition positions, second wavefront aberration data from a result of measurement by the wavefront measurement unit of light transmitted through the subject optical system at each of the plurality of acquisition positions while the subject optical system is in the second state;

acquiring wavefront aberration change data associated with the rotation of the subject optical system by setting the first wavefront aberration data as reference wavefront data and setting the second wavefront aberration data as measurement wavefront data;

performing Zernike fitting on the wavefront aberration change data corresponding to each of the plurality of acquisition positions, to acquire Zernike wavefront aberration change data corresponding to each of the plurality of acquisition positions;

extracting acquisition position pairs, which are pairs of the plurality of acquisition positions that are symmetric about the measurement axis by 180 degrees; and for the acquisition position pairs, subtracting Zernike coefficients having pupil coordinates of even order in Zernike polynomials and adding Zernike coefficients having pupil coordinates of odd order in Zernike polynomials, to extract aberration components.

* * * * *